(12) United States Patent
Logue et al.

(10) Patent No.: US 9,596,708 B2
(45) Date of Patent: *Mar. 14, 2017

(54) SMART-HOME DEVICE FACILITATING CONVENIENT SETUP OF PLURAL INSTANCES THEREOF IN THE SMART HOME

(71) Applicant: Google Inc., Mountain View, CA (US)

(72) Inventors: Jay Logue, San Jose, CA (US); Grant Erickson, Sunnyvale, CA (US); Roger Tinkoff, Mountain View, CA (US); David Sloo, Menlo Park, CA (US); Anthony M. Fadell, Woodside, CA (US); Matthew L. Rogers, Los Gatos, CA (US); Jeffrey A. Boyd, Novato, CA (US); James B. Simister, San Francisco, CA (US)

(73) Assignee: Google Inc., Moutain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/094,566

(22) Filed: Apr. 8, 2016

(65) Prior Publication Data
US 2016/0249395 A1    Aug. 25, 2016

Related U.S. Application Data

(63) Continuation of application No. 14/508,636, filed on Oct. 7, 2014, now Pat. No. 9,332,040.
(Continued)

(51) Int. Cl.
*G08B 17/10*    (2006.01)
*H04W 76/02*    (2009.01)
(Continued)

(52) U.S. Cl.
CPC ......... *H04W 76/021* (2013.01); *G08B 7/066* (2013.01); *G08B 25/003* (2013.01);
(Continued)

(58) Field of Classification Search
CPC .. H04L 65/1069; H04L 12/2803; G08B 25/10
(Continued)

(56) References Cited

U.S. PATENT DOCUMENTS 5,686,896 A    11/1997 Bergman
6,166,633 A    12/2000 Wang
(Continued)

OTHER PUBLICATIONS

ISR/WO mailed on Jan. 12, 2015, for International Patent Application PCT/US2014/059498, filed on Oct. 7, 2014, all pages.
(Continued)

*Primary Examiner* — Eric M Blount
(74) *Attorney, Agent, or Firm* — Kilpatrick Townsend & Stockton LLP

(57) ABSTRACT include using an application on a mobile device to establish first wireless communications with a first smart-home device that was previously paired with the user account. The method may also include transmitting, to the first smart-home device and using the first wireless protocol, a transmission that instructs the first smart-home device to establish second wireless communications with a second smart-home device, where the second wireless communications use a second wireless protocol. The method may additionally include transmitting network credentials to the first smart-home device using the first wireless protocol, where the credentials are then sent from the first smart-home device to the second smart-home device using the second wireless protocol, such that the second smart-home device can pair with the user account using the first wireless protocol.

20 Claims, 54 Drawing Sheets

Related U.S. Application Data

(60) Provisional application No. 61/887,969, filed on Oct. 7, 2013.

(51) Int. Cl.

| | | |
|---|---|---|
| *H04L 12/28* | (2006.01) | |
| *G08B 25/10* | (2006.01) | |
| *H04L 29/08* | (2006.01) | |
| *H04W 8/08* | (2009.01) | |
| *H04L 29/06* | (2006.01) | |
| *H04W 4/00* | (2009.01) | |
| *G08B 7/06* | (2006.01) | |
| *G08B 25/00* | (2006.01) | |
| *G08B 25/08* | (2006.01) | |
| *H04W 4/02* | (2009.01) | |
| *H04W 84/12* | (2009.01) | |

(52) U.S. Cl.
CPC .......... *G08B 25/009* (2013.01); *G08B 25/08* (2013.01); *G08B 25/10* (2013.01); *H04L 12/2803* (2013.01); *H04L 12/2807* (2013.01); *H04L 12/2814* (2013.01); *H04L 12/2825* (2013.01); *H04L 63/08* (2013.01); *H04L 65/1069* (2013.01); *H04L 67/10* (2013.01); *H04L 67/12* (2013.01); *H04W 4/005* (2013.01); *H04W 4/006* (2013.01); *H04W 8/08* (2013.01); *H04W 76/02* (2013.01); *H04L 2012/285* (2013.01); *H04W 4/02* (2013.01); *H04W 84/12* (2013.01)

(58) Field of Classification Search
USPC ................................................ 340/628–632
See application file for complete search history.

(56) References Cited

U.S. PATENT DOCUMENTS

| | | | |
|---|---|---|---|
| 6,686,838 | B1 | 2/2004 | Rezvani et al. |
| 8,539,567 | B1* | 9/2013 | Logue ................ H04L 63/0884 709/223 |
| 8,542,665 | B2* | 9/2013 | Doumuki ............ H04L 12/2807 370/329 |
| 2003/0234725 | A1* | 12/2003 | Lemelson ............ G08B 7/066 340/539.1 |
| 2005/0201393 | A1 | 9/2005 | Hatayama et al. |
| 2005/0253709 | A1 | 11/2005 | Baker |
| 2006/0092012 | A1 | 5/2006 | Kaiser et al. |
| 2008/0117067 | A1 | 5/2008 | Abel et al. |
| 2009/0077623 | A1 | 3/2009 | Baum et al. |
| 2009/0260064 | A1 | 10/2009 | McDowell et al. |
| 2011/0057806 | A1 | 3/2011 | Gonzales |
| 2013/0006400 | A1 | 1/2013 | Caceres et al. |
| 2013/0154823 | A1 | 6/2013 | Ostrer et al. |
| 2013/0223279 | A1 | 8/2013 | Tinnakornsrisuphap et al. |
| 2013/0241697 | A1 | 9/2013 | Baumert et al. |
| 2014/0181521 | A1 | 6/2014 | Hemphill et al. |
| 2014/0281478 | A1 | 9/2014 | Huang et al. |
| 2014/0358293 | A1 | 12/2014 | Fadell et al. |
| 2014/0379860 | A1* | 12/2014 | Brocker ................ H04L 67/10 709/217 |

OTHER PUBLICATIONS

International Preliminary Report on Patentability mailed Apr. 21, 2016, for International Patent Application No. PCT/US2014/059498, 9 pages.

\* cited by examiner

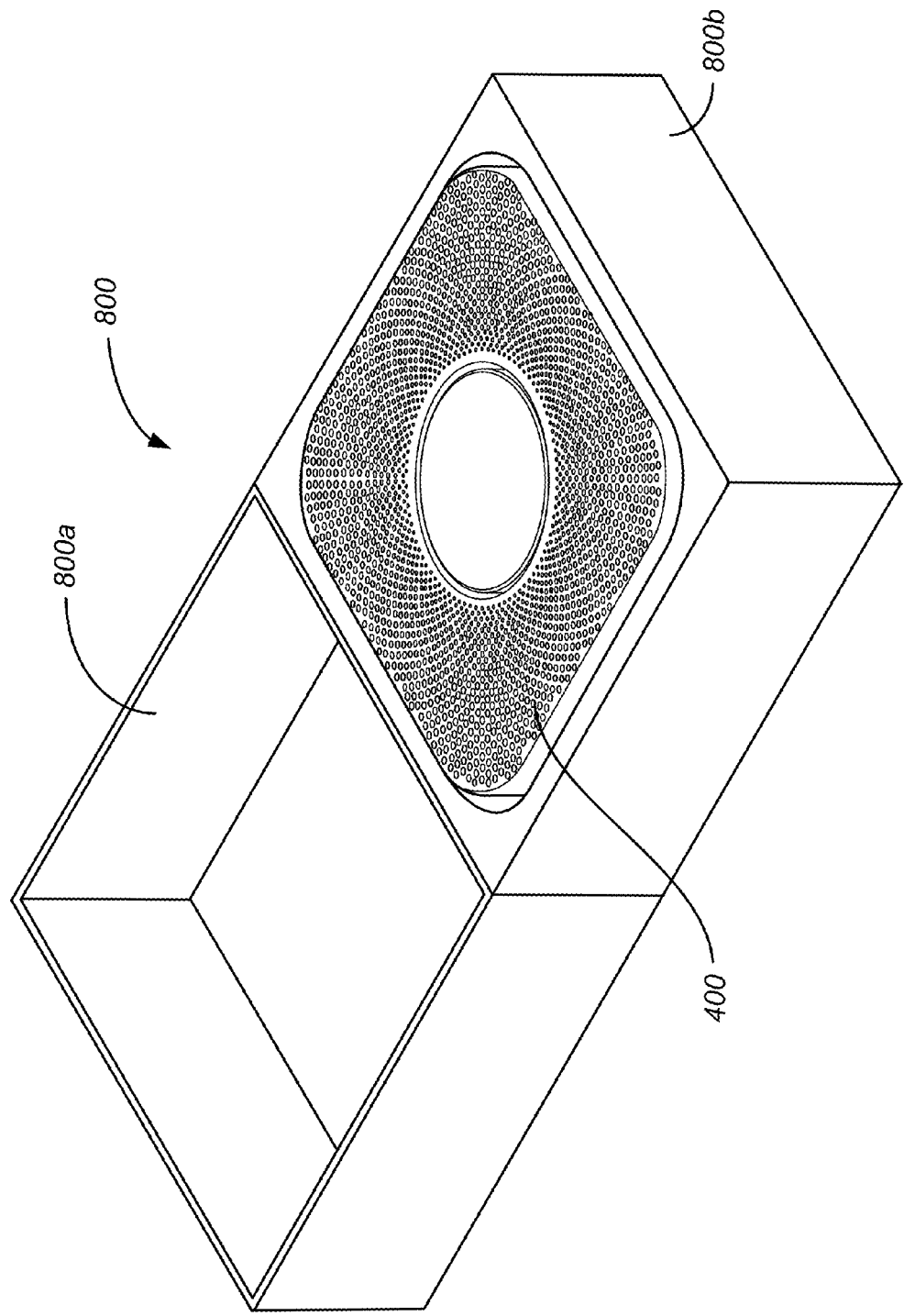

SMART-HOME DEVICE FACILITATING CONVENIENT SETUP OF PLURAL INSTANCES THEREOF IN THE SMART HOME

CROSS-REFERENCES TO RELATED APPLICATIONS

This application is a continuation of U.S. patent application Ser. No. 14/508,636, filed Oct. 7, 2014, which is incorporated herein by reference. U.S. patent application Ser. No. 14/508,636 claims priority to U.S. Provisional Application No. 61/887,969, filed Oct. 7, 2013, which is incorporated herein by reference.

BACKGROUND OF THE INVENTION

Hazard detectors use sensors to detect substances in the air that may be harmful or that may indicate the development of a hazardous situation. For example, carbon monoxide (CO) and radon gas are substances that can be harmful to humans and animals if exposed to high amounts. However, these substances are difficult to detect with the human senses because they are colorless, odorless, and tasteless. A hazard detector can detect the presence of these substances and prevent the harmful effects of exposure by alarming to notify a user. In other instances, a substance such as smoke, while not necessarily harmful in and of itself, can indicate the development of a hazardous situation, such as fire. An early alarm of the presence of such a substance can prevent the hazardous situation from developing or minimize the harmful effects of the situation. Interconnected hazard detectors include detectors that are connected to a network, enabling communication between the detectors or with a central control unit. This provides several advantages over standalone detectors, including the ability to activate multiple alarms when a single detector is triggered. Hazard detectors may be certified under standards defined by governing bodies and/or by companies that perform safety testing, such as Underwriters Laboratories (UL). For example, certain UL standards define thresholds for when smoke detectors and CO detectors should sound an alarm. Certain UL standards also define the required characteristics of the alarm, such as powering requirements and the volume, pitch, and pattern of the alarming sound.

BRIEF SUMMARY OF THE INVENTION

Embodiments of the invention provide methods and systems for facilitating the provisioning, set-up, configuration, control, and/or management of intelligent, network-connected, multi-sensing hazard detection units or smart-home devices. These smart-home devices may be used within a home, building, or structure to warn occupants of the home, building, or structure of a potential danger. A "pairing" of these network-connected smart-home devices and a user account on a cloud-based smart-home device management system or an online management account may be accomplished in a manner that reduces or minimizes an amount of user effort involved. After one of these smart-home devices is paired with an online management account using a first wireless protocol, another smart-home device may communicate with the paired smart-home device using a second wireless protocol in order to receive instructions for pairing with the online management account. These smart-home devices may perform a variety of functions, e.g., generating visual effects associated with alerts (e.g., hazard detection alerts, status information alerts, and notification alerts). These smart-home devices may also receive requests to communicate and generate indicators associated with smart hazard detector status information, e.g., the Wi-Fi connection status of the smart-home device or the battery status of the smart-home device.

According to some embodiments, a method for pairing two or more smart-home devices with a user account may be presented. The method may include establishing first wireless communications with a first smart-home device. The first wireless communications may use a first wireless protocol. The first smart-home device may have previously been paired with the user account. The method may also include transmitting, to the first smart-home device, using the first wireless protocol, a transmission that instructs the first smart-home device to establish second wireless communication between the first smart-home device and a second smart-home device. The second wireless communication established between the first smart-home device and the second smart-home device may use a second wireless protocol. The method may additionally include transmitting, to the first smart-home device, using the first wireless protocol, network credentials for the second smart-home device to join the first wireless protocol. The credentials may be sent from the first smart-home device to the second smart-home device using the second wireless protocol. A new pairing between the second smart-home device and the user account may be established using the first wireless protocol.

In various embodiments, one or more of the following aspects may also be implemented. The first wireless protocol may be 802.11 Wi-Fi compliant and the second wireless protocol may be IEEE 802.15.4 compliant. The method may also include establishing a pairing between the first smart-home device and the user account by establishing wireless communication between the first smart-home device and a computing device via a network provided by the first smart-home device, where the network may be provided using the first wireless protocol. The network credentials may be provided by an application operating on a mobile computing device. The method may also include determining a language for the second smart-home device based on a geographic location of the second smart-home device. The first smart-home device may create a data tunnel between a computing device using the first wireless protocol and the second hazard detecotor using the second wireless protocol. The first smart-home device may pass data between the computing device and the second smart-home device through the data tunnel. The method may also include receiving, by the computing device, a device code for the second smart-home device; and authenticating the computing device with the second smart-home device by sending the device code to the second smart-home device through the data tunnel. The method may additionally include receiving a pairing code from an account server; and transmitting, to the first smart-home device, using the first wireless protocol pairing code for the second smart-home device. The pairing code may be sent from the first smart-home device to the second smart-home device using the second wireless protocol. The pairing code may allow the second smart-home device to pair with the user account at the account server. The method may further include, prior to transmitting the network credentials to the first smart-home device, receiving the network credentials from the first smart-home device.

According to some embodiments, a system for pairing two or more smart-home devices with a user account may be presented. The system may include an application operating on a mobile computing device. The application may be designed for configuration and control of the two or more smart-home devices. The application may establish communication over the Internet with a central server that includes the user account. The application may be configured to establish first wireless communications with a first smart-home device. The first wireless communications may use a first wireless protocol. The first smart-home device may have previously been paired with the user account. The application may also be configured to transmit, to the first smart-home device, using the first wireless protocol, a transmission that instructs the first smart-home device to establish second wireless communication between the first smart-home device and a second smart-home device. The second wireless communication established between the first smart-home device and the second smart-home device may use a second wireless protocol. The application may additionally be configured to transmit, to the first smart-home device, using the first wireless protocol, network credentials for the second smart-home device to join the first wireless protocol. The credentials may be sent from the first smart-home device to the second smart-home device using the second wireless protocol. A new pairing between the second smart-home device and the user account may be established using the first wireless protocol.

In various embodiments, one or more of the following aspects may also be implemented. The first wireless protocol may be 802.11 Wi-Fi compliant and the second wireless protocol may be IEEE 802.15.4 compliant. The application may also be configured to establish a pairing between the first smart-home device and the user account by establishing wireless communication between the first smart-home device and a computing device via a network provided by the first smart-home device, where the network may be provided using the first wireless protocol. The network credentials may be provided by an application operating on a mobile computing device. The application may also be configured to determine a language for the second smart-home device based on a geographic location of the second smart-home device. The first smart-home device may create a data tunnel between a computing device using the first wireless protocol and the second hazard detecotor using the second wireless protocol. The first smart-home device may pass data between the computing device and the second smart-home device through the data tunnel. The application may also be configured to receive, by the computing device, a device code for the second smart-home device; and authenticate the computing device with the second smart-home device by sending the device code to the second smart-home device through the data tunnel. The application may additionally be configured to receive a pairing code from an account server; and transmit, to the first smart-home device, using the first wireless protocol pairing code for the second smart-home device. The pairing code may be sent from the first smart-home device to the second smart-home device using the second wireless protocol. The pairing code may allow the second smart-home device to pair with the user account at the account server. The application may also be configured to, prior to transmitting the network credentials to the first smart-home device, receive the network credentials from the first smart-home device.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 7F through 7I1-2 illustrate methods for pairing a smart hazard detector and an online management account from the perspective of a server, a user and a hazard detector, according to embodiments.

FIG. 7I illustrates a method for testing the network connectivity of hazard detectors, according to an embodiment.

DETAILED DESCRIPTION OF THE INVENTION

Figure 1:
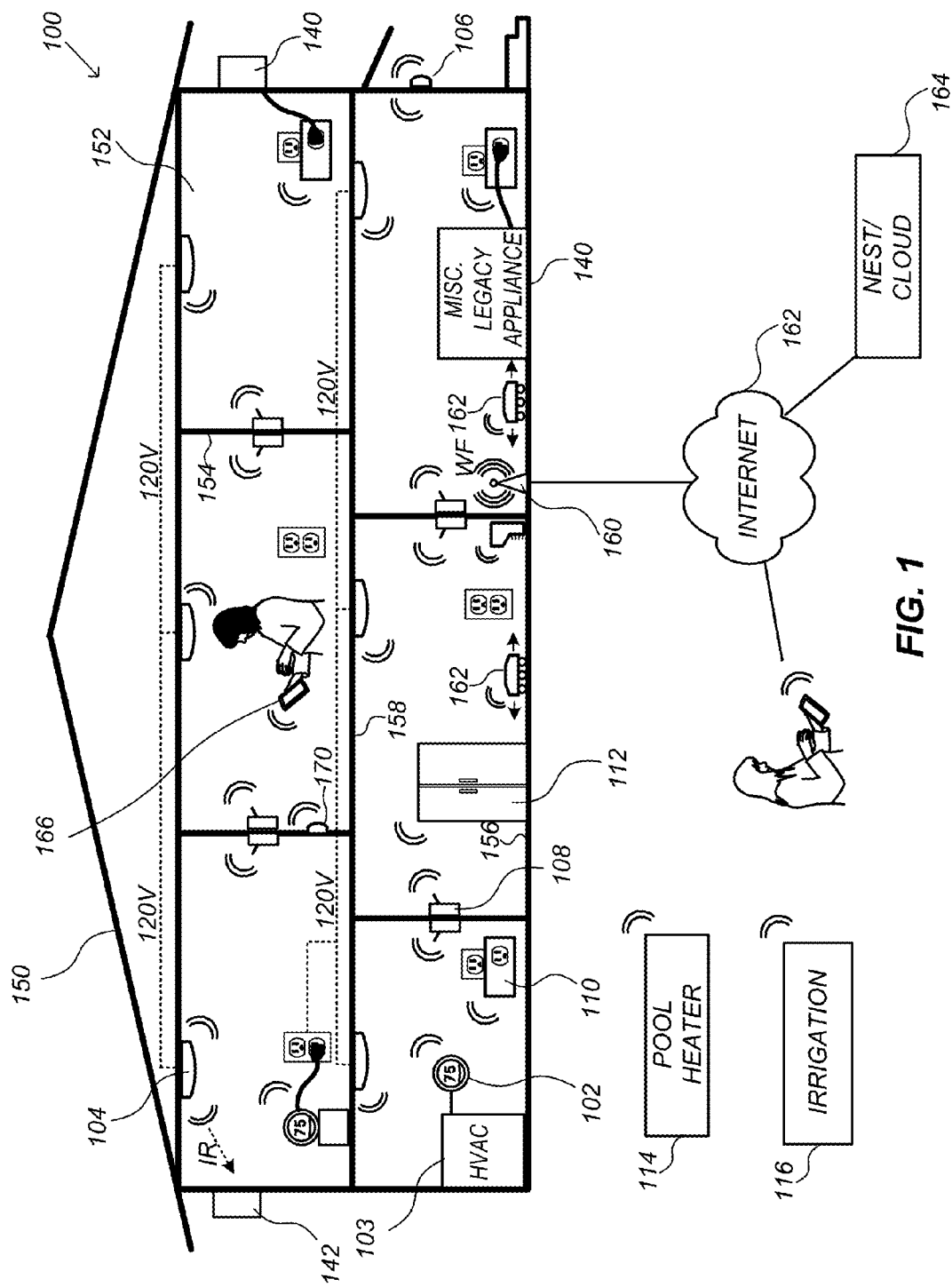
FIG. 1 is an example of a smart-home environment within which one or more of the devices, methods, systems, services, and/or computer program products described further herein will be applicable, according to an embodiment.

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Provided according to one or more embodiments are methods and systems for setting up, pairing, controlling, and/or programming one or more of intelligent, network-connected, multi-sensing hazard detection units or smart hazard detectors. These smart hazard detectors may be configured and adapted to be implemented in a smart home environment, seamlessly interacting with other devices in the smart home environment. The term "smart hazard detector" is used herein to represent a particular type of device that can be used for detecting hazards occurring within a structure, e.g., a home, an office or another structure. However, in accordance with the present teachings, this smart hazard detector may also be capable of controlling other devices, detecting non-hazard related events (e.g., security related events), and/or working in cooperation with other devices to provide additional features to the smart home environment. While one or more of the preferred embodiments described herein may be particularly advantageous in the context of a combined smoke and CO alarm design for residential use, it is to be appreciated that the scope of the present teachings is not so limited, it being, for example, within the scope of the present teachings for certain embodiments of the smart hazard detectors of the present invention to detect measurable characteristics other than hazards (e.g., pressure, flow rate, height, position, velocity, acceleration, capacity, power, loudness, and brightness) and monitor and/or respond to one or more measurable characteristics of one or more physical systems.

It is to be appreciated that "smart home environments" may refer to smart environments for homes such as a single-family house, but the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more smart hazard detectors.

It is to be further appreciated that while the terms user, customer, installer, homeowner, occupant, guest, tenant, landlord, repair person, and the like may be used to refer to the person or persons who are interacting with the smart hazard detector or user interface in the context of some particularly advantageous situations described herein, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected hazard detection functionality described further herein may be particularly advantageous where the landlord holds the sole password and can control hazard detection via the hazard detection device—such identity should not be construed in the descriptions that follow as necessarily limiting the scope of the present teachings to those particular individuals having those particular identities.

Overview of Smart Home Device Capabilities

Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls.

Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices, that can integrate seamlessly with each other and/or with a central server or a cloud-computing system to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 104"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Still further, in some embodiments, the smart-home environment 100 of FIG. 1 includes a plurality of intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 112 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart wall switches 108, the smart wall plugs 110, and other devices of the smart-home environment 100 are modular and can be incorporated into older and new houses. For example, the devices are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information is then used to obtain data helpful for determining optimal times for watering, such data may include sun location information, temperature, due point, soil type of the land on which the home is located, etc.

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant can use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 makes inferences about which individuals live in the home and are therefore occupants and which devices 166 are associated with those individuals. As such, the smart-home environment "learns" who is an occupant and permits the devices 166 associated with those individuals to control the smart devices of the home.

In some embodiments, in addition to containing processing and sensing capabilities, each of the devices 102, 104, 106, 108, 110, 112, 114, and 116 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.). One particular type of protocol that may be particularly useful is an 802.15.4-based RF communication protocol that can accommodate low-power communications among battery operated devices, that further accommodates mesh networking among devices, and that further accommodates IPv6 routing and TCP/IP communications.

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a mesh network of spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able send messages across the entire smart-home environment 100 as well as over the Internet 162 to the central server or cloud-computing system 164. According to embodiments, the mesh network enables the central server or cloud-computing system 164 regularly receive data from all of the smart devices in the home, make inferences based on the data, and send commands back to one of the smart devices to accomplish some of the smart-home objectives descried herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to embodiments, the smart nightlight 170 includes a low-power wireless communication chip (e.g., ZigBee or other 802.15.4-based chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, the mesh network can be used to automatically turn on and off lights as a person transitions from room to room. For example, the low-powered and spokesman nodes (e.g., devices 102, 104, 106, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Further included and illustrated in the exemplary smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

Figure 2:
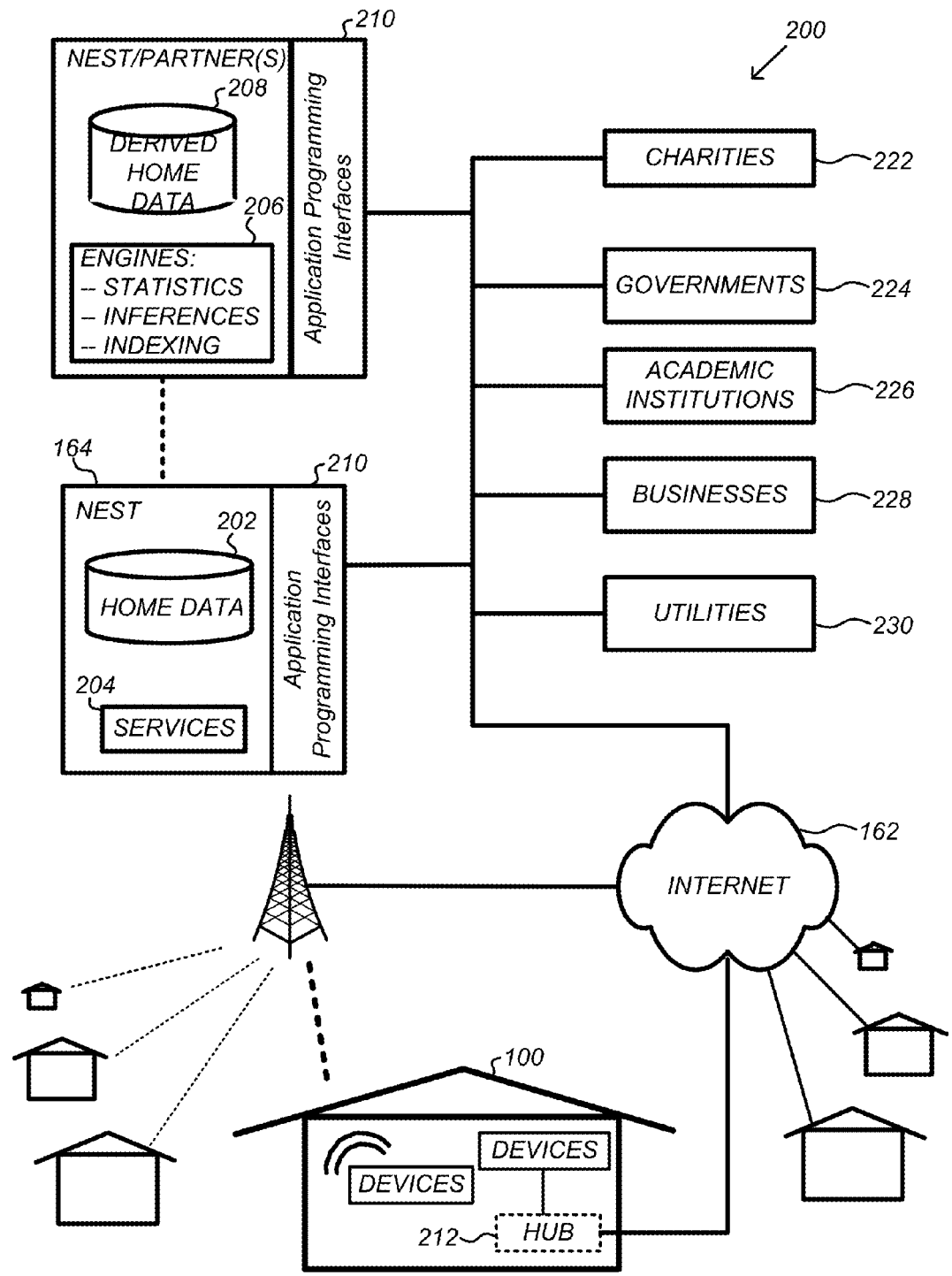
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the intelligent, network-connected devices 102, 104, 106, 108, 110, 112, 114, and 116 from FIG. 1 (identified simply as "smart devices" in FIGS. 2-3 herein) can communicate with the remote servers or cloud computing architectures 164. For example, a connection to the Internet 162 can be established either directly (for example, using 3G/4G connectivity to a wireless carrier), through a hubbed network 212 (which can be a scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world.

As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

Figure 3:
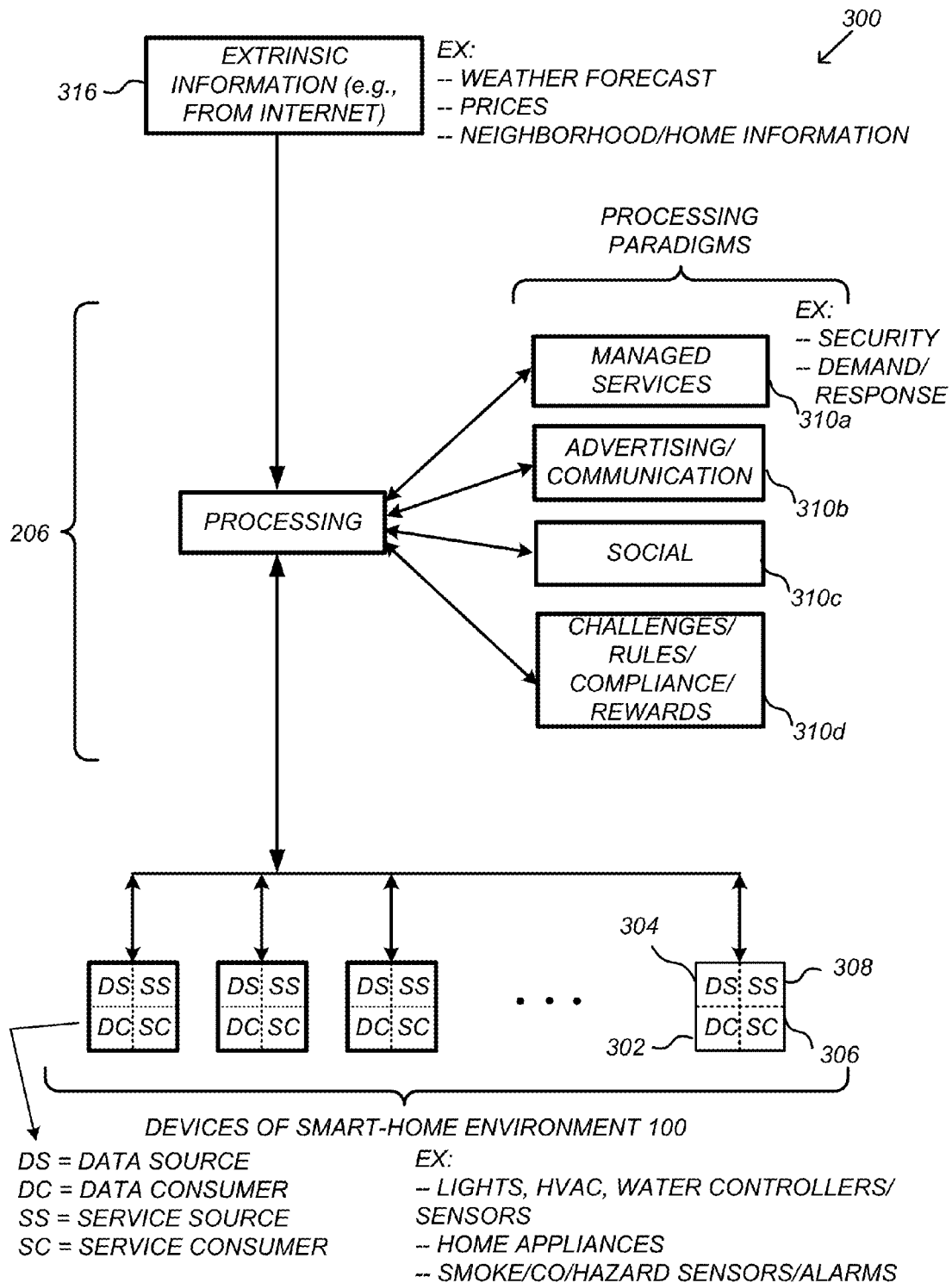
FIG. 3 illustrates an abstracted functional view of the extensible devices and services platform of FIG. 2, with reference to a processing engine as well as devices of the smart-home environment, according to an embodiment.

FIG. 3 illustrates an abstracted functional view of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

Overview of Smart Hazard Detector Architecture

Figure 4A:
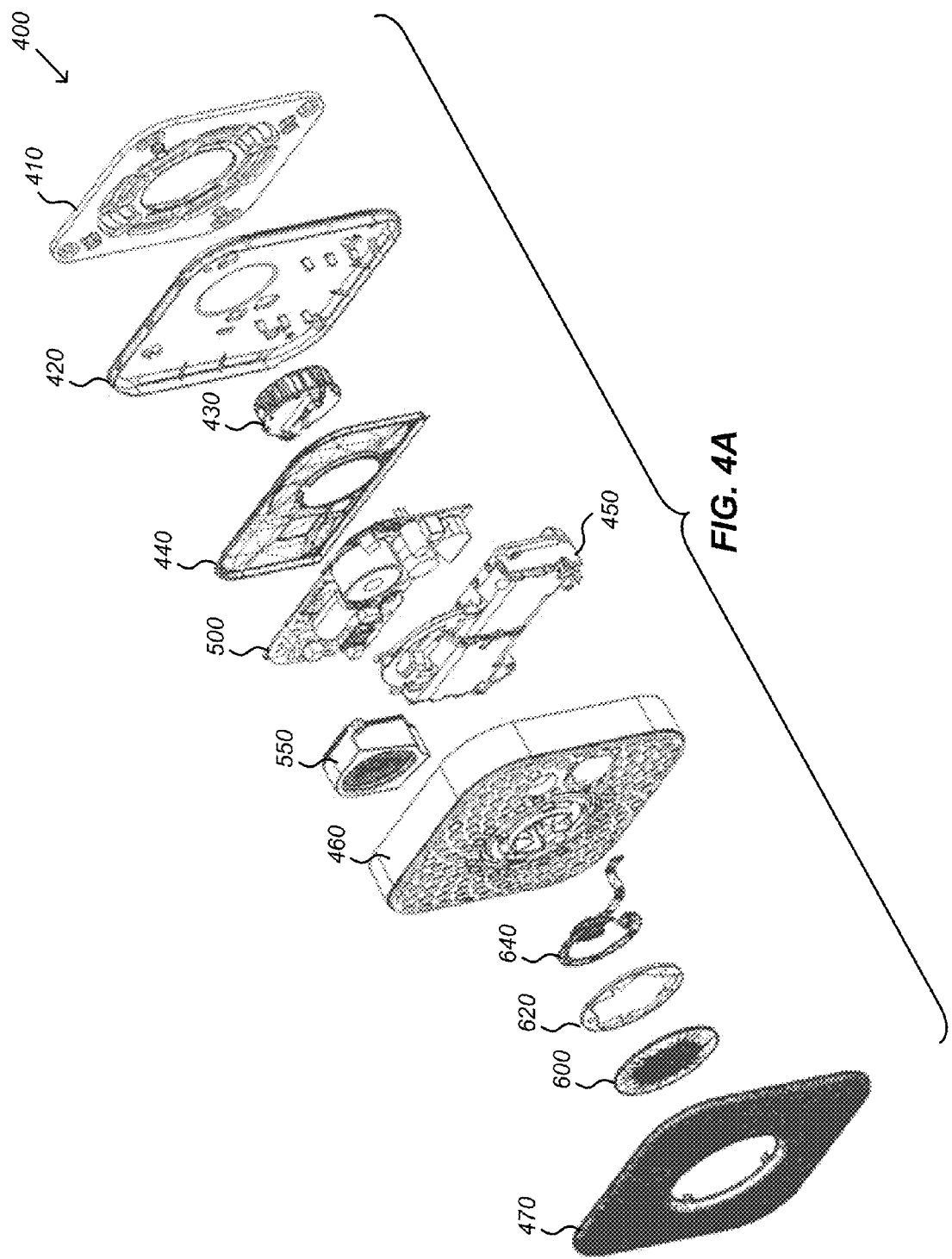
FIGS. 4A-4B illustrate perspective exploded and assembled views, respectively, of an intelligent, multi-sensing, network-connected hazard detector, according to an embodiment.
Figure 4B:
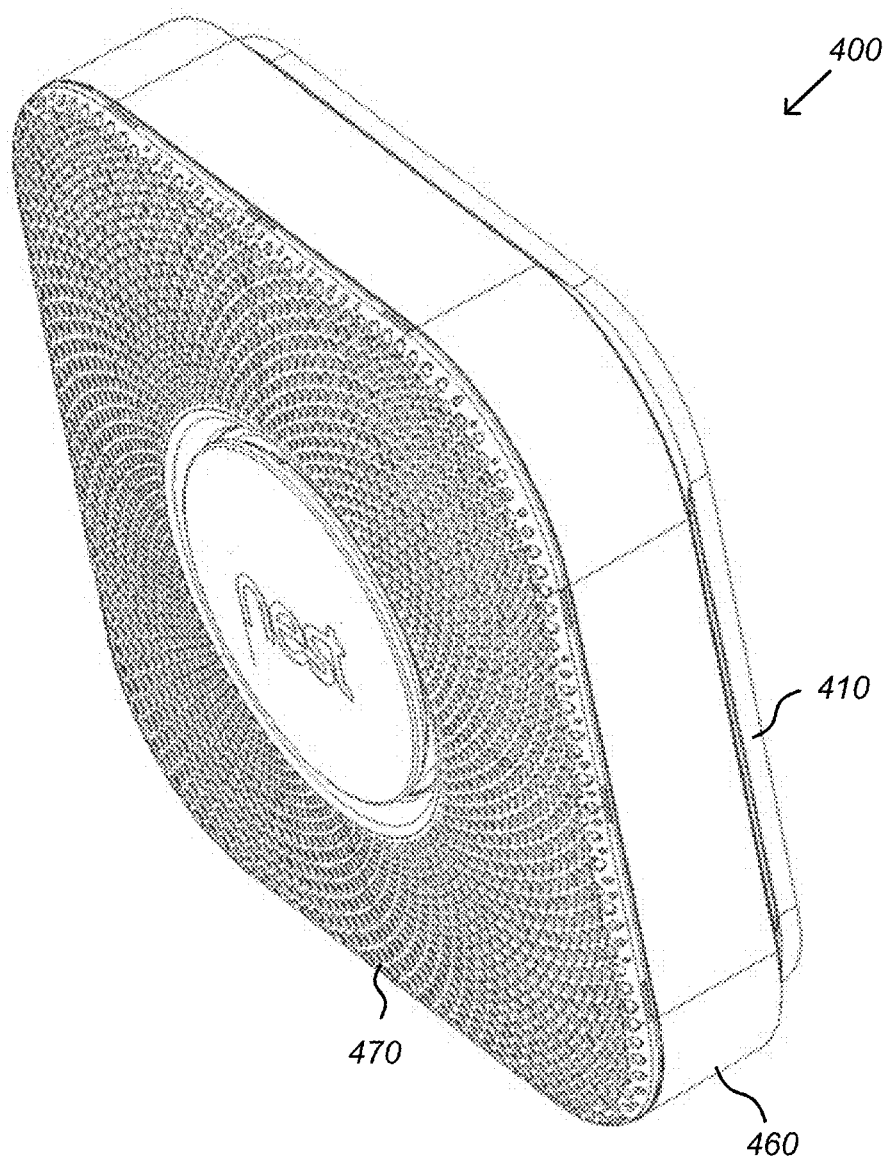

Referring now to FIG. 4A and FIG. 4B, illustrated is a hazard detector 400 that may be used as part of a smart home environment 100 as previously described. FIG. 4A illustrates an exploded perspective view of the hazard detector 400, while FIG. 4B illustrates an assembled view of the same hazard detector 400. In one embodiment, hazard detector 400 is a smoke detector that is configured to detect the presence of smoke and sound an alarm to audibly warn an occupant or occupants of the home or structure of a potential fire or other danger. In other embodiments, hazard detector 400 may be a carbon monoxide detector, heat detector, and the like. In one embodiment, hazard detector 400 is a multi-sensing detector that includes a smoke detector, carbon monoxide detector, heat detector, motion detector, and the like. Many of the present teachings are particularly advantageous for embodiments in which the hazard detector 400 is a multi-sensing detector, particularly since combining the various sensing modes together into a single device can pose substantial challenges with respect to one or more of device compactness, component powering, and overall component governance and coordination.

For convenience in describing the embodiments herein, the device 400 will be referred to hereinbelow as smart hazard detector or hazard detector 400, although it should be realized that hazard detector 400 may include various other devices and that the scope of the present teachings is not necessarily limited to hazard detectors in which smoke is required as one of the anomalies to be detected. Thus, for example, depending on the particular context as would be apparent to a person skilled in the art upon reading the instant disclosure, one or more of the advantageous features and embodiments described herein may be readily applicable to a multifunctional hazard sensor that detects carbon monoxide and motion only, or pollen and motion only, or noise pollution and pollen only, and so forth. Nevertheless, the combining of smoke detection functionality with other sensing functions does bring about one or more particularly problematic issues that are addressed by one or more of the present teachings.

In one embodiment, hazard detector 400 is a roughly square or rectangular shaped object having a width of approximately 120 to 134 mm and a thickness of approximately 38 mm. Stated differently, hazard detector 400 is a multi-sensing unit having a fairly compact shape and size that may be easily attached to a wall or ceiling of a home or structure so as to be able, among other functionalities, to detect the presence of smoke and alert an occupant therein of the potential fire danger. As shown in FIG. 4A, hazard detector 400 includes a mounting plate 410 that may be attached to a wall of the building or structure to secure the hazard detector 400 thereto. Hazard detector 400 also includes a back plate 420 that may be mounted to the mounting plate 410 and a front casing 460 that may be coupled with or otherwise secured to back plate 420 to define a housing having an interior region within which components of the hazard detector 400 are contained. A circuit board 500 may be coupled with or attached to back plate 420. Various components may be mounted on circuit board 500. For example, a smoke chamber 430 may be coupled with or mounted on circuit board 500 and configured to detect the presence of smoke. In one embodiment, smoke chamber 430 may be mid-mounted relative to circuit board 500 so that air may flow into smoke chamber 430 from a position above circuit board 500 and below circuit board 500. A speaker 550 and alarm device (not numbered) may also be mounted on circuit board 500 to audibly warn an occupant of a potential fire danger when the presence of smoke is detected via smoke chamber 430. Other components, such as a motion sensor, carbon monoxide sensor, microprocessor, and the like may likewise be mounted on circuit board 500 as described herein.

In one embodiment, a protective plate 440 may be attached to or otherwise coupled with circuit board 500 to provide a visually pleasing appearance to the inner components of hazard detector 400 and/or to funnel or direct airflow to smoke chamber 430. For example, when a user views the internal components of hazard detector 400, such as through vents in back plate 420, protective plate 440 may provide the appearance of a relatively smooth surface and otherwise hide the components or circuitry of circuit board 500. Protective plate 440 may likewise function to direct a flow of air from the vents of back plate 420 toward smoke chamber 430 so as to facilitate air flow into and out of smoke chamber 430.

Hazard detector 400 may also include a battery pack 450 that is configured to provide power to the various components of hazard detector 400 when hazard detector 400 is not coupled with an external power source, such as a 120 V power source of the home or structure. In some embodiments, a cover plate 470 may be coupled with the front casing 460 to provide a visually pleasing appearance to hazard detector 400 and/or for other functional purposes. In a specific embodiment, cover plate 470 may include a plurality of holes or openings that allow one or more sensors coupled with circuit board 500 to view or see through a surface of cover plate 470 so as to sense objects external to hazard detector 400. The plurality of openings of cover plate 470 may be arranged to provide a visually pleasing appearance when viewed by occupants of the home or structure. In one embodiment, the plurality of openings of cover plate 470 may be arranged according to a repeating pattern, such as a Fibonacci or other sequence.

A lens button 600 may be coupled with or otherwise mounted to cover plate 470. Lens button 600 may allow one or more sensors to view through the lens button 600 for various purposes. For example, in one embodiment a passive IR sensor (not shown) may be positioned behind the lens button 600 and configured to view through the lens button 600 to detect the presence of an occupant or occupants within the home or structure. In some embodiments, lens button 600 may also function as a button that is pressable by a user to input various commands to hazard detector 400, such as to shut off an alarm that is triggered in response to a false or otherwise harmless condition. Positioned distally behind lens button 600 may be a light ring 620 that is configured to receive light, such as from an LED or another light emitting element, and disperse the light within ring 620 to provide a desired visual appearance, such as a halo behind lens button 600. Positioned distally behind light ring 620 may be a flexible circuit board 640 that includes one or more electrical components, such as a passive IR sensor (hereinafter PIR sensor), LEDs, and the like. Flexible circuit board 640 (hereinafter flex ring 640) may be electrically coupled with circuit board 500 to communicate and/or receive instructions from one or more microprocessors mounted on a circuit board (not shown) during operation of hazard detector 400. Additional details of the components of hazard detector 400 are described in FIGS. 5A-D and 6A-F.

FIG. 4B illustrates hazard detector 400 with the various components assembled. Specifically, this figure shows the mounting plate 410, front casing 460, back plate 420, and cover plate 470 in an assembled configuration with the various other components contained within an interior space of hazard detector 400. This figure also shows the plurality of holes or openings of cover plate 470 forming a visually pleasing design that is viewable by occupant of a room within which the hazard detector 400 is mounted. The lens button 600 is shown attached to the hazard detector 400 so as to be centrally positioned with respect to cover plate 470. As briefly described, light ring 620 may be used to provide a halo appearance of light around and behind lens button 600. The assembled hazard detector 400 provides a compact yet multifunctional device.

Figure 5A:
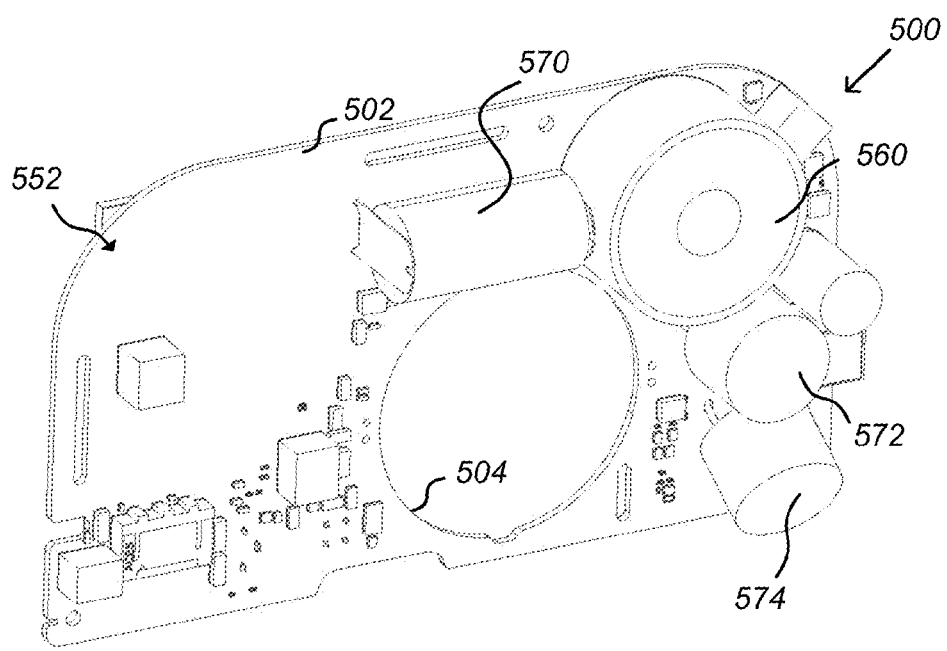
FIGS. 5A-5B illustrate front and rear perspective views of a circuit board of the hazard detector of FIGS. 4A-4B, according to an embodiment.
Figure 5B:
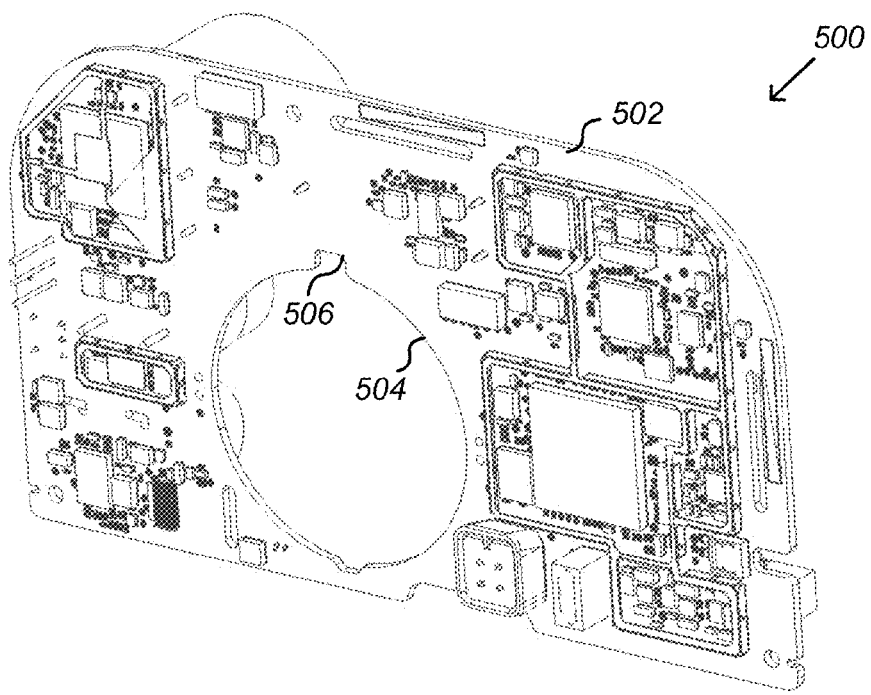

Referring now to FIG. 5A and FIG. 5B, illustrated are front and rear perspective views of circuit board 500. Circuit board 500 includes a main body 502 having a front side or surface and a rear side or surface. As described herein, various electrical components are mounted on circuit board 500. In some embodiments, these components may be mounted on the front surface of circuit board 500, on the rear surface of circuit board 500 opposite the front surface, or on both surfaces of the circuit board 500. For example, in a specific embodiment one or more microprocessors and/or other processor related components may be mounted on the rear surface of circuit board 500 facing protective plate 440 while one or more functional components (e.g. an alarm device, CO detector, speaker, motion sensors, Wi-Fi device, Zigbee device, 802.15.4 device, and the like) are mounted on a front surface of circuit board 500 facing a room of the home or structure in which the hazard detector 400 is positioned. Other components may be mid-mounted relative to circuit board 500 so that opposing surfaces are positioned on opposing sides of the circuit board 500 as described herein.

As shown in FIG. 5A, in a specific embodiment the front surface of circuit board 500 may include a CO detector 570 that is configured to detect the presence of carbon monoxide gas and trigger an alarm device 560 if the carbon monoxide gas levels are determined to be too high. The alarm device 560 (which can be a piezoelectric buzzer having an intentionally shrill or jarring sound) may likewise be mounted on the front surface of circuit board 500 so as to face an occupant of the room in which the hazard detector 400 is positioned to alarm the occupant of a potential danger. Alarm device 560 may be configured to produce one or more sounds or signals to alert the occupant of the potential danger. The front surface may further include an area 552 in which a speaker 550 is positioned. Speaker 550 may be configured to provide audible warnings or messages to the occupant of the room. For example, speaker 550 may alert the occupant of a potential danger and instruct the occupant to exit the room. In some embodiments, speaker 550 may provide specific instructions to the occupant, such as an exit route to use when exiting the room and/or home or structure. Other messages may likewise be communicated to the occupant, such as to alert the occupant that the batteries are low, that CO levels are relatively high in the room, that hazard detector 400 needs periodic cleaning, or alert the occupant of any other abnormalities or issues related to hazard detector 400 or components thereof.

Circuit board 500 may also include one or more motion sensors mounted on the front surface thereof. The motion sensors may be used to determine the presence of an individual within a room or surrounding area of hazard detector 400. This information may be used to change the functionality of hazard detector 400 and/or one or more other devices connected in a common network as described previously. For example, this information may be relayed to a smart thermostat to inform the thermostat that occupants of the home or structure are present so that the smart thermostat may condition the home or structure according to one or more learned or programmed settings. Hazard detector 400 may likewise use this information for one or more purposes, such as to quiet the alarm device (e.g. gesture hush) as described herein or for various other reasons.

In one embodiment, a first ultrasonic sensor 572 and a second ultrasonic sensor 574 may be mounted on the front surface of circuit board 500. The two ultrasonic sensors, 572 and 574, may be offset axially so as to point in slightly different directions. In this orientation, each ultrasonic sensor may be used to detect the motion of an individual based on an orientation of the hazard detector 400 relative to the room and/or occupant. Detecting the motion of the individual may be used to quiet the alarm device as described herein (i.e., gesture hush) or for any other reason. In one embodiment, an axis of the first ultrasonic sensor 572 may be oriented substantially outward relative to hazard detector 400 while an axis of the second ultrasonic sensor 574 is oriented at an angle relative to the axis of first ultrasonic sensor 572. The first ultrasonic sensor 572 may sense motion of an individual when the hazard detector 400 is mounted on a ceiling of the home or structure. Because the first ultrasonic sensor 572 is oriented substantially outward relative to hazard detector 400, the first ultrasonic sensor 572 essentially looks straight down on individuals beneath hazard detector 400. The second ultrasonic sensor 574 may similarly sense motion of the individual when the hazard detector 400 is mounted on a wall of the home or structure. Because the second ultrasonic sensor 574 is oriented at an angle relative to the first ultrasonic sensor 572 and hazard detector 400, the second ultrasonic sensor essentially looks downward toward the floor when the hazard detector 400 is mounted on a wall of the home or structure, rather than looking directly outward as first ultrasonic sensor 572. In one embodiment, the angular offset of the two ultrasonic sensors may be approximately 30° or any other desired value.

As shown in FIGS. 5A and 5B, body 502 of circuit board 500 also includes a substantially centrally located aperture 504 through which smoke chamber 430 is inserted so as to mid-mount the smoke chamber 430 relative to circuit board 500. Aperture 504 may also include a pair of notches 506 through which wires are inserted to electrically couple the smoke chamber 430 with circuit board 500. As previously described, mid-mounting of the smoke chamber 430 through an aperture 504 allows smoke and air to enter smoke chamber 430 from both the front surface or side of circuit board 500 and the rear surface or side of circuit board 500. Various aspects of the electrical components on the circuit board 500 are now described, the positions thereon of many of which will be apparent to the skilled reader in view of the descriptions herein and FIGS. 5A-5B. Included on the circuit board 500 can be several components, including a system processor, relatively high-power wireless communications circuitry and antenna, relatively low-power wireless communications circuitry and antenna, non-volatile memory, audio speaker 550, one or more interface sensors, a safety processor, safety sensors, alarm device 560, a power source, and powering circuitry. The components are operative to provide failsafe safety detection features and user interface features using circuit topology and power budgeting methods that minimize power consumption. According to one preferred embodiment, a bifurcated or hybrid processor circuit topology is used for handling the various features of the hazard detector 400, wherein the safety processor is a relatively small, relatively lean processor that is dedicated to core safety sensor governance and core alarming functionality as would be provided on a conventional smoke/CO alarm, and wherein the system processor is a relatively larger, relatively higher-powered processor that is dedicated to more advanced features such as cloud communications, user interface features, occupancy and other advanced environmental tracking features, and more generally any other task that would not be considered a "core" or "conventional" safety sensing and alarming task.

By way of example and not by way of limitation, the safety processor may be a Freescale KL15 microcontroller, while the system processor may be a Freescale K60 microcontroller. Preferably, the safety processor is programmed and configured such that it is capable of operating and performing its core safety-related duties regardless of the status or state of the system processor. Thus, for example, even if the system processor is not available or is otherwise incapable of performing any functions, the safety processor will continue to perform its core safety-related tasks such that the hazard detector 400 still meets all industry and/or government safety standards that are required for the smoke, CO, and/or other safety-related monitoring for which the hazard detector 400 is offered (provided, of course, that there is sufficient electrical power available for the safety processor to operate). The system processor, on the other hand, performs what might be called "optional" or "advanced" functions that are overlaid onto the functionality of the safety processor, where "optional" or "advanced" refers to tasks that are not specifically required for compliance with industry and/or governmental safety standards. Thus, although the system processor is designed to interoperate with the safety processor in a manner that can improve the overall performance, feature set, and/or functionality of the hazard detector 400, its operation is not required in order for the hazard detector 400 to meet core safety-related industry and/or government safety standards. Being generally a larger and more capable processor than the safety processor, the system processor will generally consume more power than the safety processor when both are active.

Similarly, when both processors are inactive, the system processor will still consume more power than the safety processor. The system processor can be operative to process user interface features and monitor interface sensors (such as occupancy sensors, audio sensors, cameras, etc., which are not directly related to core safety sensing). For example, the system processor can direct wireless data traffic on both high and low power wireless communications circuitry, access non-volatile memory, communicate with the safety processor, and cause audio to be emitted from speaker 550. As another example, the system processor can monitor interface sensors to determine whether any actions need to be taken (e.g., shut off a blaring alarm in response to a user detected action to hush the alarm). The safety processor can be operative to handle core safety related tasks of the hazard detector 400. The safety processor can poll safety sensors (e.g., smoke, CO) and activate alarm device 560 when one or more of safety sensors indicate a hazard event is detected. The safety processor can operate independently of the system processor and can activate alarm device 560 regardless of what state the system processor is in. For example, if the system processor is performing an active function (e.g., performing a Wi-Fi update) or is shut down due to power constraints, the safety processor can still activate alarm device 560 when a hazard event is detected.

In some embodiments, the software running on the safety processor may be permanently fixed and may never be updated via a software or firmware update after the hazard detector 400 leaves the factory. Compared to the system processor, the safety processor is a less power consuming processor. Using the safety processor to monitor the safety sensors, as opposed to using the system processor to do this, can yield power savings because safety processor may be constantly monitoring the safety sensors. If the system processor were to constantly monitor the safety sensors, power savings may not be realized. In addition to the power savings realized by using safety processor for monitoring the safety sensors, bifurcating the processors can also ensure that the safety features of the hazard detector 400 always work, regardless of whether the higher level user interface works. The relatively high power wireless communications circuitry can be, for example, a Wi-Fi module capable of communicating according to any of the 802.11 protocols.

By way of example, the relatively high power wireless communications circuitry may be implemented using a Broadcom BCM43362 Wi-Fi module. The relatively low power wireless communications circuitry can be a low power Wireless Personal Area Network (6LoWPAN) module or a ZigBee module capable of communicating according to an 802.15.4 protocol. For example, in one embodiment, the relatively low power wireless communications circuitry may be implemented using an Ember EM357 6LoWPAN module. The non-volatile memory can be any suitable permanent memory storage such as, for example, NAND Flash, a hard disk drive, NOR, ROM, or phase change memory. In one embodiment, the non-volatile memory can store audio clips that can be played back using the speaker 550. The audio clips can include installation instructions or warnings in one or more languages. The interface sensors can includes sensors that are monitored by the system processor, while the safety sensors can include sensors that are monitored by the safety processor. Sensors 220 and 232 can be mounted to a printed circuit board (e.g., the same board processor 210 and 230 are mounted to), a flexible printed circuit board, a housing of system 205, or a combination thereof.

The interface sensors can include, for example, an ambient light sensor (ALS) (such as can be implemented using a discrete photodiode), a passive infrared (PIR) motion sensor (such as can be implemented using an Excelitas PYQ1348 module), and one or more ultrasonic sensors (such as can be implemented using one or more Manorshi MS-P1640H12TR modules). The safety sensors can include, for example, the smoke detection chamber 430 (which can employ, for example, an Excelitas IR module), the CO detection module 570 (which can employ, for example, a Figaro TGS5342 sensor), and a temperature and humidity sensor (which can employ, for example, a Sensirion SHT20 module). The power source can supply power to enable operation of the hazard detector and can include any suitable source of energy. Embodiments discussed herein can include AC line power, battery power, a combination of AC line power with a battery backup, and externally supplied DC power (e.g., USB supplied power). Embodiments that use AC line power, AC line power with battery backup, or externally supplied DC power may be subject to different power conservation constraints than battery only embodiments.

Preferably, battery-only powered embodiments are designed to manage power consumption of a finite energy supply such that hazard detector 400 operates for a minimum period of time of at least seven (7), eight (8), nine (9), or ten (10) years. Line powered embodiments are not as constrained. Line powered with battery backup embodiments may employ power conservation methods to prolong the life of the backup battery. In battery-only embodiments, the power source can include one or more batteries, such as the battery pack 450. The batteries can be constructed from different compositions (e.g., alkaline or lithium iron disulfide) and different end-user configurations (e.g., permanent, user replaceable, or non-user replaceable) can be used. In one embodiment, six cells of Li—FeS$_2$ can be arranged in two stacks of three. Such an arrangement can yield about 27000 mWh of total available power for the hazard detector 400.

Figure 5C:
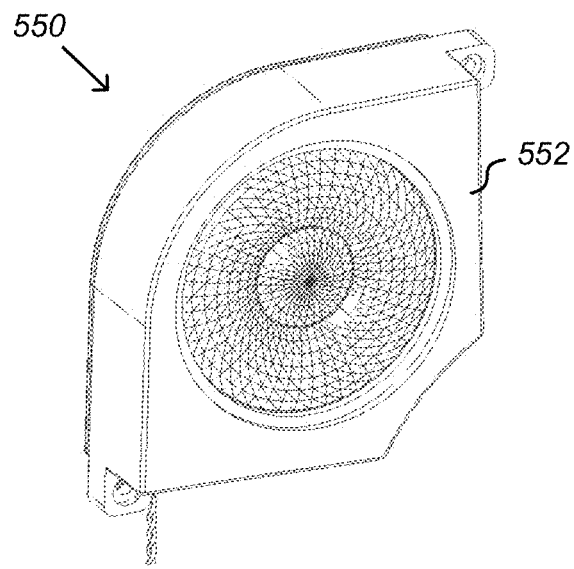
FIGS. 5C-5D illustrate front and rear perspective views of a speaker that is mountable on the circuit board of the hazard detector of FIGS. 9A-B, according to an embodiment.
Figure 5D:
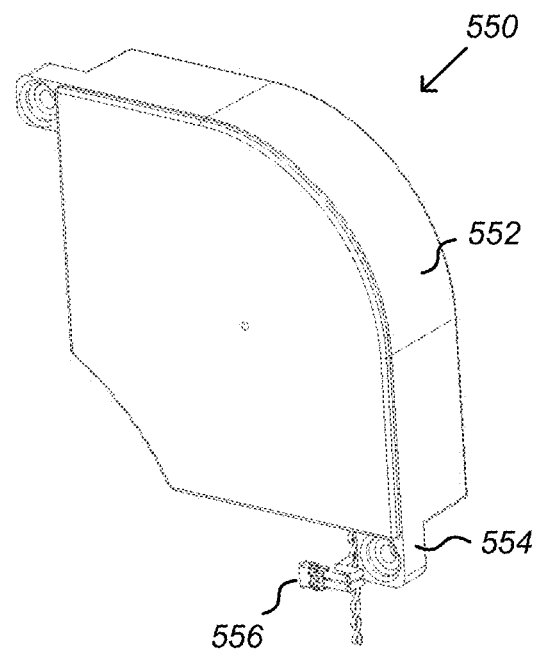

Referring now to FIGS. 5C and 5D, illustrated are front and rear perspective views of a speaker 550 that is electrically coupled with circuit board 500 so as to receive instructions therefrom. Speaker 550 includes a speaker body 552 and one or more mounting flanges 554 that allow the speaker 550 to be coupled with or mounted on front casing 460. Speaker 550 also includes a plug 556 or other mounting component that allows the speaker 550 to be electrically coupled with circuit board 500. As previously described, speaker 550 may be used to audibly alert an occupant of a room within which hazard detector 400 is positioned, or to provide other messages to the occupant of the room. For example, speaker 550 may be used to alert a firefighter or other rescuer regarding the occupants remaining in the home or structure after a fire or other danger is detected or may be used to inform an occupant of a safest route out of the home or structure.

Figure 6A:
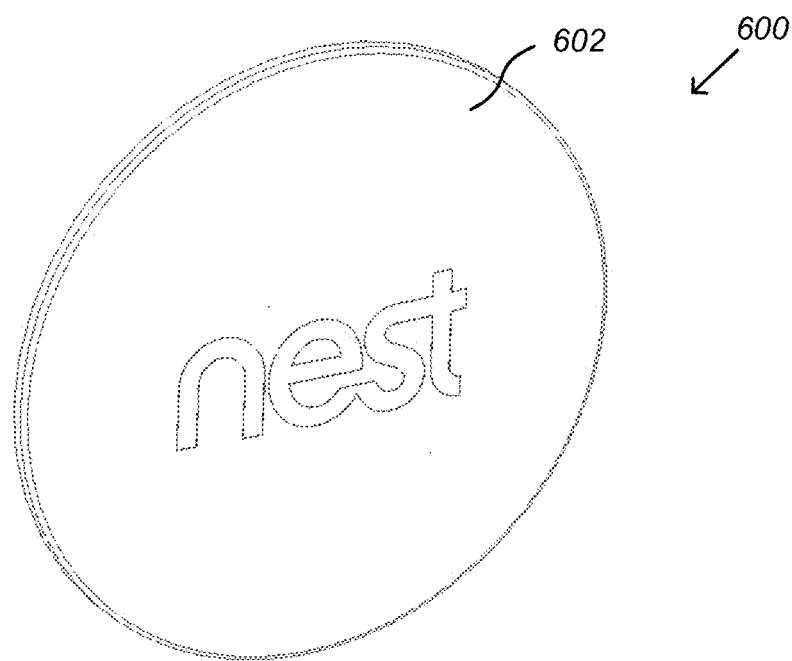
FIGS. 6A-6B illustrate front and rear perspective views of a lens button of the hazard detector of FIGS. 4A-4B, according to an embodiment.
Figure 6B:
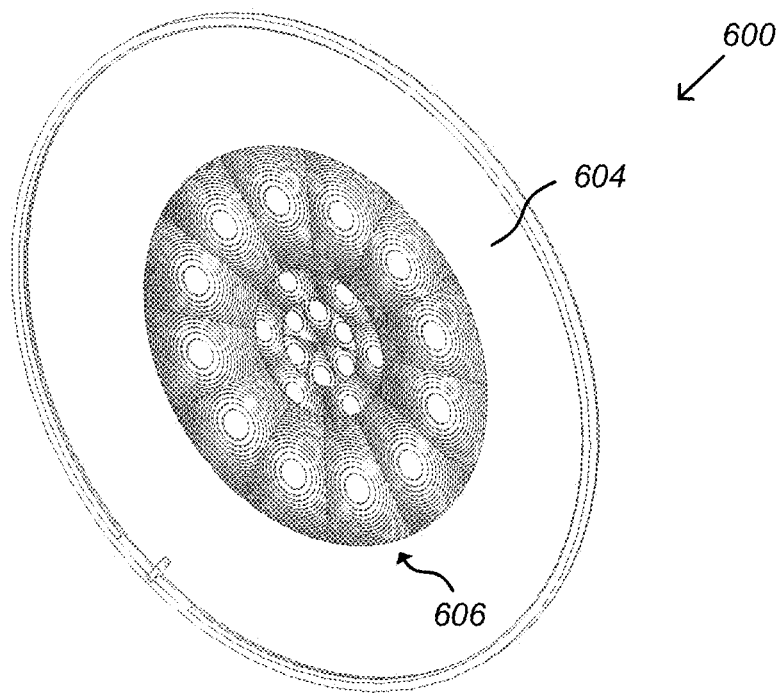

Referring now to FIGS. 6A and 6B, illustrated are front and rear perspective views of a lens button 600. Lens button 600 includes a front surface 602 and a rear surface 604. Lens button 600 is configured to be coupled with front casing 460 by attaching lens button 600 to light ring 620, and coupling light ring 620 to a surface portion of front casing 460, as shown in FIG. 4B. Lens button 600 is configured to be pressed by a user to provide input to hazard detector 400 and/or for various other purposes, such as quieting an alarm device. Lens button 600 is further configured to be transparent to one or more sensors positioned behind lens button 600. For example, in one embodiment, a PIR sensor is positioned behind lens button 600. The PIR sensor is able to view external objects through lens button 600 to determine if an occupant is present within a room in which hazard detector 400 is positioned.

The rear surface 604 of lens button 600 may have a Fresnel lens pattern 606 that allows the PIR sensor, or another sensor, positioned behind lens button 600 to view far into the room in which hazard detector 400 is positioned. In one embodiment, Fresnel lens pattern 606 may include a plurality of concentrically arranged rings that each provides a slightly different viewing cone. Each concentrically arranged ring may provide a progressively larger viewing area or cone than rings concentrically arranged and located radially closer to a central axis of lens button 600. In one embodiment, an internal angle of the viewing cones provided by Fresnel lens pattern 606 may vary from between about 15° and about 150° so as to provide a viewing radius on a floor or wall positioned directly in front of the hazard detector 400 at a distance of approximately 10 feet or between about 0.5 m and about 8.8 m. In this manner, the PIR sensor, or other sensor, positioned behind lens button 600 may easily detect the presence of an occupant within a room in which hazard detector 400 is positioned.

Figure 6C:
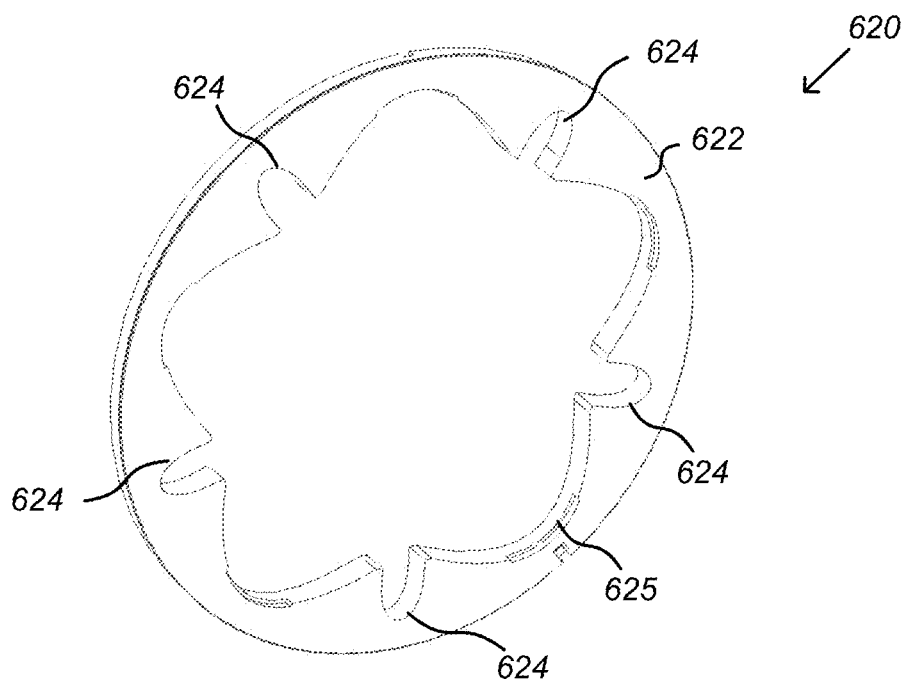
FIGS. 6C-6D illustrate front and rear perspective views of a light guide of the hazard detector of FIGS. 4A-4B, according to an embodiment.
Figure 6D:
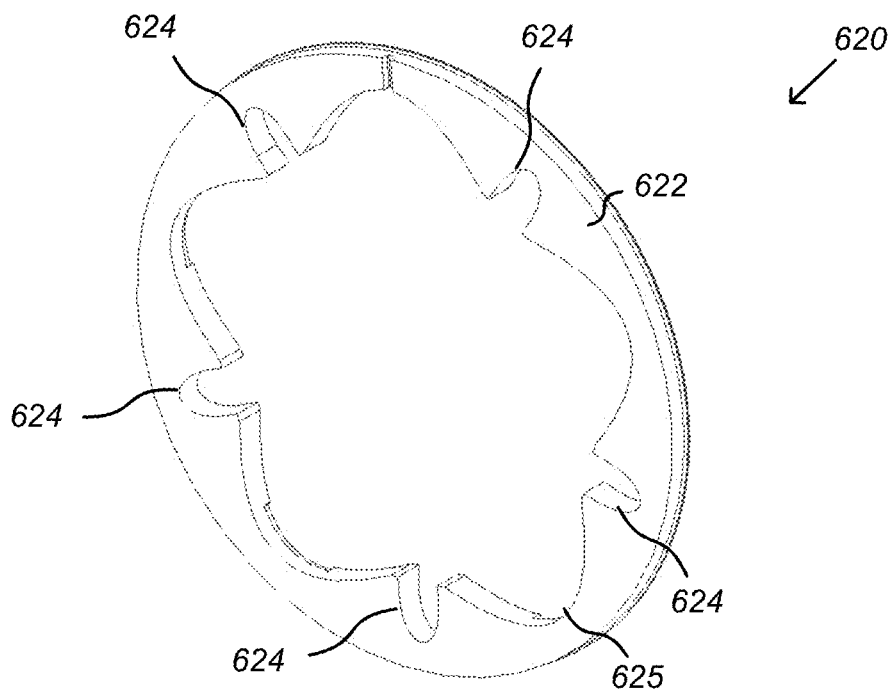

Referring now to FIGS. 6C and 6D, illustrated are front and rear perspective views of a light ring 620 that may be used to disperse light provided by an LED or other light source so as to provide a halo effect behind and around lens button 600. Light ring 620 includes a body portion 622 and may be coupled with lens button 600 via adhesive bonding or any other method known in the art. In turn, light ring 620 may be coupled with front casing 460 such as by orienting light ring 620 with respect to a surface of front casing 460 and pressing light ring 620 axially downward relative to front casing 460 so that recessed portions 625 of light ring 620 mate and couple with tabs (not shown) of front casing 460. These tabs may fit over the recessed portions 625 of light ring 620 and secure light ring 620 adjacent a surface of front casing 460. Light ring 620 also includes a plurality of second recesses 624 within which an LED (not shown) or other light source may be positioned to illuminate light ring 620. In operation, light ring 620 disperses light provided by the LED or other light source to provide a halo effect behind and around lens button 600.

Figure 6E:
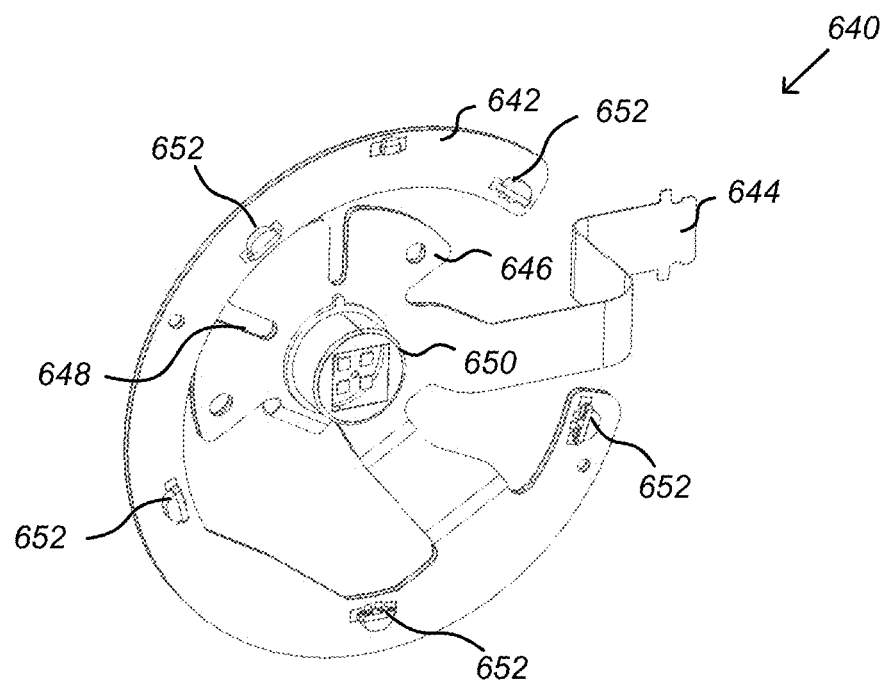
FIGS. 6E-6F illustrate front and rear perspective views of a flexible strip of the hazard detector of FIGS. 4A-4B, according to an embodiment.
Figure 6F:
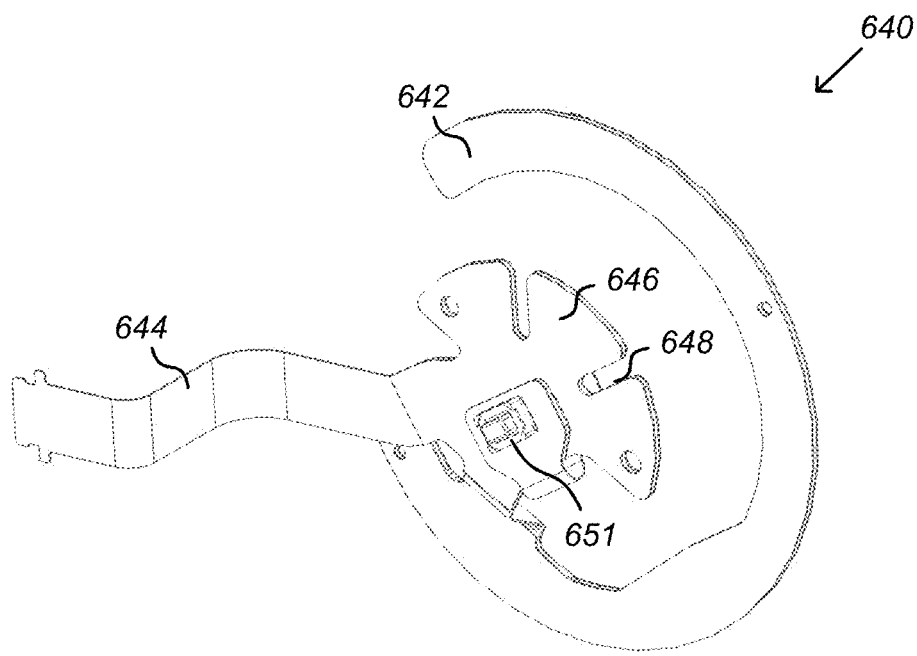

Referring now to FIGS. 6E and 6F, illustrated are front and rear perspective views of a flexible circuit board or flex ring 640 that may electrically couple components positioned in front of circuit board 500, such as lens button 600, with circuit board 500. Flex ring 640 includes a tail end or ribbon 644 that may be insertable into a component of circuit board 500 to electrically couple lens button 600, light ring 620, and/or one or more components with circuit board 500. Flex ring 640 also includes a central portion that may include a PIR sensor 650 that is positioned so as to be behind lens button 600. The central portion of flex ring 640 further includes a plurality of flanges 646 that mate with flanges (not shown) of front casing 460 so as to orient flex ring 640 relative to front casing 460 and/or couple flex ring 640 therewith. Specifically, a channel 648 between flanges 646 may fit around flanges (not shown) of front casing 460 to orient and couple flex ring 640 with front casing 460. Flex ring 640 further includes a circumferentially arranged ring portion 642 having a plurality of LED lights 652, or other source of light, coupled therewith. The plurality of LED lights 652 are arranged so as to be insertable within recessed portions 624 of light ring 620. LED lights 652 illuminate light ring 620 as previously described. A bottom surface of the central portion of flex ring 640 includes a pressable button 651 that is actuated as lens button 600 is pressed by a user. In this manner, input is provided to the hazard detector 400 by the user as previously described.

As mentioned above, embodiments of the present invention, e.g., hazard detectors 104 and 400, may be paired with an online management account. This pairing may be accomplished during the setup process for a smart hazard detector. Examples of this setup process according to the present invention are discussed in the next section.

Smart Hazard Detector Setup

The discussion of FIGS. 1-6F above outlines numerous features and benefits of intelligent, network-connected, multi-sensing hazard detection units or smart hazard detectors of the present invention In order to achieve some of these benefits, smart hazard detectors may need to be "paired" with an online management account. For a smart-home device such as the intelligent network-connected hazard detector of the present teachings, an online management account is provided. The online management account can be associated with a particular user, a particular group of users, and/or a particular residence or structure. Without loss of generality, an online management account as described herein will be described as being associated with a user. The online management account can be provided by or on behalf of the manufacturer, retailer, or other business entity that sold or otherwise supplied the smart-home device to the user, or can be provided by their designee, privy, or some other entity. Without loss of generality, the online management account as described herein will be described as being provided by a service provider. The online management account can be associated strictly with the single type of smart-home device being set up, or alternatively can be associated with a set of related smart-home devices (sometimes termed an "ecosystem") that are offered to the user either separately or as a suite of products. The online management account generally comprises the collection of online data, metadata, and services that are necessary or advantageous to the operation of the smart-home device or ecosystem of smart-home devices. Without loss of generality, the online management account as described herein will be described as being associated with a cloud-based service provider with a "cloud server" that is accessible to the smart-home device over the Internet, and that is accessible to the user over the Internet through their computer browser, tablet, smartphone, wearable computing platform, or other data communications device. However, it is to be appreciated that the online management account can be provided in a variety of different implementations, with some or all of its functionality distributed across different platforms at different remote or local locations outside or inside the home, without departing from the scope of the present teachings. For a given service provider, the online management account for a particular user is often uniquely identified by an e-mail address for that user, although any of a variety of other unique naming schemes or conventions can be used. For a given smart-home device, the result of the pairing process is an association of that particular device (which can be uniquely identified among all other devices in the world by a MAC address or other unique identifier) with the online management account of the user. As mentioned above, this pairing is preferably accomplished in a manner that reduces or minimizes an amount of user effort involved. FIGS. 7A-7I in combination with FIGS. 8A-U illustrate examples of methods for pairing a smart hazard detector and an online management account from the perspective of a server (e.g., a computing instance or other computing entity of a cloud-based service provider), a user, and a hazard detector.

Before delving into a series of methods that can be carried out by the could server, the hazard detector, and the computing device, respectively, an overview of the pairing and provisioning process for registering a first harzard detector with the cloud server will be presented. It has been found that the setup and methods described herein provide a good balance among competing goals that are faced when designing such a system. On the one hand, it is desirable to make the user experience easy, robust, and pleasant, so they will be attracted to the product and will recommend it for use by others and will be repeat customers themselves. As such, it is desirable to minimize the number complexity of steps, the amount of technical jargon used, and the amount of information technology ("IT") expertise needed for a customer to achieve the installation and setup. On the other hand, in view of privacy concerns and worries about network intrusions, it is desirable to provide a setup method that is sufficiently secure in terms of authentication, encryption, resistance to hacking/spoofing, and overall network integrity. For places like apartment buildings where many networks can overlap in range, it is desirable to ensure that the user is actually setting up the hazard detector (or other smart-home device) that is in front of them, rather than someone else's device in a neighboring unit. It is further desirable to prevent unauthorized access to user home networks, user online accounts, and user data. It is further desirable to block attempted device spoofing attacks, to prevent leakage of user network credentials, to protect user entry keys, pairing codes, and passwords, and to ensure device authenticity. As a general principle, it is further desirable to minimize or avoid altogether the need to store keys and other sensitive information (Wi-Fi SSID and passwords, PAN network information, etc.) in the cloud or in a smart-home application running on the user's phone.

Figure 7A:
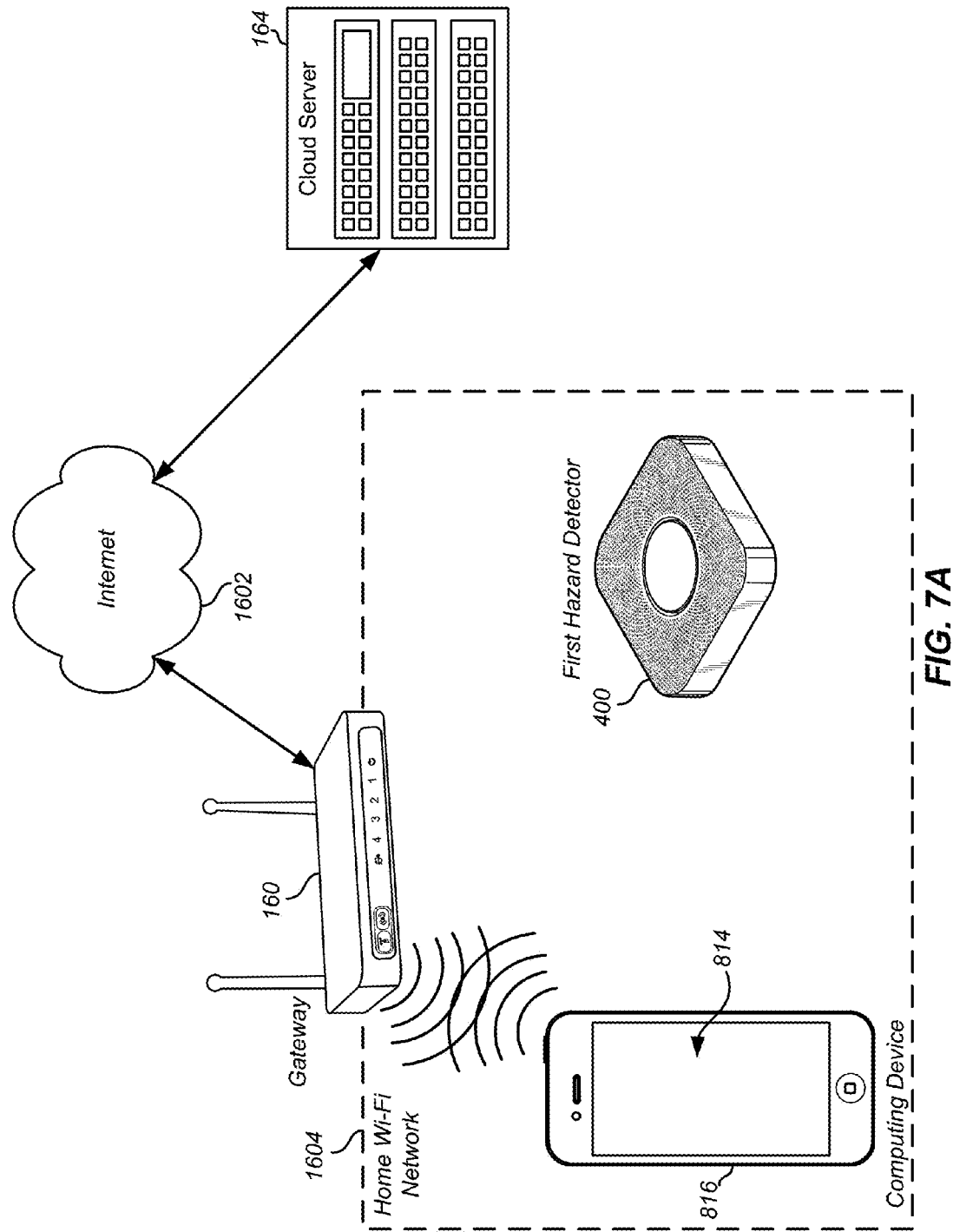
FIGS. 7A-7D illustrate system flow diagrams for provisioning and pairing a first hazard detector with a user account on a cloud server, according to some embodiments.

FIG. 7A illustrates a diagram of the various devices and systems that that may be utilized when provisioning and pairing a first harzard detector 400. In order to identify itself and communicate securely with the other devices and systems, the first hazard detector 400 may receive and store certain information during a manufacturing or post-manufacturing process. This information may be stored in a persistent memory inside the first hazard detector 400. In some embodiments, the first hazard detector 400 may receive cryptographic communication information, such as a private cryptographic key and/or a PKI certificate that can be used during the pairing and provisioning process to authenticate and/or secure communications between the first hazard detector 400 and the cloud server 164. In addition to the cryptographic information, the first hazard detector 400 may also have stored thereon additional information that identifies the first hazard detector 400 or information that will be used during the pairing and provisioning process. Such information may include a vendor code, a product code, a product revision, a manufacturing date, a serial number, a primary 802.15.4 MAC address, a primary 802.11 MAC address, a rendezvous Wi-Fi SSID, and a local pairing code. The vendor code, product code, product revision, manufacturing date, and/or serial number may be used to uniquely identify the first hazard detector 400. As described further below, the first hazard detector 400 may participate in at least two different types of wireless networks, namely a home Wi-Fi network 1604 that can use the primary 802.11 MAC address, and a local device network that can use the primary 802.15.4 MAC address. The rendezvous Wi-Fi SSID (or "temporary" Wi-Fi SSID) can be the SSID that is broadcast in situations when the first hazard detector 400 needs to establish its own access point and broadcast a temporary Wi-Fi network during the provisioning process. The local pairing code may comprise secret information known only to the first hazard detector 400. The local pairing code can be used to authenticate communications between a mobile computing device 816, such as a smart phone, and the first hazard detector 400 during the pairing and provisioning process as will be described below.

In some embodiments, the information described above, namely the vendor code, product code, product revision, manufacturing date, serial number, primary 802.15.4 Mac address, primary 802.11 Mac address, rendezvous Wi-Fi SSID, and/or local pairing code may be graphically encoded into a Quick Response (QR) code that is printed on the packaging of the first hazard detector 400 or on the back of the first hazard detector 400 itself. By encoding this information into a QR code, the provisioning and pairing process can be streamlined and made more user-friendly. Instead of having to manually enter in information that identifies the first hazard detector 400, the user can simply use their mobile computing device 816 to scan the QR code and thereby automatically read all information into an application 814 running on the mobile computing device 816. In some embodiments, the QR code may be replaced with a barcode, or any other graphical encoding of digital information. Note that some embodiments may also include some or all of this information described above printed in a text format (e.g. plain ASCII) on the packaging of the first hazard detector 400, on a sticker, and/or on the housing of the first hazard detector 400. A detailed discussion of reading the QR code and/or manually entering information is provided below in relation to FIGS. 8I-8J.

In one typical setup scenario, the user will unpackage the first hazard detector 400 and use the mobile computing device 816 to initiate and facilitate the pairing and provisioning process. The mobile computing device 816 may include a laptop computer, a desktop computer, a smart phone, a PDA, a tablet computer, a smart watch, smart eyewear (e.g., Google Glass®), and/or the like. To begin the process, a user may download an application or may visit a website provided by the service provider. The user will also be able to set up a user account with the cloud server 164 if such an account does not already exist. Within the application, the user may instruct the application to add a new smart-home device. In some embodiments, smart-home devices in addition to the first hazard detector 400 can use this same method and system for pairing and provisioning. The application 814 need not even know what type of device is being added at this stage of the process. Instead, the user can simply select an option such as "add a new device." In other embodiments, the user can specify that he/she is adding a new hazard detector specifically.

The mobile computing device 816 can communicate through the home Wi-Fi network 1604 provided by a router 160. The router 160 may be combined with a gateway or modem that connects the home Wi-Fi network 1604 with the Internet 1602. The application 814 can be installed with or updated to have knowledge of an Internet address for the cloud server 164. The mobile computing device 816 can then communicate through the Internet 1602 with the cloud server 164 and request information for pairing and provisioning a new smart home device, such as the first hazard detector 400.

In response to this request, the cloud server 164 can provide configuration information to the mobile computing device 816 for pairing and provisioning the first hazard detector 400. The configuration information can be used to pair the first hazard detector 400 with the user account of the cloud server 164 and to enable the first hazard detector 400 to establish/join a local device network that may include other smart-home devices. The configuration information may include a number of different types of data, such as a service node ID that acts as an identifier for the first hazard detector 400 during the pairing process. The configuration information may also include a user account identifier, which can uniquely and/or globally identify the user's account on the cloud server 164. The configuration information may also include a DNS hostname that identifies an Internet address for the first hazard detector 400 to use when "phoning home" to contact the cloud server 164 during the pairing process. The configuration information may also include an account pairing token that can be used to pair the first hazard detector 400 with the user account of the cloud server 164 when the first hazard detector 400 initially contacts the cloud server 164 as will be described below. The account pairing token may comprise an opaque token that is encrypted using a cryptographic key or key pair stored by the cloud server 164, such that the cloud server 164 can authenticate the first hazard detector 400 when contacted. The configuration information may also include local device network configuration information that allows the first hazard detector 402 establish/join a local device network, such as an 802.15.4 network.

Note that as described above, the configuration information transmitted from the cloud server 164 does not overlap with the information stored by the first hazard detector 400 during the manufacturing or post-manufacturing process and encoded in the QR code. These data have been segregated between the cloud server 164 and the first hazard detector 400 in order to balance the competing goals of network security and providing a pleasant user experience as described above. Other embodiments may store overlapping information as may be necessary.

In addition to downloading the configuration information from the cloud server 164, the mobile computing device 816 may instruct the user to unpackage the first hazard detector 400 and scan the QR code. In cases where the QR code cannot be scanned by the mobile computing device 816 (e.g. optically scanned using a smart phone camera), the user will be prompted to enter information into the application 814 such as the local pairing code, device serial number, and/or the like. User interfaces depicting this process are described in greater detail below. In some embodiments, the user will at least be instructed to enter the local pairing code for the first hazard detector 400 or information from which the local pairing code may be derived.

Figure 7B:
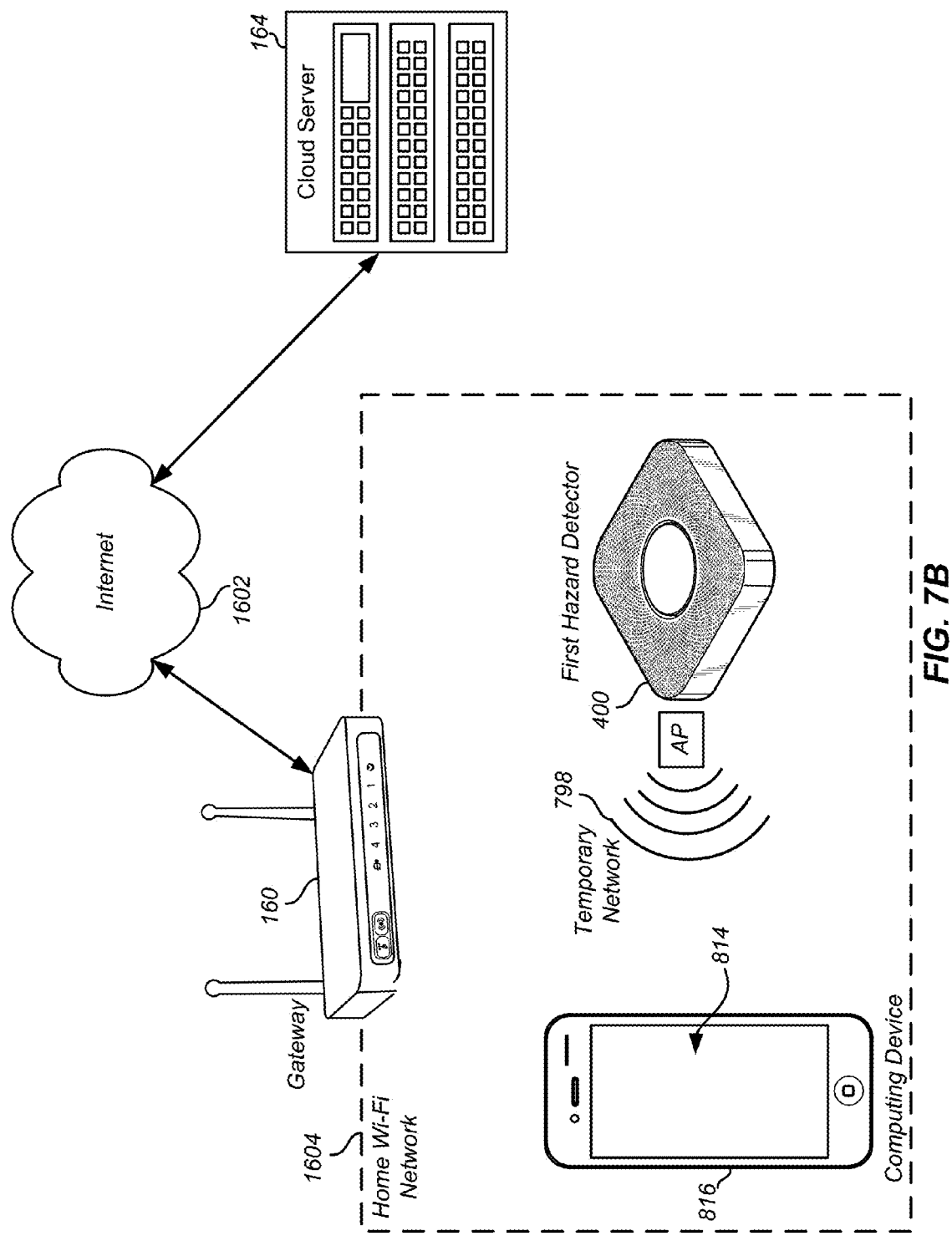

FIG. 7B illustrates how the first hazard detector 400 can be activated and used to generate a temporary Wi-Fi network 798, according to some embodiments. After scanning and/or manually entering information provided by the QR code and/or labeling/packaging of the first hazard detector 400, the application 814 may instruct the user to activate the first hazard detector 400. Activation may be accomplished by providing a user input to the first hazard detector 400. In one embodiment, the user input may include pushing a button on the first hazard detector 400. Other embodiments may include voice commands, removing a protective tab from a battery compartment in order to provide power to the first hazard detector 400, securing the first hazard detector 400 to a mounting plate, connecting the first hazard detector 402 a home power system, and/or the like. After activation, the first hazard detector 400 can boot up and perform various initialization routines. As will be described in greater detail below, the first hazard detector 400 may provide audio and/or visual indicators that let the user know the first hazard detector 400 has been activated. For example, the first hazard detector may include lights and/or verbal indications (e.g. "Hello").

After or during the boot up process, the first hazard detector 400 may establish a local Wi-Fi access point and begin broadcasting a temporary Wi-Fi network 798. The first hazard detector 400 does not know the SSID or password for the home Wi-Fi network 1604 at this stage of the pairing and provisioning process. Instead of requiring the user to manually plug the mobile computing device 816 into the first hazard detector 400, the first hazard detector 400 can generate the temporary Wi-Fi network 798, which can be detected and connected to by the mobile computing device 816. In some embodiments, scanning the QR code will provide the temporary (rendezvous) Wi-Fi SSID being broadcast by the first hazard detector 400 to the mobile computing device 816. The application 814 can then automatically switch from the home Wi-Fi network 1604 to the temporary Wi-Fi network 798. At the conclusion of the provisioning process, the application 814 can switch the network connection back to the home Wi-Fi network 1604 for the mobile computing device 816 without requiring user notifications and/or inputs. In other embodiments, the application 814 can inform the user that they need to manually switch their network connection to the temporary Wi-Fi network 798. Because the QR code included the temporary Wi-Fi SSID, the application 814 can display the name of the temporary Wi-Fi network 798 to which the mobile computing device 816 should connect, such as "NEST-22356." The user can then navigate to the settings of the mobile computing device 816 and switch to the temporary Wi-Fi network 798.

Figure 7C:
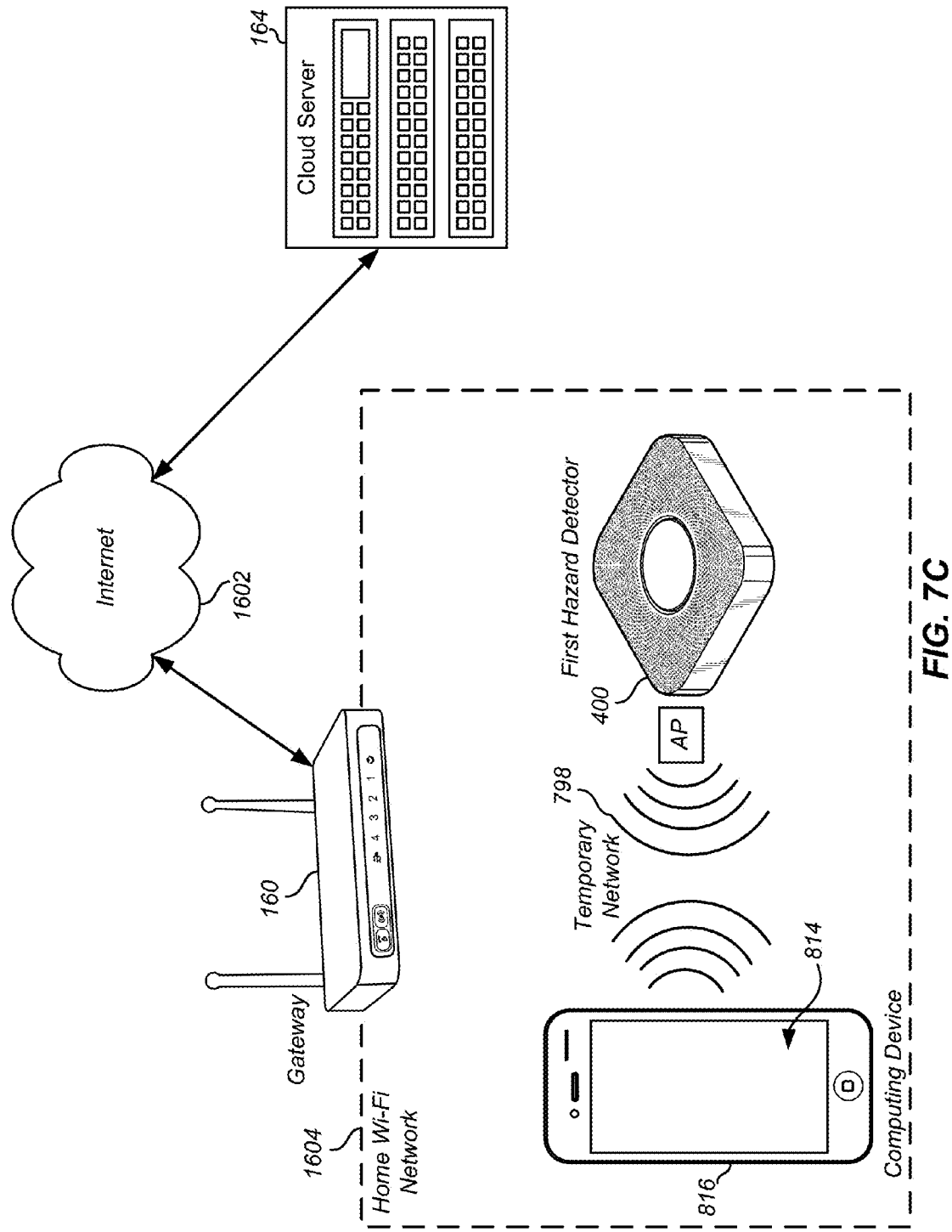

FIG. 7C illustrates how the mobile computing device 816 can provision the first hazard detector 400 to operate on the home Wi-Fi network 1604, according to some embodiments. The temporary Wi-Fi network 798 (i.e. the local Wi-Fi hotspot) created by the first hazard detector 400 may be unsecured, such that the mobile computing device 816 can join the temporary Wi-Fi network 798 without providing a password. In order to provide secure communication without requiring the user to enter a cumbersome password, the local pairing code may be used. The application 814 can secure the temporary Wi-Fi network session with the first hazard detector 400 using the local pairing code, which was provided to the mobile computing device 816 through the QR code or manually entered from the printed label of the first hazard detector 400. By transmitting the pairing code—or information from which the pairing code may be derived—from the mobile computing device 816 to the first hazard detector 400 through the temporary Wi-Fi network 798, the first hazard detector 400 will know that the correct and authorized computing device is present. In some embodiments, this may create a password authenticated session. By using a pairing code, the provisioning process protect against scenarios where multiple hazard detectors are being installed simultaneously in close proximity to each other, such as in an apartment building on Christmas morning.

After establishing the communication session through the temporary Wi-Fi network 798, the mobile computing device 816 can send the configuration information received from the cloud server 164 to the first hazard detector 400. Recall that the configuration information includes data that can be used by the first hazard detector 400 in order to pair with the user account of the cloud server 164. The configuration information also includes data that may be required by the first hazard detector 400 to set up or join a local device network that is 802.15.4-compatible.

In order to provision the first hazard detector 400 on the home Wi-Fi network 1604, it may need to be provided with the network SSID and password (if applicable) of the home Wi-Fi network. In some embodiments, the application 814 can store the home Wi-Fi network SSID and password and automatically provide this information to the first hazard detector 400. However, it is generally more secure for the home Wi-Fi network SSID and password not to be stored by the application 814. Instead, the application 814 can query the user to select the home Wi-Fi network SSID from a list of available Wi-Fi networks. The user can also be prompted to enter their password (e.g. WEP/WPA password) if necessary. This information can then be transmitted from the application 814 to the first hazard detector 400 over the temporary Wi-Fi network 798. After transmission, the application 814 can delete the SSID and password such that they are not stored permanently by the application. Note that in these embodiments, neither the application 816 or the cloud server 164 needs to store the credentials for the home Wi-Fi network 1604. This way, compromising the application 814 and/or the cloud server 164 will not give an attacker access to the user's home Wi-Fi network 1604.

Figure 7D:
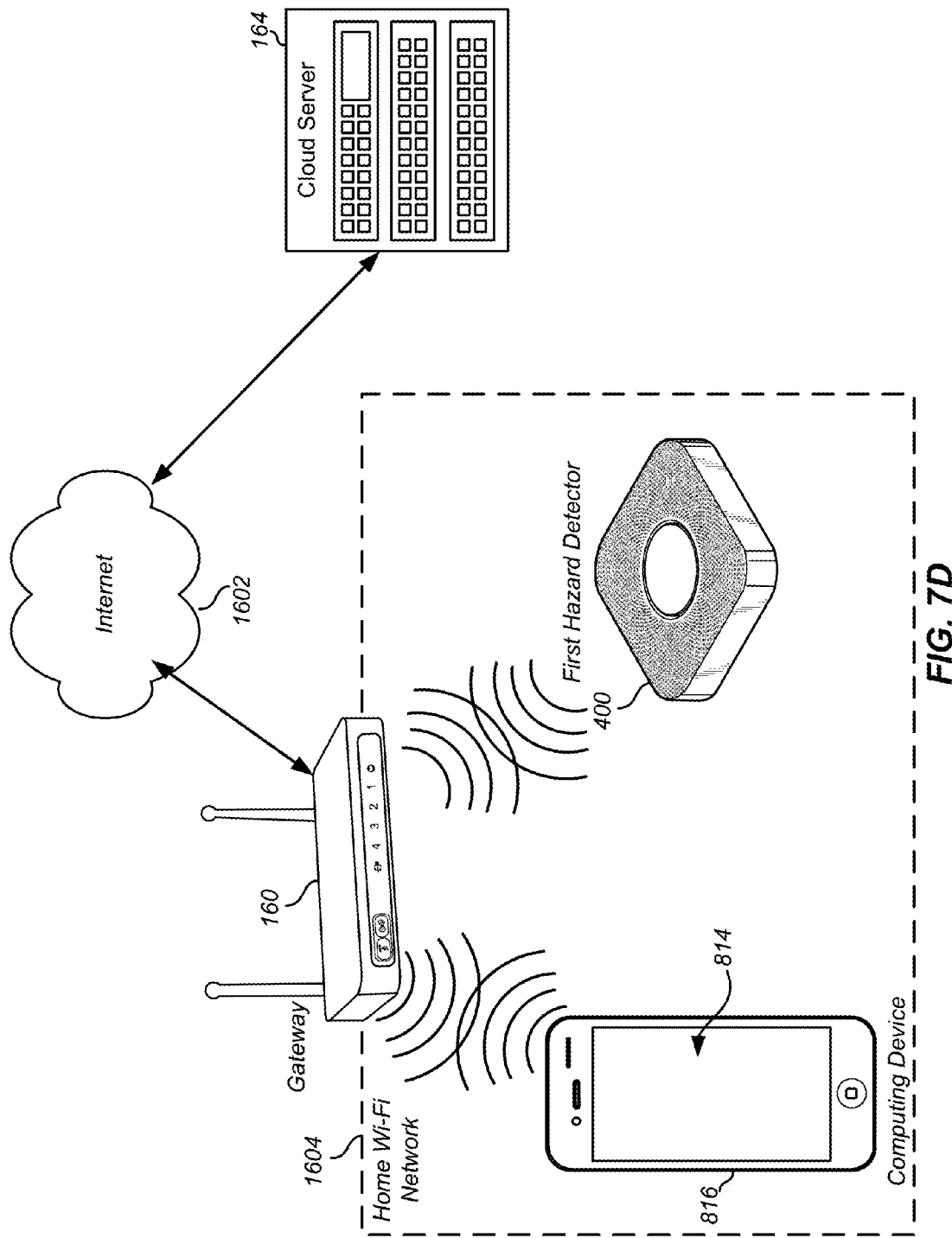

FIG. 7D illustrates how the first hazard detector 400 can pair itself with the cloud server 164 through the home Wi-Fi network 1604, according to some embodiments. At this point, the first hazard detector 400 can use the SSID and password received from the mobile computing device 816 to connect to the home Wi-Fi network 1604 and the router 160 and thus gain access to the Internet 1602. The first hazard detector 400 can then use the DNS hostname that identifies the Internet address for the cloud server 164 to connect with the cloud server 164. The first hazard detector 400 can also provide the service node ID that identifies itself based on the original request from the mobile computing device 816. Both the DNS hostname and the service node ID were included in the configuration information passed from the cloud server 164 to the computing device 816, and then to the first hazard detector 400.

In order to authenticate itself with the cloud server 164, the first hazard detector 400 can use the PKI certificate and/or private cryptographic key that were stored on the first hazard detector 400 during a manufacturing or post-manufacturing process. This can generate a secure communication session based on the authenticated certificate. In some embodiments, the PKI-based method of session authentication may be analogous to standard SSL/TSL.

After establishing the authenticated communication session with the cloud server 164, the first hazard detector can send the account ID and the account pairing token from the configuration information to the cloud server 164. The service can validate the account pairing token to determine that the first hazard detector 400 is the device for which the mobile computing device 816 made the original request. Using the account ID, the cloud server 164 can then pair the first hazard detector 400 with the corresponding user account. At this point, the account pairing is complete, and the first hazard detector 400 has been provisioned to operate on the home Wi-Fi network 1604.

Having finished the provisioning process, the mobile computing device 816 can disconnect from the temporary Wi-Fi network 798 and reconnect to the home Wi-Fi network 1604. Some embodiments may make this connection automatically, while others may require a user to manually revert back to the home Wi-Fi network 1604 by changing the settings on their mobile computing device 816. Any subsequent configuration of the settings of the first hazard detector 400 can now be achieved through the home Wi-Fi network 1604. For example, users may select a location within the enclosure 150 for the first hazard detector 400, such as a bedroom, a kitchen, a hallway, and so forth. Users may also select/enable a "pathlight" feature that causes the first hazard detector 400 to operate as a nightlight when detecting a human presence in the dark. A detailed description of these additional setup features, including user interfaces, will be described in greater detail below. However, each of these additional setup processes may now be accomplished either through the home Wi-Fi network 1604, or through the Internet 162. When communicating through the Internet, the settings will be received by the mobile computing device 816 and transmitted to the cloud server 164. Then, the cloud server 164 will send the settings through the Internet 1602 to the first hazard detector 400. In one exemplary embodiment, future communications between the mobile computing device 816 and the first hazard detector 400 will be carried out through the cloud server 164 exclusively.

Figure 7E:
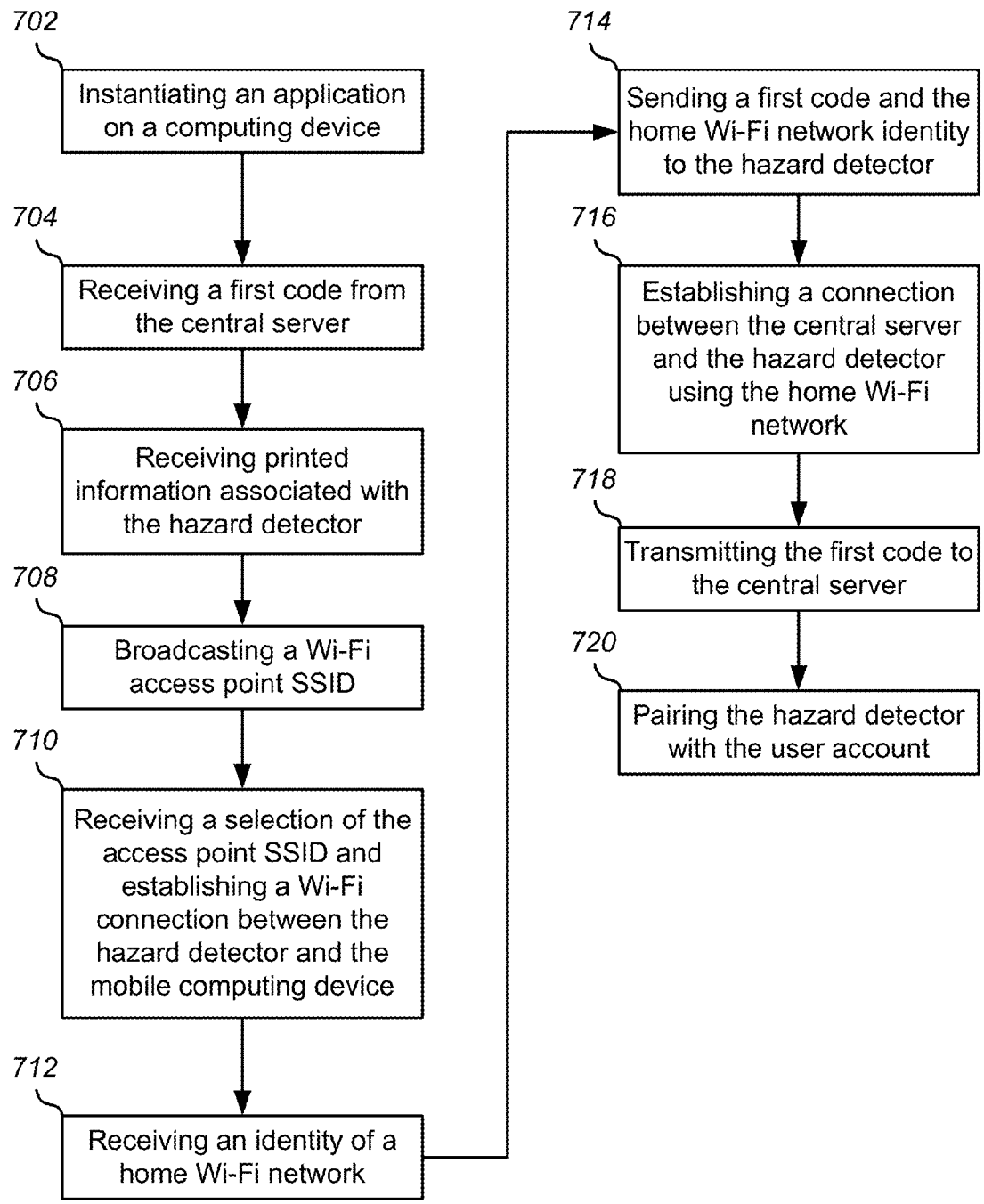
FIG. 7E illustrates a flowchart for a method of establishing a pairing between a hazard detector and an online management account established at a central server, according to some embodiments.

FIG. 7E illustrates a flowchart of a method for establishing a pairing between a smart-home hazard detector and an online management account established at a central server, according to some embodiments. This method lists a subset of the steps described above in relation to FIGS. 7A-7D. However, various embodiments may add or remove any of the features described above without limitation. The method may include instantiating, at a mobile computing device, an application designed for configuration and control of the hazard detector (702). The application may establish communication over the Internet with the central server. The method may also include receiving, at the mobile computing device, a first code from the central server (704). The first code may comprise the account pairing token, and it may be received in response to a request to add a new device to the user account.

The method may also include receiving information derived from a printed surface associated with the hazard detector (706). The printed surface may be printed on the hazard detector itself or on a printed document, sticker, and/or package physically accompanying the hazard detector at the setup location. The information derived from the printed surface may include a second code. The second code may comprise the local pairing code described above. The method may further include broadcasting, by the hazard detector, a Wi-Fi access point SSID. As described above, the hazard detector can receive a user input that causes it to broadcast a temporary Wi-Fi network. The method may additionally include receiving, at the mobile computing device, a selection of the access point SSID from a user (710). The user can select the temporary Wi-Fi network and establish a corresponding Wi-Fi connection with the hazard detector. In order to authenticate the mobile computing device, the mobile computing device can transmit the second code (e.g., the local pairing code) to the hazard detector over the temporary Wi-Fi network.

The method may also include receiving, at the mobile computing device, and identity of a home Wi-Fi network through which the hazard detector is to access the Internet (712). The user may enter/select the SSID and/or password for their home Wi-Fi network, which can then be sent to the hazard detector through the temporary Wi-Fi network. Therefore, the method may additionally include sending, from the mobile computing device to the hazard detector, the first code and the identity of the home Wi-Fi network (714). The hazard detector can then use the identity of the home Wi-Fi network to connect to the Internet. The method may then include establishing a connection between the central server and the hazard detector using the home Wi-Fi network (716). After establishing this connection, the method may further include transmitting, by the hazard detector to the central server, a transmission that includes the first code (e.g., the account pairing token) (718). This transmission can be authenticated by the central server using information previously stored in a memory of the hazard detector at the time of manufacture. For example, the transmission can be authenticated using a PKI certificate and/or private key stored in the hazard detector. The method may additionally include pairing the hazard detector with the user account (720). This pairing can it be achieved by validating a pre-established matching relationship using the second code. For example, the account pairing token received by the central server can be validated against the account pairing token originally sent to the mobile computing device. The account pairing can also be achieved by associating the hazard detector with an account identifier for the user account, such as a unique account ID.

The previous detailed description in relation to FIGS. 7A-7E encompass the operations performed by the mobile computing device 816, the first hazard detector 400, and/or the cloud server 164. This disclosure will now proceed to a detailed description of individual methods that can be carried out by each of these individual devices/systems. The ensuing detailed description will also include exemplary user interfaces that can be used to perform the various method steps.

Figure 7F:
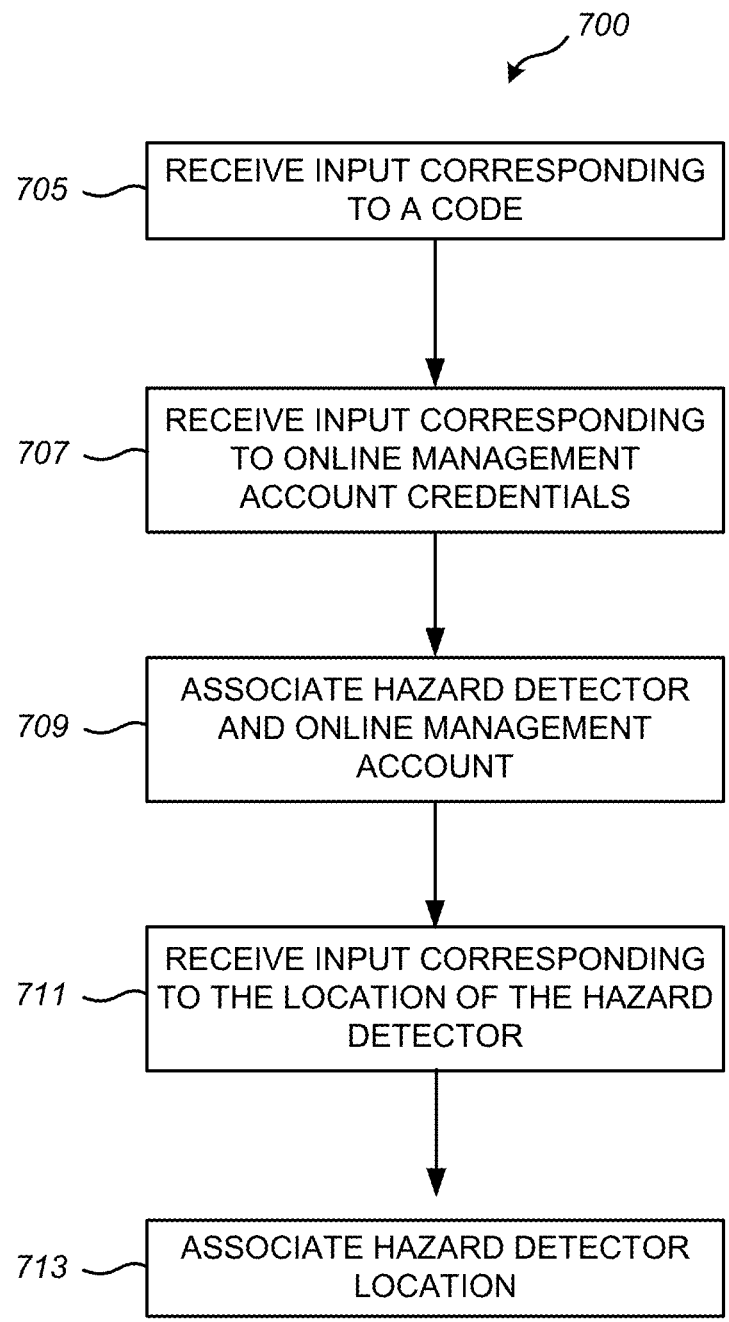

FIG. 7F illustrates a method 700 performed by a server for establishing a pairing between a hazard detector and an online management account, according to an embodiment. In some embodiments, method 700 may be used for smart home environments that do not already include one or more network connected hazard detectors. Each step of method 700 is discussed in detail below, and some steps are discussed with reference to additional figures that may provide physical illustrations related to the steps of method 700

At step 705 of method 700, a central server or a cloud-computing system, e.g., cloud server 164 (shown in FIG. 1), may receive input corresponding to a code. More specifically, the input may request a code from the cloud server in order to pair a new hazard detector with the user account. This requested code may be an account pairing token for the hazard detector. The code may also be associated with additional information stored on the cloud server, At step 707 of method 700, the central server or a cloud-computing system, e.g., cloud server 164, may receive input corresponding to credentials for accessing an online management account. For example, the hazard detector may send credentials for the online management account, which credentials may have been previously stored on the hazard detector during a manufacturing process, to the cloud server 164. These credentials may have include information associated with a PKI certificate and/or a private key. The credentials for the online management account may then be provided to cloud server 164 via a home Wi-Fi network connected to the Internet. Online management accounts, which may be uniquely identified by an email address (e.g., a user's email address), may allow users to access or otherwise benefit from online services, e.g., services 204 (shown in FIG. 2). Use of an e-mail address as an account identifier during initial online account establishment (or otherwise as a required part of the online account creation process) advantageously provides a way to ensure online account name uniqueness for the service provider, and also provides some degree of security when the process requires the user to access their e-mail to retrieve and respond via e-mail to a verification message from the service provider.

At step 709 of method 700, a central server or a cloud-computing system, e.g., cloud server 164, may associate the hazard detector with the online management account using a code, e.g., the account pairing token 832, and credentials for the online management account. This may also allow data, e.g., home data 202 (shown in FIG. 2), to be collected, stored and linked to and/or accessible at a user's online management account. Additionally, this association may allow for remote access and/or remote or distributed control of first hazard detector 400 via a user's online management account.

At step 711 of method 700, the cloud server 164 may receive input corresponding to the location of first hazard detector 400. The information could be stored at the user's online management account and used to enhance the features of services 204 provided to the first hazard detector 400. The location information may further be used to further configure the first hazard detector 400, such as to apply different pre-alarm "heads-up" settings depending on the type of room in which it is located. For example, the location of the first hazard detector 400 may be used to alter the way alerts are provided to users and/or how the first hazard detector 400 interprets characteristics measured by its sensors. More specifically, if the first hazard detector 400 is installed in a kitchen, smoke detection sensitivity may be decreased (e.g., low levels of smoke may be normal in a kitchen) and/or the alert or alarm sequence may be altered (e.g., more opportunities may be provided to a user to preemptively "hush" an alarm for a known, safe smoke condition).

At step 713 of method 700, a central server or a cloud-computing system may associate the hazard detector with the location selected at step 711. Thus, within the association created at step 709, step 713 may classify the first hazard detector 400 according to the selected location at the online management account. This may allow services 204 to further interpret the data received at home data 202 and provide the user with analysis that takes into account the location of the first hazard detector 400. Additionally, this association may allow a user to differentiate hazard detectors by name and separately manage each at a single online management account.

Figures 1, 7G:
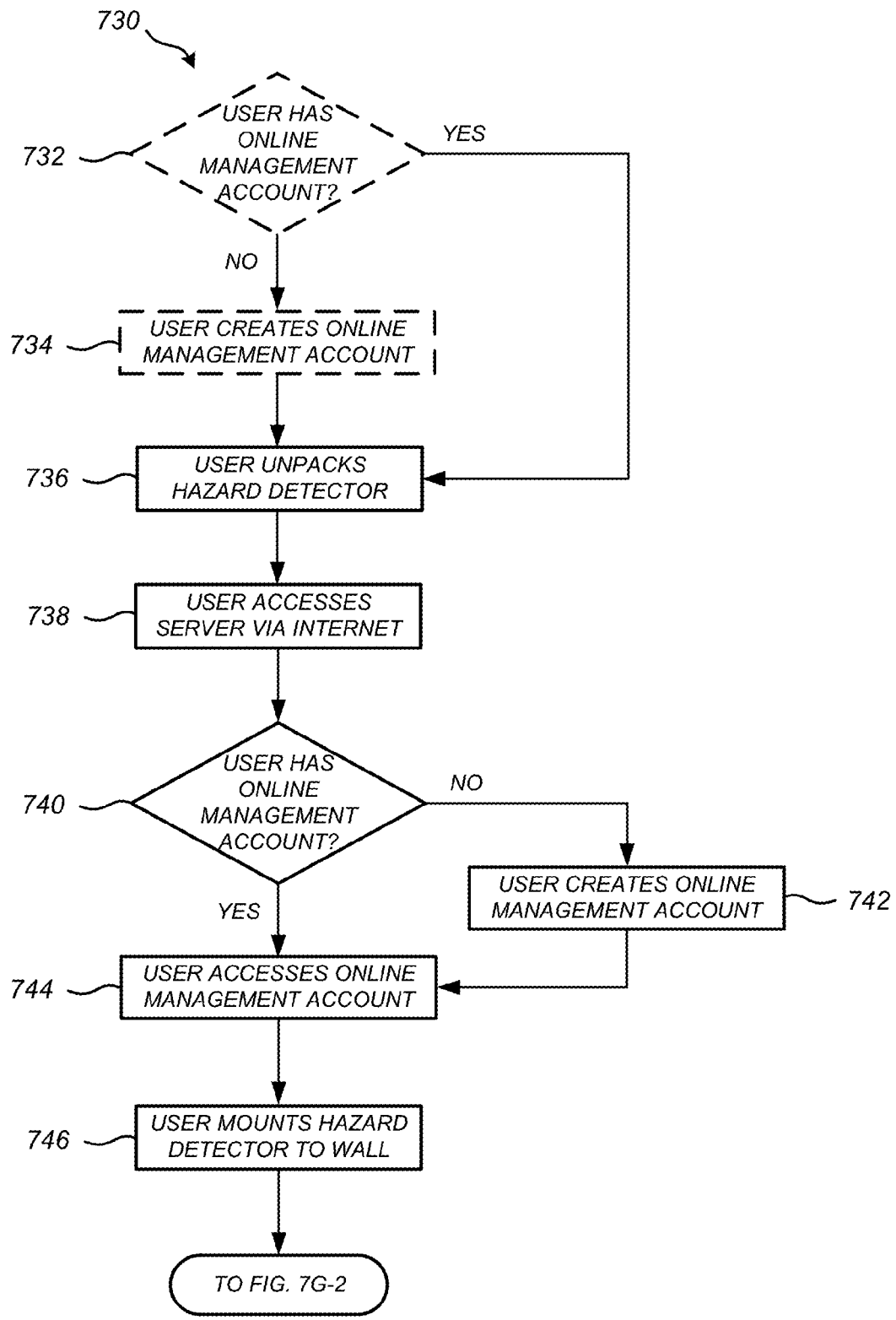
Figures 2, 7G:
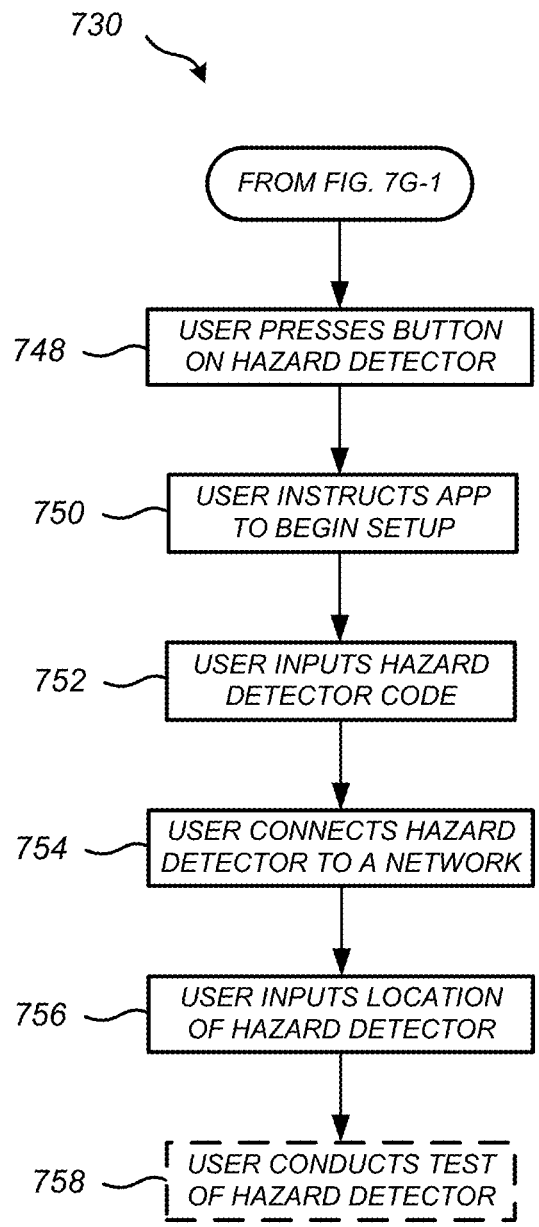

FIGS. 7G-1 and FIG. 7G-2 illustrate a method 730 performed by a user for establishing a pairing between the first hazard detector 400 and an online management account, according to an embodiment. Similar to method 700, method 730 may be used for smart home environments that do not already include one or more network connected hazard detectors. Each step of method 730 is discussed in detail below, and some steps are discussed with reference to additional figures (e.g., FIGS. 8A-T) that may provide physical illustrations related to the steps of method 730.

In some embodiments, method 730 may include steps 732 and 734, which are optional steps of method 730 (as indicated by dashed lines in FIG. 7G-1). At optional step 732 of method 730, a user may determine how to proceed depending on whether the user has an online management account for managing the first hazard detector 400 and/or other smart devices. If the user does not have an online management account, the user may proceed with creating an online management account at optional step 734. If the user already has an online management account, the user may proceed directly to step 736, bypassing optional step 734. The user may already have an online management account because the user owns other smart devices that require the online management account or because the user previously realized the benefit of the online management account for managing the first hazard detector 400.

At optional step 734, the user may create an online management account. The online management account may be created at an application (e.g., application 814 as discussed below) or a webpage configured to communicate with a server, e.g., cloud server 164, for hosting the online management account. For example, a user may access a webpage at a desktop computer or an application at a smart phone in order to create an online management account. As mentioned above, online management accounts may be uniquely identified by an email address (e.g., a user's email address) and allow users to access or otherwise benefit from online services, e.g., services 204 (shown in FIG. 2).

Figure 8B:
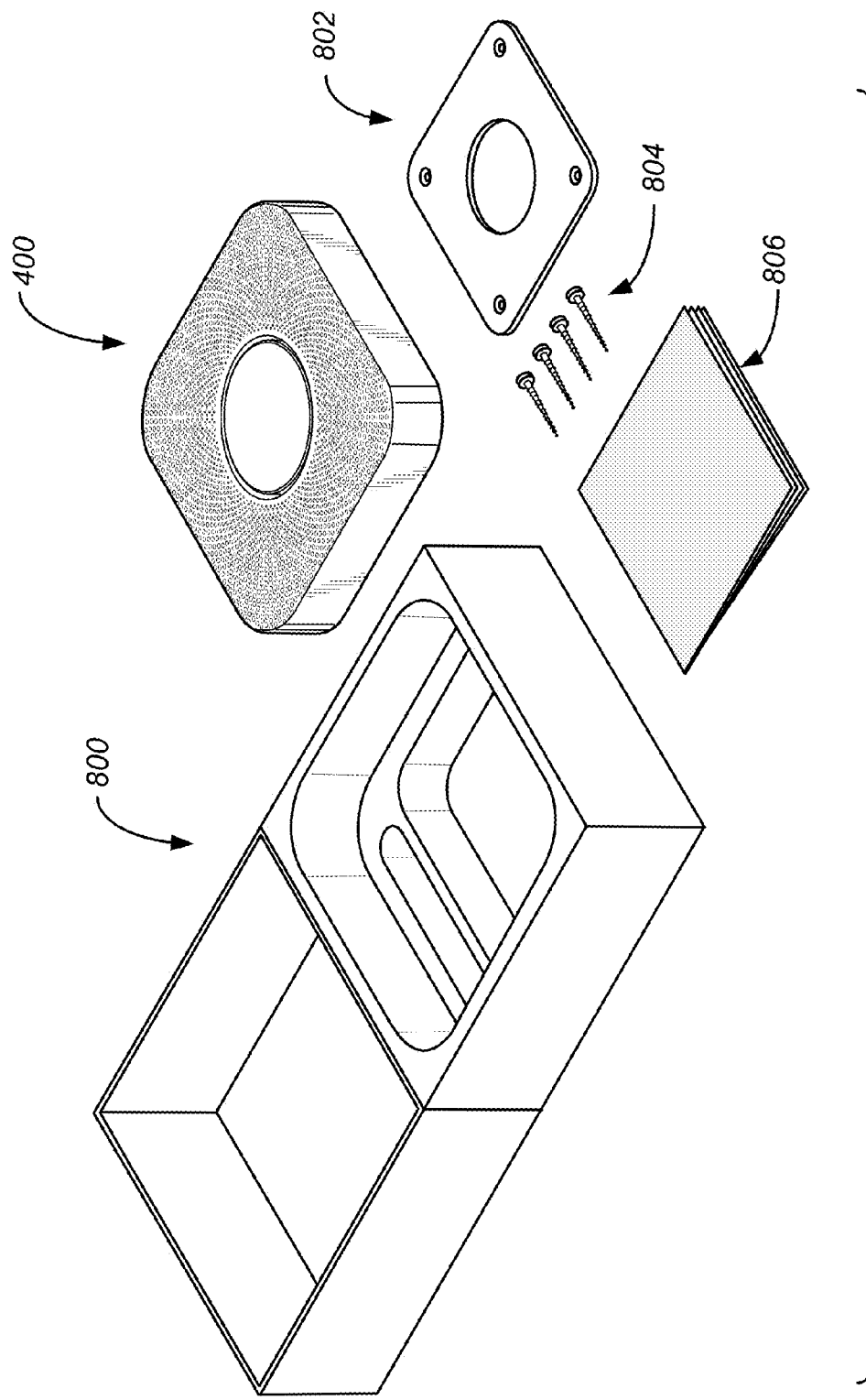
FIGS. 8A-8T illustrates examples of the physical process associated with the methods of FIGS. 7A-C, according to embodiments.
FIG. 8U illustrates examples of the physical process associated with the method of FIG. 7D, according to an embodiment.

At step 736 of method 730, a user may unpack first hazard detector 400 from its product packaging. FIGS. 8A and 8B illustrate examples of the physical process associated with step 736, according to an embodiment. Firstly, the first hazard detector 400 may be removed from its product packaging. This may be accomplished by separating top and bottom portions 800a, 800b of box 800, exposing first hazard detector 400, as shown in FIG. 8A. Then, the first hazard detector 400 may be removed from box 800, along with the other contents of box 800, as shown in FIG. 8B. The other contents of box 800 may include a mounting plate 802 (e.g., mounting plate 410 of FIG. 4A), fasteners 804 for securely affixing mounting plate 802 to a wall or ceiling of a home or other structure, and a hazard detector information packet 806. Information packet 806 may include instructions for the user to install and/or open an application or visit a webpage in order to access the cloud server 164 via internet 162. It may be necessary for the user to pull a battery tab in order to expose the terminals of the batteries, e.g., the batteries of battery pack 450 (shown in FIG. 4A), and provide operating power or backup power to the first hazard detector 400.

Figure 8C:
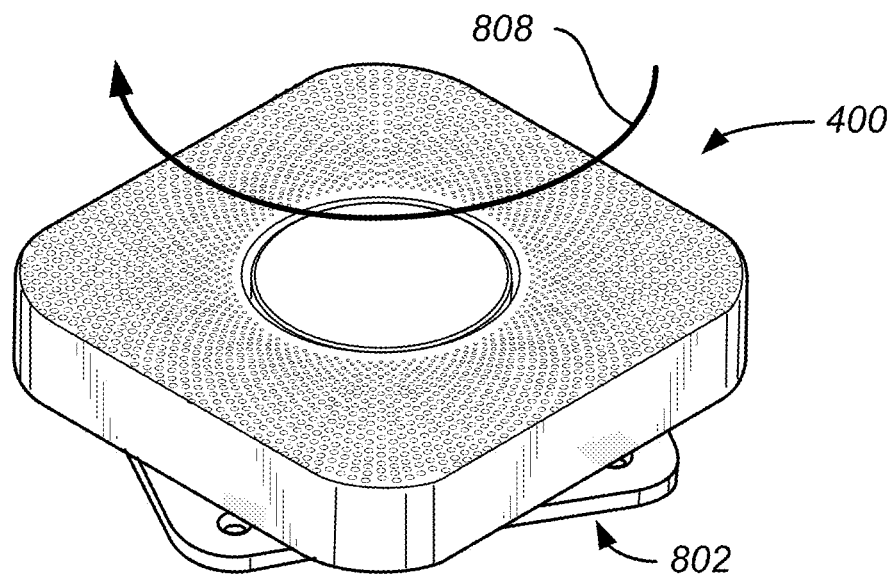

The first hazard detector 400 and the mounting plate 802 may include corresponding features such that first hazard detector 400 becomes locked onto mounting plate 802 when a user twists the first hazard detector 400 in a direction 808, as shown in FIG. 8C. The first hazard detector 400 may also include circuitry and sensors that cause the first hazard detector 400 to "boot up" or initiate its operating system when the sensors determine that the first hazard detector 400 has been mounted on mounting plate 802. An advantage of these mount detection sensors may be that the setup process for the first hazard detector 400 may not begin until it has been mounted on mounting plate 802 that may have already been mounted, e.g., on a wall or ceiling, within a home or other structure. Accordingly, the setup process may take into account the specific conditions, environments, and/or locations in which the first hazard detector 400 has been installed. For example, during the setup process, the first hazard detector 400 may be connected to a network based on which network provides a strong signal to its mounted location and/or associated with the specific room of a home or other structure in which the first hazard detector 400 is mounted. The benefits of a network connection for hazard detectors and associating hazard detectors with specific locations within a home or other structure are described in detail herein.

In another embodiment, the setup process of the first hazard detector 400 may begin immediately after the battery tab is pulled, even if the first hazard detector 400 has not been mounted on mounting plate 802. In this manner, the first hazard detector 400 may still be optionally located proximate to its eventual location of operation when the battery tab is pulled, but the device is not required to be mounted for the setup process to begin. This flexibility may be advantageous in some situations, e.g., where a user prefers to setup the first hazard detector 400 before mounting it and/or where the user is not interested in utilizing location based and/or networked connected features of the first hazard detector 400.

Figure 8D:
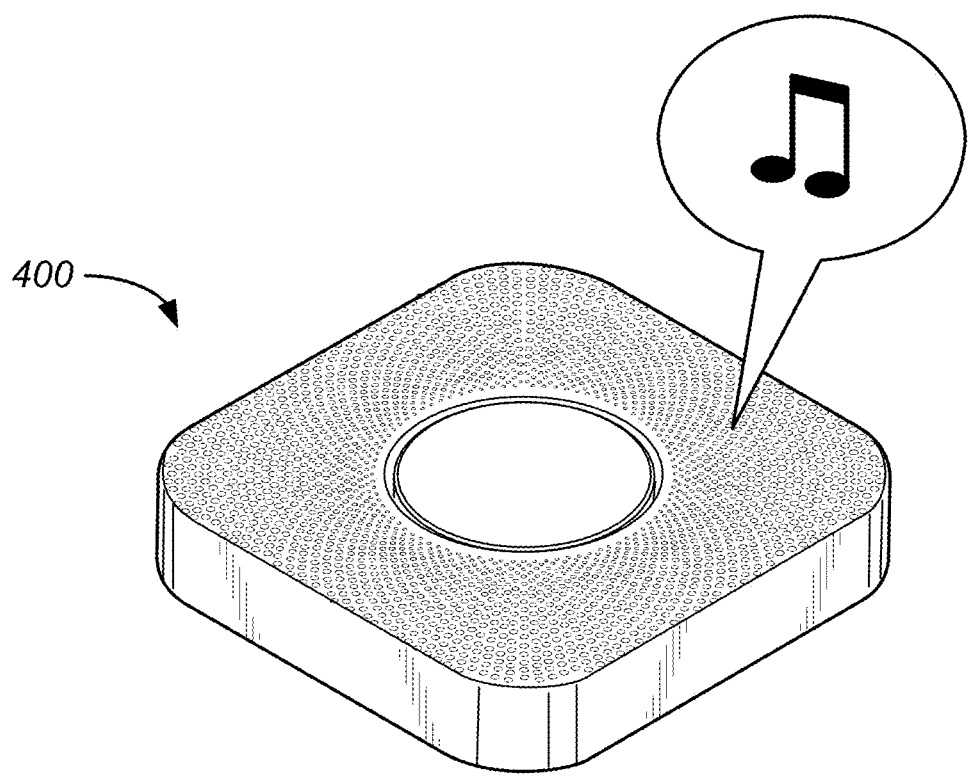

As shown in FIG. 8D, the first hazard detector 400 may generate music to indicate that it is booting up, e.g., hazard detector may generate music via speaker 550. Alternatively, the first hazard detector 400 may generate any kind of sound (e.g., tones or speech) and/or visual indicators (e.g., LED lights 652 may produce light according to a predetermined pattern).

Figure 8E:
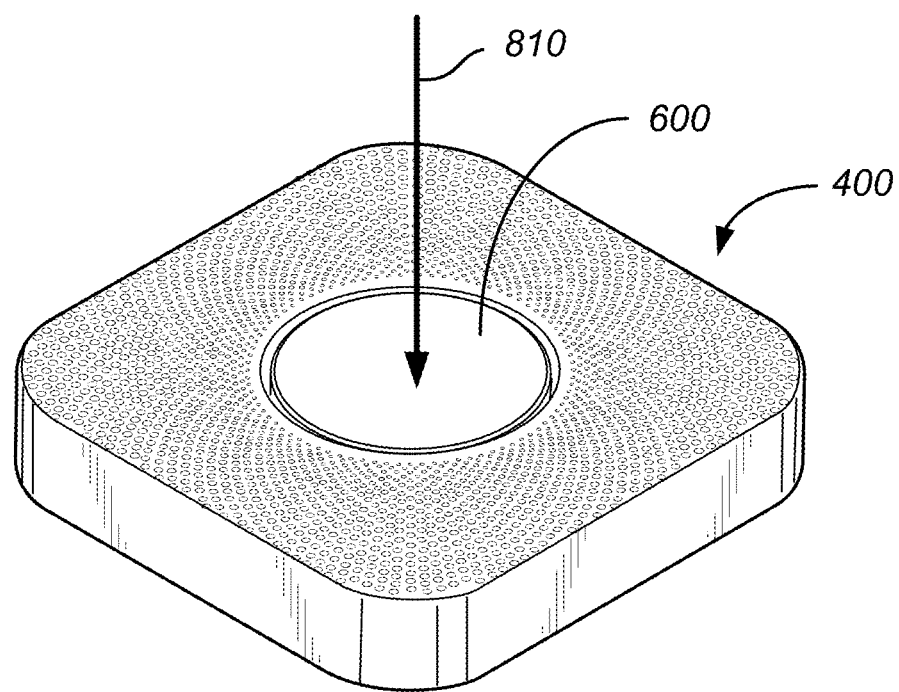
Figures 8F, 8G:
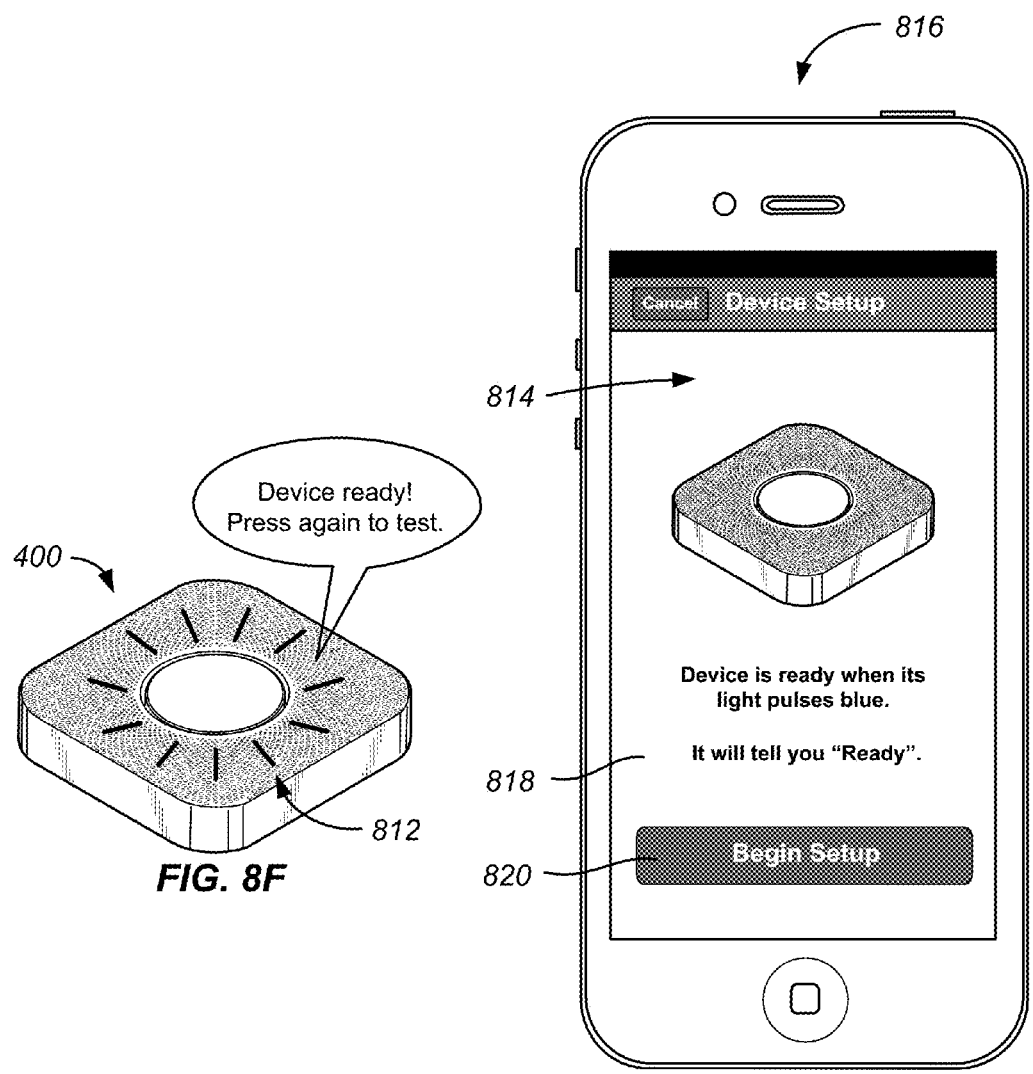

After first hazard detector 400 has booted up, it may generate audio and/or visual indicators and receive input via button 600 in order to allow the user to select a language preference for the operation of first hazard detector 400. For example, the first hazard detector 400 may audibly say, "Press the button now for English" in the English language, "Pulse el boton ahora para Espanol" in the Spanish language, and so forth. The user can be instructed (such as by the online app, by command intrinsic to the spoken voice itself, and/or by the information packet 806) to provide a user input to the first hazard detector 400 when they hear their language being spoken. For example, an English speaking user could push a button on the first hazard detector 400 when they hear the phrase "Press the button now for English" announced by the first hazard detector 400. Preferably, preceding each command in the respective language, a pleasant greeting can be provided (e.g., the English phrase above would be "Hello from Nest [or Company Name], press the button now for English."). Preferably, a pleasant light display, such as a blue glow, or a blue glow that appears to be in a rotating pattern, emanates from the halo light element 620 during the hello and language selection process which, along with the spoken words, is believed to bring about a pleasant, positive feeling in the user imparting confidence to proceed. The user may press button 600 in a direction 810, as shown in FIG. 8E, to begin communicating with first hazard detector 400. Alternatively, the user may use voice commands to begin communicating with first hazard detector 400. In response, first hazard detector 400 may generate audio and/or visual indicators, as shown in FIG. 8F. For example, first hazard detector 400 may tell the user "Device ready! Press again to test." Upon pressing the button 600 to instantiate the test, the voice may say, "This is only a test. The alarm will sound. The alarm is loud. The test starts in 10 seconds. Press or wave to cancel. 10, 9, 8, 7, . . . " If the user does not press the button or issue a "gesture hush" or "wave-to-hush" command before the countdown reaches zero, the test will proceed, wherein the voice says "This is only a test. Testing smoke,", which is followed by actual smoke alarm beeping for a few seconds, which is then followed by "Testing carbon monoxide," which is then followed by actual carbon monoxide alarm beeping for a few seconds, which is then followed by, "The test is finished. Everything is OK." For one embodiment, the blue glow or modulated blue glow of the halo light accompanies the spoken voice up until the test-alarming beeps, at which time the halo light glows red or modulated red. Subsequent to the test-alarming beeps, as the voice is saying "Everything is OK,", the halo light emits a green glow or modulated green glow, which enforces the reassurance that the hazard detector has tested OK.

Audio and/or visual indicators similarly provided by the first hazard detector 400 may then direct or instruct the user to open an app or webpage on their smartphone or tablet, or other similarly capable computing device, which will, among other advantageous functions, facilitate the providing of the code. During various subsequent portions of the setup, the first hazard detector 400 may generate pulsing blue light rays 812.

At step 738, the user may access cloud server 164 via internet 162. For example, the user may follow the instructions contained in information packet 806 and install and/or open a hazard detector management application, e.g., application 814, on a computing device or visit a webpage on a computing device in order to communicate with cloud server 164 via internet 162. The application or webpage may ask the user to input at the application or webpage credentials (e.g., username and password) for accessing an online management account.

At step 740, a user may determine how to proceed depending on whether the user has an online management account for managing the first hazard detector 400 and/or other smart devices. If the user does not have an online management account, the user may proceed with creating an online management account at step 742. If the user already has an online management account, the user may proceed to step 744. As mentioned above, the user may already have an online management account because the user owns other smart devices that require the online management account, the user previously realized the benefit of the online management account for managing first hazard detector 400 or other reasons.

At step 742, the user may create an online management account. The online management account may be created at an application (e.g., application 814) or a webpage configured to communicate with a server, e.g., cloud server 164, for hosting the online management account. For example, a user may access a webpage at a desktop computer or an application at a smart phone in order to create an online management account. As mentioned above, online management accounts may be uniquely identified by an email address (e.g., a user's email address) and allow users to access or otherwise benefit from online services, e.g., services 204 (shown in FIG. 2).

At step 744, the user may access the online management account. The user may access the online management account at step 744 by providing input corresponding to credentials for accessing an online management account at an application (e.g., application) or webpage configured to communicate with cloud server 164. Alternatively, the online management account credentials may have been previously stored on an application on a computing device and may be sent to the cloud server 164 when the application is opened at a computing device, e.g., mobile computing device 816. These credentials may have been stored when they were entered at the application at a previous time, e.g., after first opening the application or at some other time before beginning step 736 above. In some embodiments, this step may be performed after the code of first hazard detector 400 is provided to cloud server 164, i.e., after step 752.

At step 746, the user may mount first hazard detector 400 to a wall or ceiling of a home or other structure. The user may perform step 746 in response to and according to instructions provided at the application or the webpage configured to communicate with cloud server 164 or at information packet 806. As discussed above, first hazard detector 400 and mounting plate 802 (shown in FIG. 8C) may include corresponding features such that first hazard detector 400 becomes locked onto mounting plate 802 when a user twists first hazard detector 400 in a direction 808, as shown in FIG. 8C. First hazard detector 400 may also include circuitry and sensors that cause first hazard detector 400 to "boot up" or initiate its operating system when the sensors determine that first hazard detector 400 has been mounted on mounting plate 802. An advantage of these mount detection sensors may be that the setup process for first hazard detector 400 may not begin until it has been mounted on mounting plate 802 that may have already been mounted, e.g., on a wall or ceiling, within a home or other structure. Accordingly, the setup process may take into account the specific conditions/environment/location in which first hazard detector 400 has been installed. For example, during the setup process, first hazard detector 400 may be connected to a network based on which network provides a strong signal to its mounted location and/or associated with the specific room of a home or other structure in which first hazard detector 400 is mounted. The benefits of a network connection for hazard detectors and associating hazard detectors with specific locations within a home or other structure are described in detail herein.

In another embodiment, the setup process of first hazard detector 400 may begin immediately after a battery tab is pulled, even if first hazard detector 400 has not been mounted on mounting plate 802. As discussed above, it may be necessary for the user to pull a battery tab in order to expose the terminals of the batteries, e.g., the batteries of battery pack 450 (shown in FIG. 4A), and provide operating power or backup power to first hazard detector 400. In this embodiment, first hazard detector 400 may still be optionally located proximate to its eventual location of operation when the battery tab is pulled, but the device is not required to be mounted for the setup process to begin. This flexibility may be advantageous in some situations, e.g., where a user prefers to setup first hazard detector 400 before mounting it and/or where the user is not interested in utilizing location based and/or networked connected features of first hazard detector 400.

At step 748 of method 730, as shown in FIG. 7G-2, the user may press a button on hazard detector 400. The user may press button 600 (shown in FIG. 6A) in direction 810, as shown in FIG. 8E, to begin communicating with hazard detector 400. Alternatively, the user may use voice commands to begin communicating with hazard detector 400. In response, hazard detector 400 may generate audio and/or visual indicators, as shown in FIG. 8F. For example, first hazard detector 400 may tell the user "Device ready! Press again to test." First hazard detector 400 may also generate pulsing blue light rays 812. These audio and/or visual indicators may direct or instruct the user to open an app or a webpage at a computing device in order to provide the code. First hazard detector 400 may also generate audio and/or visual indicators and receive input via button 600 in order to allow the user to select a language preference for the operation of first hazard detector 400.

Figure 8H:
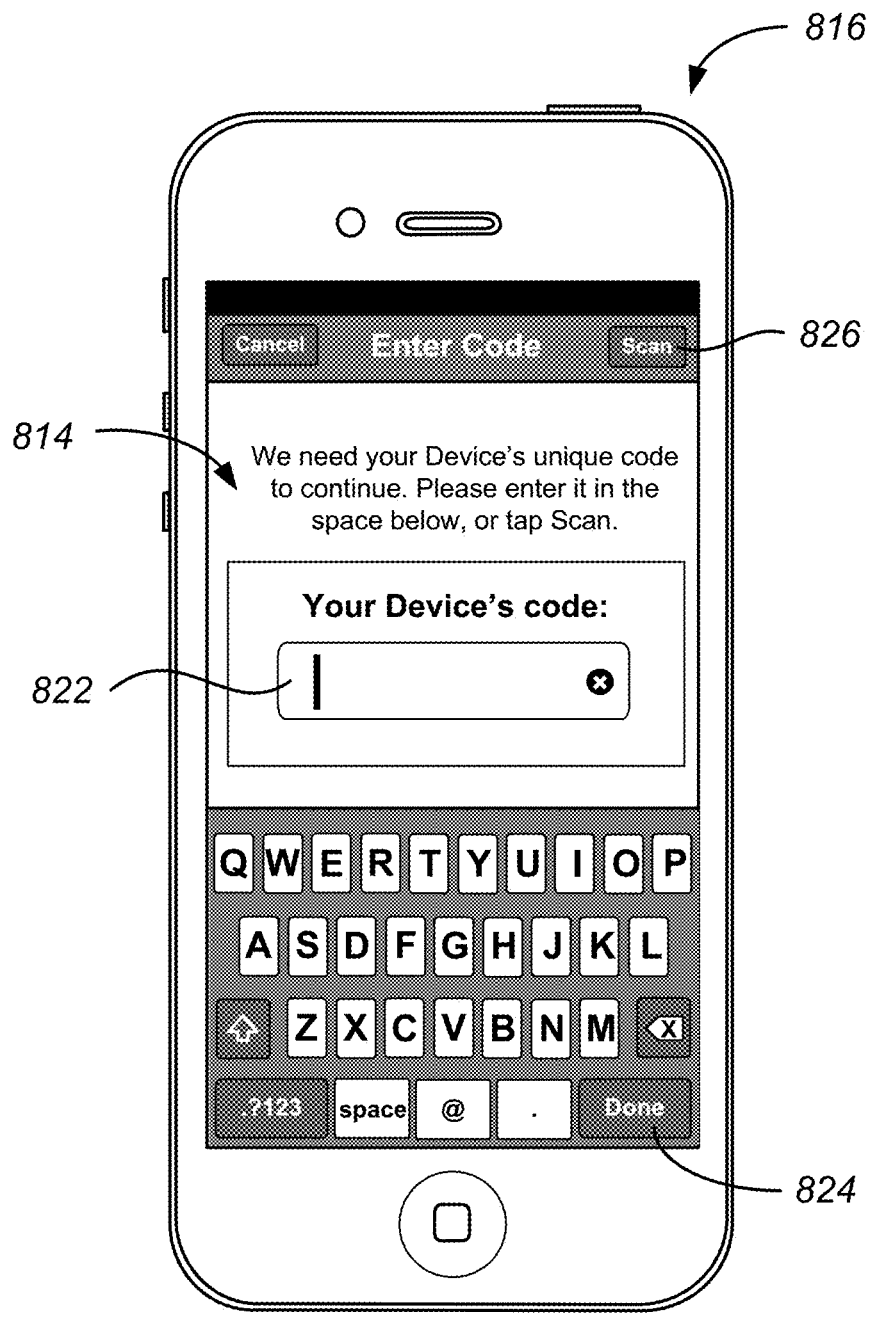

At step 750, the user may instruct app or application 814 to begin setup for first hazard detector 400. FIG. 8G shows the app or application 814 (or, e.g., a webpage) that can be configured to provide a user with instructions for the next steps of the setup process. For example, application 814 may be opened on a computing device, e.g., a mobile computing device 816, and provide an interface on a screen 818 for leading a user through the next steps of the setup process. More specifically, FIG. 8G shows that application 814 may inform a user that the "Device is ready when its light pulses blue" and that "It will tell you 'Ready'". Accordingly, the user may select "Begin Setup" button 820 after first hazard detector 400 pulses blue light rays 812 and generates the following speech: "Ready". In some situations where application 814 is not already installed on mobile computing device 816, first hazard detector 400 may actually instruct the user to download and install application 814 using audio (e.g., speech) and/or visual indicators. Selecting "Begin Setup" button 820 brings up the interface of application 814 shown in FIG. 8H, which interface instructs the user to provide the unique code for first hazard detector 400.

At step 752, the user may input a code of first hazard detector 400 at application 814. This code may be a unique ID of first hazard detector 400. The code may also be associated with additional information, e.g., the date first hazard detector 400 was manufactured, the software version that was initially installed on first hazard detector 400 and/or other information about first hazard detector 400. In order to perform step 752, the user may need to first determine the code of first hazard detector 400. The code may be contained in the product packaging of first hazard detector 400 or displayed on hazard detector and provided to cloud server 164 via an app or a webpage configured to provide communication to cloud server 164.

Figure 8I:
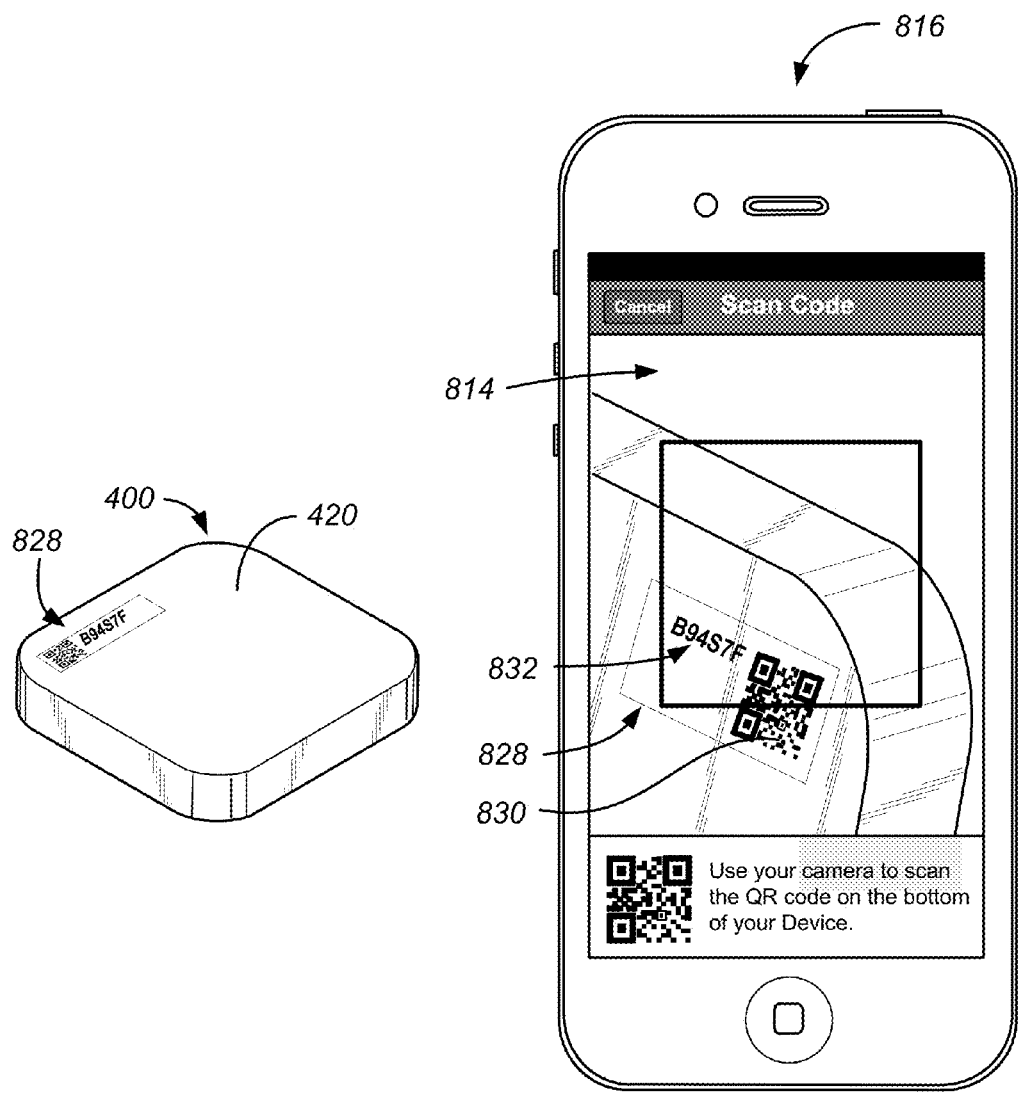

The user performs step 752 by entering an alphanumeric code manually in field 822 and selecting a "Done" button 824 when finished. Alternatively, the user may select a scan button 826 to bring up the interface of application 814 interface shown in FIG. 8I. This interface may be used for scanning QR codes. The QR code and the alphanumeric code may be found on a sticker 828 that is located on back plate 420 of first hazard detector 400. As shown in FIG. 8I, application 814 enters a camera mode interface in order to allow a user to take a picture of a QR code 830 located on sticker 828 and next to alphanumeric code 832. Application 814 may process the QR code in order to determine alphanumeric code 832, another unique ID of first hazard detector 400 or other information concerning first hazard detector 400. Application 814 may automatically input alphanumeric code 832 into field 822 (shown in FIG. 8J) following the scanning of QR code 830.

Figure 8J:
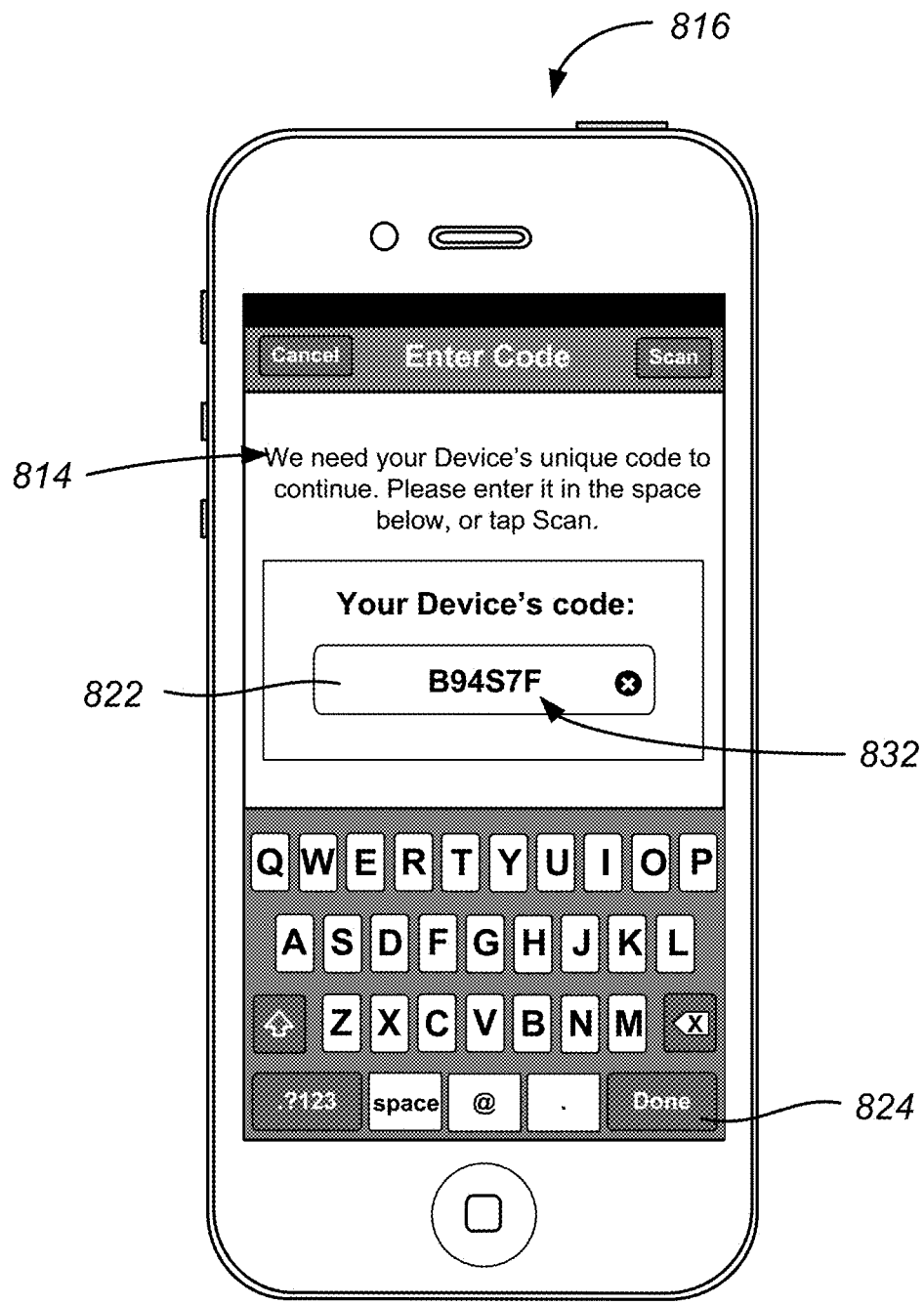

FIG. 8J shows alphanumeric code 832 inputted into field 822. Again, this may be accomplished by manually inputting alphanumeric code 832 into field 822 or by scanning QR code 830 (shown in FIG. 8I) and allowing application 814 to determine and automatically input alphanumeric code 832 into field 822. The user may then press done button 824 in order to send the alphanumeric code 832 to cloud server 164.

The cloud server 164 may associate first hazard detector 400 and an online management account using a code, e.g., the account pairing taken, and credentials for the online management, e.g., the PKI certificate and the private key stored on the first hazard detector. This may also allow data, e.g., home data 202 (shown in FIG. 2), to be collected, stored and linked to and/or accessible at a user's online management account. Additionally, this association may allow for remote access and/or remote or distributed control of first hazard detector 400 via a user's online management account. However, in order for data collection and/or remote control of first hazard detector 400 to be possible, first hazard detector 400 may need to have a network connection.

Figure 8K:
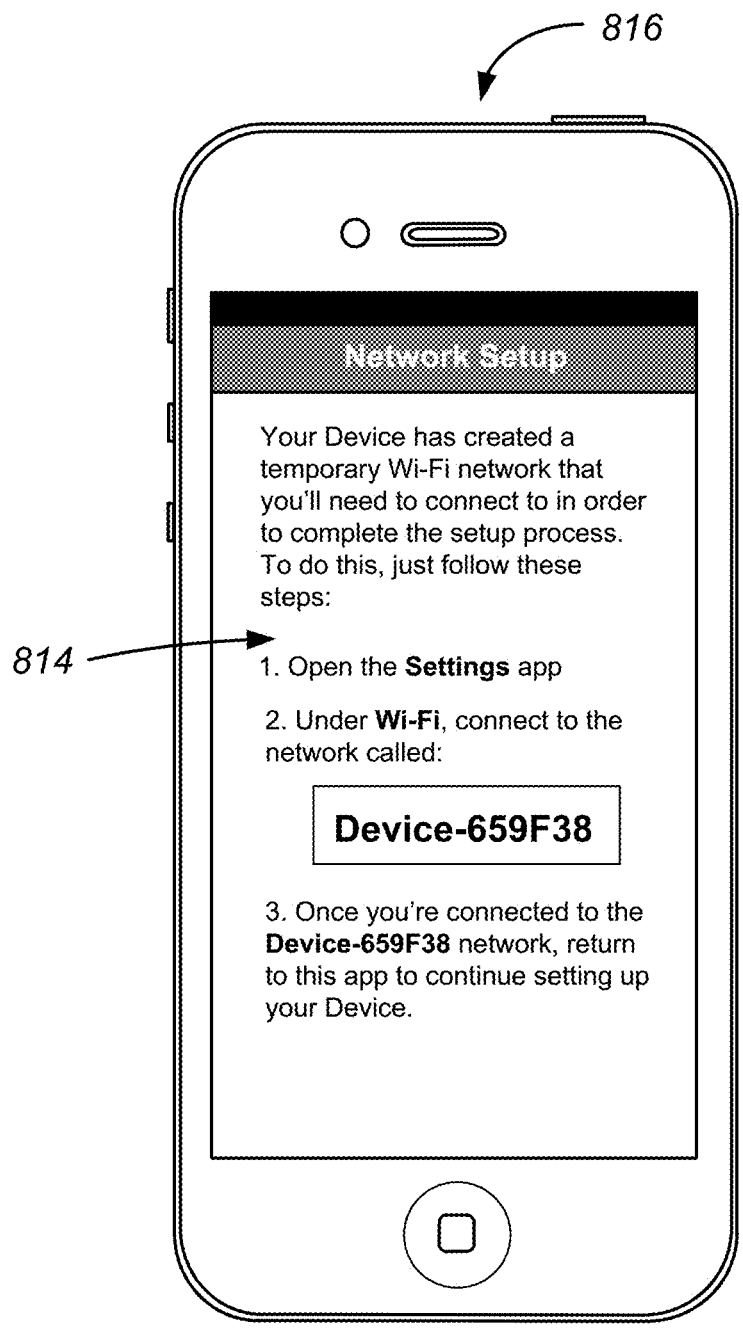

At step 754, the user connects first hazard detector 400 to a network. FIGS. 8K-P illustrate examples of the physical process associated with connecting a hazard detector, e.g., first hazard detector 400, to a network, e.g., internet 162 (shown in FIG. 1). Firstly, as shown in FIG. 8K, an interface may be provided at application 814 on mobile computing device 816 in order to provide instructions for connecting first hazard detector 400 to internet 162. For example, the instructions may include three steps for connecting first hazard detector 400 to internet 162 and continuing the setup process for first hazard detector 400: (1) open the Settings app, (2) under Wi-Fi, connect to a network called "Device-659F38," and (3) return to application 814 to complete setting up first hazard detector 400. Some of these steps may be specific to mobile computing device 816, which may be an iPhone in some embodiments, but similar steps may be taken for other computing devices, e.g., other smartphones, tablets, laptops, netbooks and all-in-one computers, in order to connect them to the temporary network created or provided by first hazard detector 400.

The "Device-659F38" network may be temporary Wi-Fi network provided by first hazard detector 400 during the setup process. Alternatively, first hazard detector 400 may provide one or more other networks for communicating with computing devices, e.g., mobile computing device 816, using other wireless protocols, e.g., any of the other wireless protocols mentioned herein. This temporary network may provide a convenient, initial means for allowing first hazard detector 400 to communicate with mobile computing device 816 while first hazard detector 400 is not connected to the Internet 162.

Figure 8L:
Figure 8M:
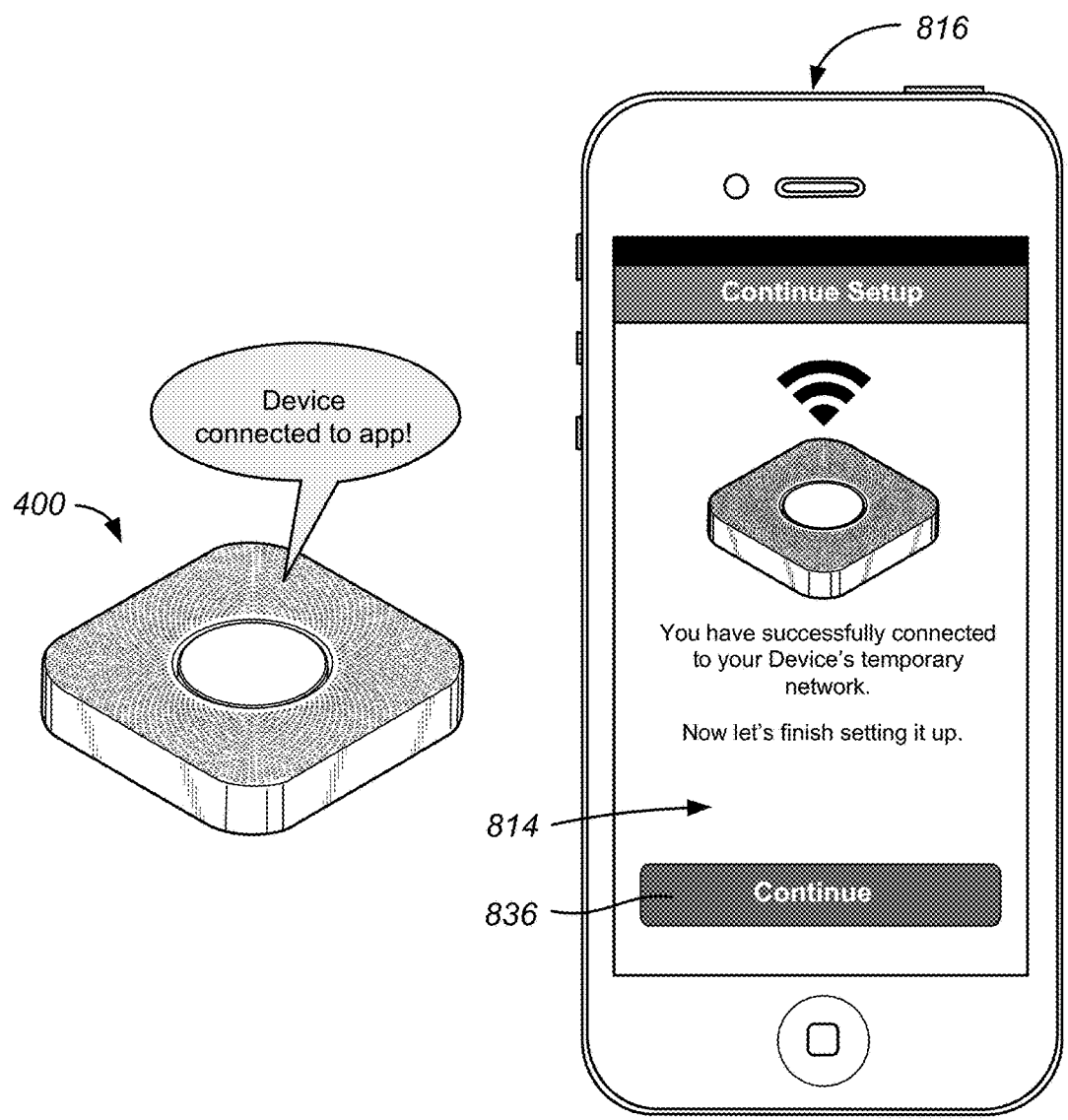

Per the instructions shown in FIG. 8K, the user may close application 814 and open a settings application 834 or otherwise switch applications in order to open settings application 834 and view the Wi-Fi configuration interface of settings application 834, as shown in FIG. 8L. Then, the user may select the "Device-659F38" network by tapping on "Device-659F38" in the list of detected networks displayed by settings app 834. The Wi-Fi configuration interface of settings application 834, as shown in FIG. 8L, is an example of what the user may see after completing steps (1) and (2) of the instructions displayed by application 814 in FIG. 8K. At step (3), the user may return to application 814 to complete setting up first hazard detector 400, whereupon application 814 may display the screen shown in FIG. 8M. This screen provides confirmation that mobile computing device 816 is connected to first hazard detector 400. First hazard detector 400 may also generate an audio and/or visual indicator to inform the user that mobile computing device 816 and first hazard detector 400 have been successfully connected. For example, as shown in FIG. 8M, the hazard detector may generate the following speech: "Device connected to app!". Alternatively, first hazard detector 400 may generate other audio and/or visual confirmation of the successful connection. To continue the setup process the user may select a "continue" button 836.

FIG. 8L illustrates how a user can manually switch from their home Wi-Fi network to the temporary Wi-Fi network generated by the first hazard detector 400. In other embodiments, the application 814 can automatically switch to the temporary Wi-Fi network without requiring any input from the user. In reading a QR code, the mobile computing device 816 can read the rendezvous Wi-Fi SSID used by the first hazard detector 402 generate the temporary Wi-Fi network. Having this information, the application 814 can automatically connect to the temporary Wi-Fi network.

Figure 8N:
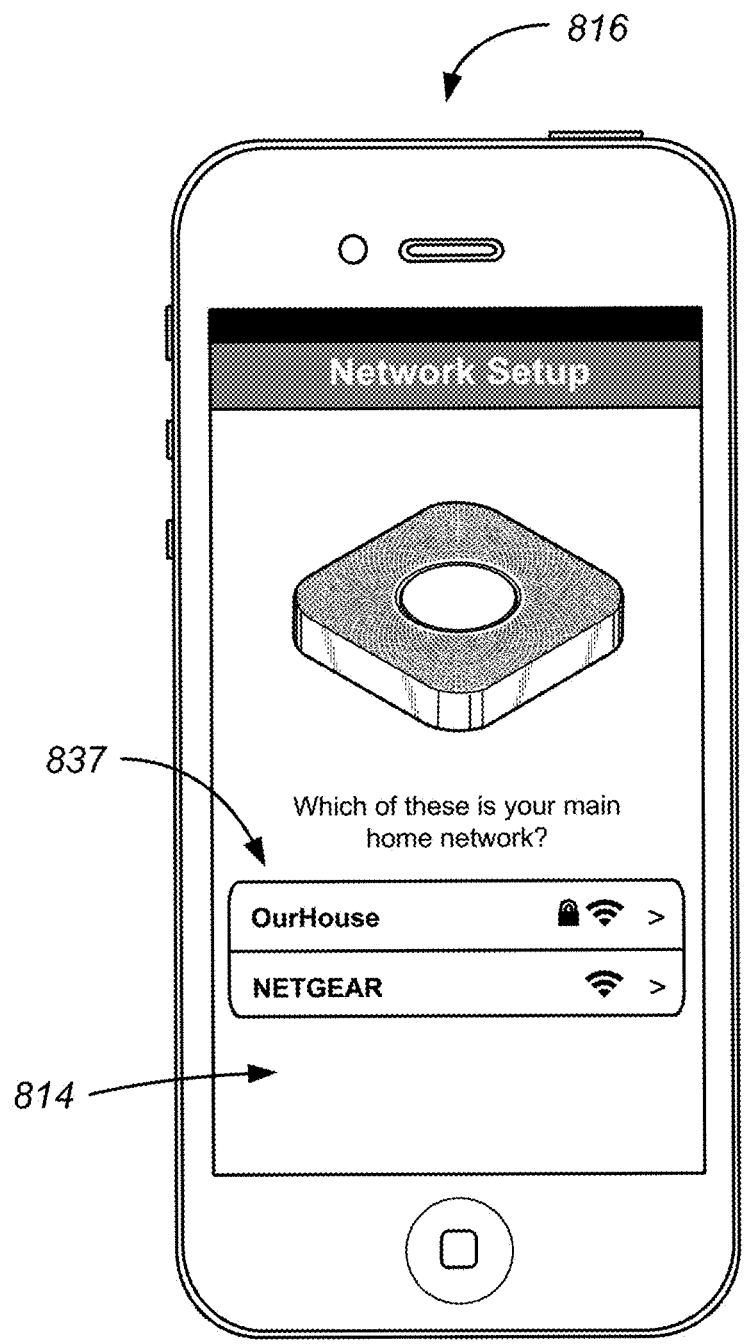
Figure 8O:
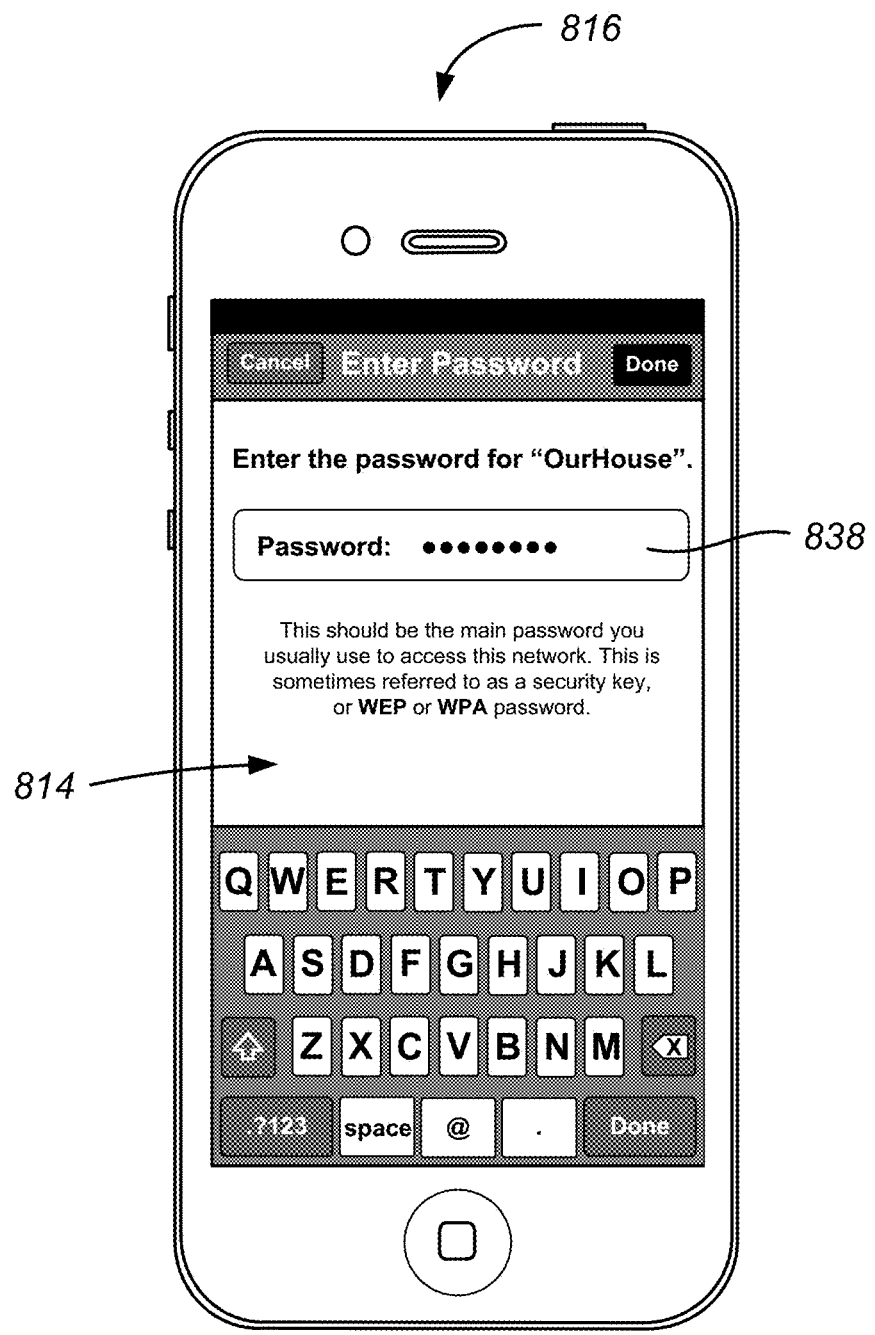

FIG. 8N shows a network setup interface of application 814. At this point, application 814 instructs the user to select user's main home network from a list 837 of Wi-Fi networks detected by the mobile computing device 816 and generated in list form by application 814. This allows the user to select a network, e.g., the "OurHouse" network, that first hazard detector 400 can use to connect to internet 162. Upon selecting a network by the user, an "Enter Password" interface may be displayed by application 814, as shown in FIG. 8O, wherein the user may enter the password for connecting to the selected network in a field 838. In cases where the home Wi-Fi network is unsecured, this step for entering a password may be skipped. These credentials may be sent by application 814 to first hazard detector 400 so that it can gain access to internet 162 via the router of the selected network.

Figure 8P:
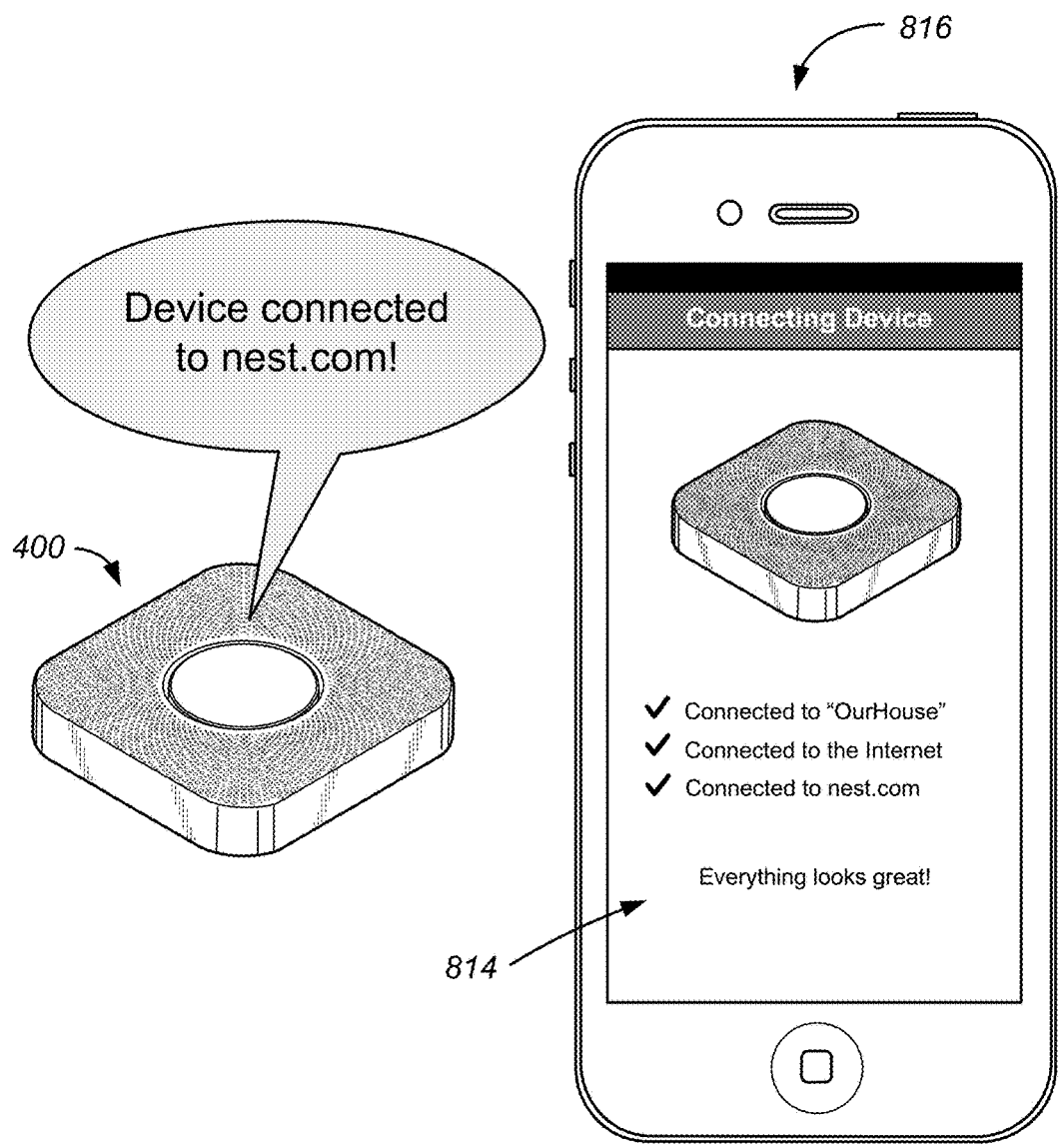

Application 814 may display the screen shown in FIG. 8P in order to provide confirmation to the user that first hazard detector 400 has connected to a local network (e.g., "OurHouse"), internet 162, and cloud server 164 (e.g., via the website nest.com). First hazard detector 400 may also generate a corresponding audio and/or visual indicator. For example, as shown in FIG. 8P, the hazard detector may generate the following speech: "Device connected to nest.com!". Alternatively, first hazard detector 400 may generate other audio and/or visual confirmation of the successful connections. These confirmations signify that first hazard detector 400 has been associated with an online management account and the user is able to access or otherwise benefit from services 204, e.g., the user can communicate with first hazard detector 400 using a computer (e.g., a desktop computer, laptop computer, or tablet) or other portable electronic devices (e.g., a smartphone 166). As described above, the first hazard detector 400 can now communicate directly with the cloud server 164 to complete the pairing process.

At step 756 of method 730, a user may input the location of first hazard detector 400 at application 814. The information could be stored at the user's online management account and used to enhance the features of services 204 provided to first hazard detector 400. The location information may even be used to further configure first hazard detector 400. For example, the location of first hazard detector 400 may be used to alter the way alerts are provided to users and/or how first hazard detector 400 interprets characteristics measured by its sensors. More specifically, if first hazard detector 400 is installed in a kitchen, smoke detection sensitivity may be decreased (e.g., low levels of smoke may be normal in a kitchen so the alarm threshold for smoke may be increased) and/or the alert or alarm sequence may be altered (e.g., more opportunities may be provided to a user to preemptively "hush" an alarm for a known, safe smoke condition).

Figure 8Q:
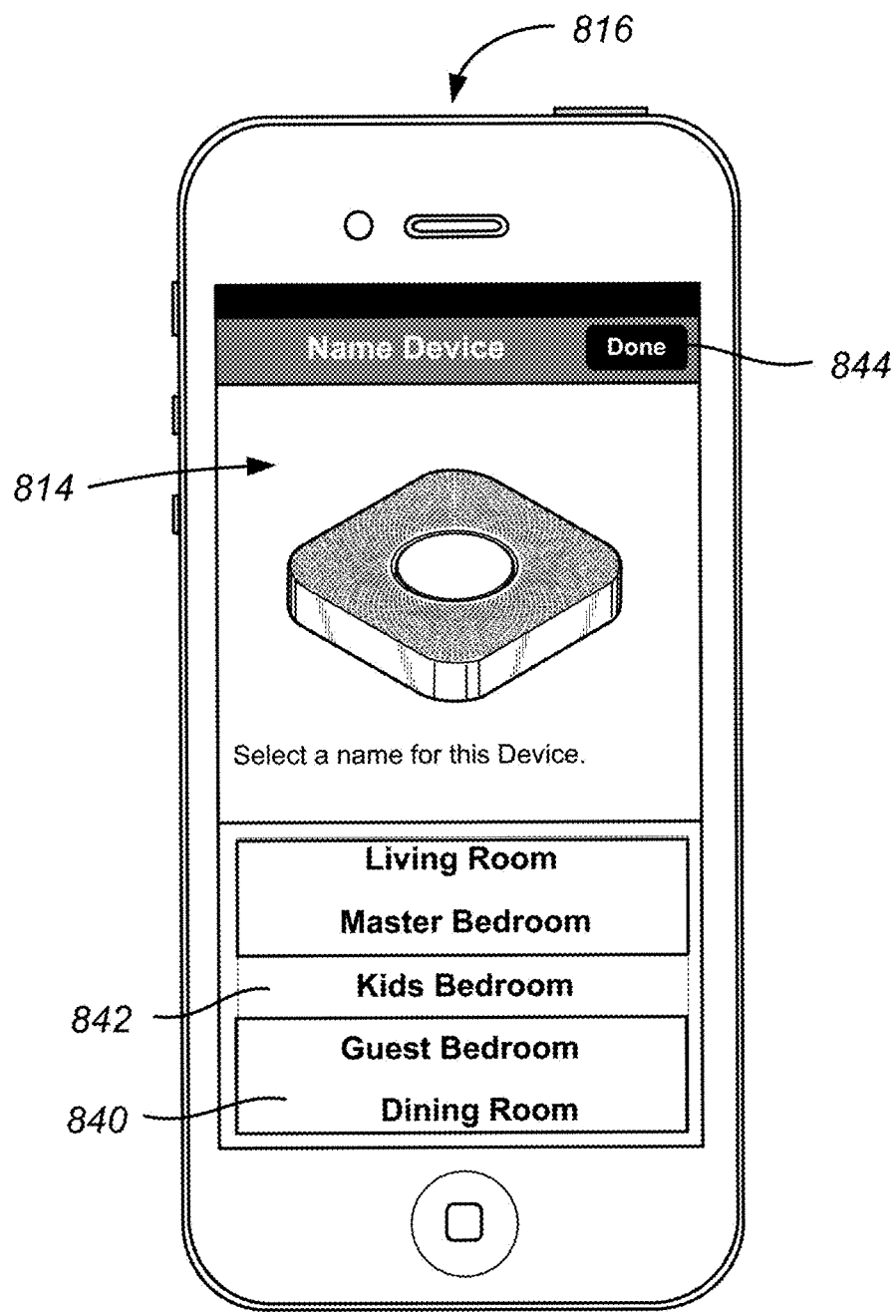

FIG. 8Q illustrates an example of the physical process associated with step 756. An interface may be provided at application 814 on mobile computing device 816 to allow a user to select a location for first hazard detector 400, as shown in FIG. 8Q. The user may perform a slide gesture on a list object 840 causing the list of rooms included on list object 840 to scroll up or down and place one of the rooms in a select field 842. When the desired room appears in select field 842, the user may select a done button 844 to confirm the room selection. As shown in FIG. 8Q, list object 840 includes the following selectable rooms: Living Room, Master Bedroom, Kids Bedroom, Guest Bedroom and Dining Room. In some embodiments, list object 840 may also include different and/or additional selectable rooms, e.g., other house rooms, office building rooms, a garage, or mobile home rooms. Alternatively, application 814 may simply provide a field (e.g., field 838, as shown in FIG. 8O) in which the user can manually enter a room name for the location in which first hazard detector 400 is installed or another name for first hazard detector 400.

The could server 164 may associate first hazard detector 400 with the location selected at step 756. Thus, within the association created at step 752, step 756 may further classify first hazard detector 400 according to the selected location at the online management account. This may allow services 204 (shown in FIG. 2) to further interpret the data received at home data 202 (shown in FIG. 2) and provide the user with analysis that takes into account the location of first hazard detector 400. Additionally, this association may allow a user to differentiate hazard detectors by name and separately manage each at a single online management account.

Figure 8R:
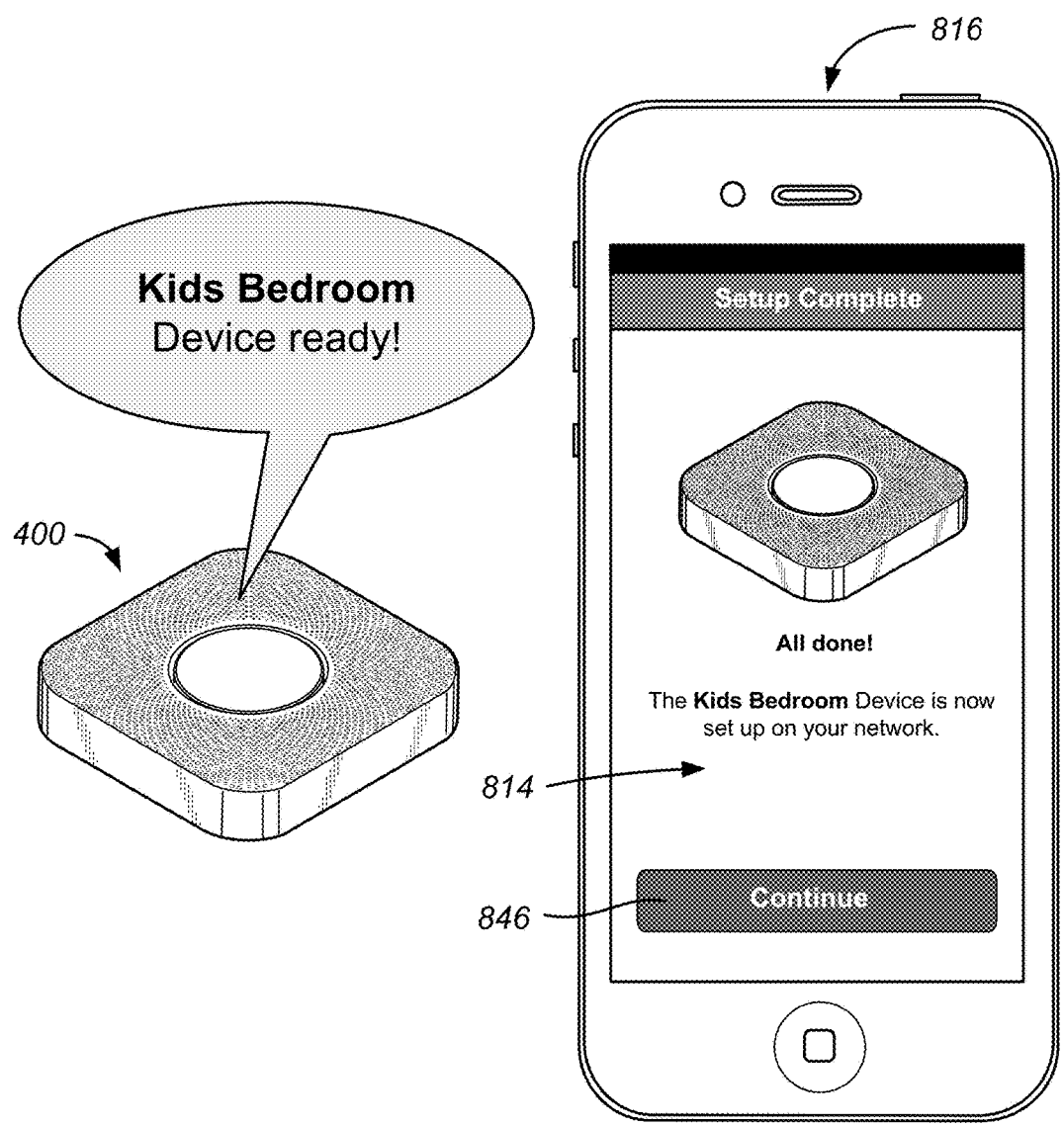

FIG. 8R illustrates a further example of the physical process associated with step 756. Following the user's selection of done button 844, application 814 may display the screen shown in FIG. 8R in order to provide confirmation to the user that the setup for first hazard detector 400 is complete. First hazard detector 400 may also generate a corresponding audio and/or visual indicator. For example, as shown in FIG. 8R, the hazard detector may generate the following speech when "Kids Bedroom" is the location selected at step 756: "Kids Bedroom Device ready". Alternatively, first hazard detector 400 may generate other audio and/or visual confirmation of the successful association. These confirmations signify that first hazard detector 400 has been associated with the selected location at the online management account on sever 164. The user may tap a continue button 846 to confirm that the confirmation screen has been viewed. Although additional steps may not be required in order to complete the setup of first hazard detector 400, the user may still proceed with additional steps to verify first hazard detector 400 is functioning properly. An example of this verification process is described below.

Figure 8S:
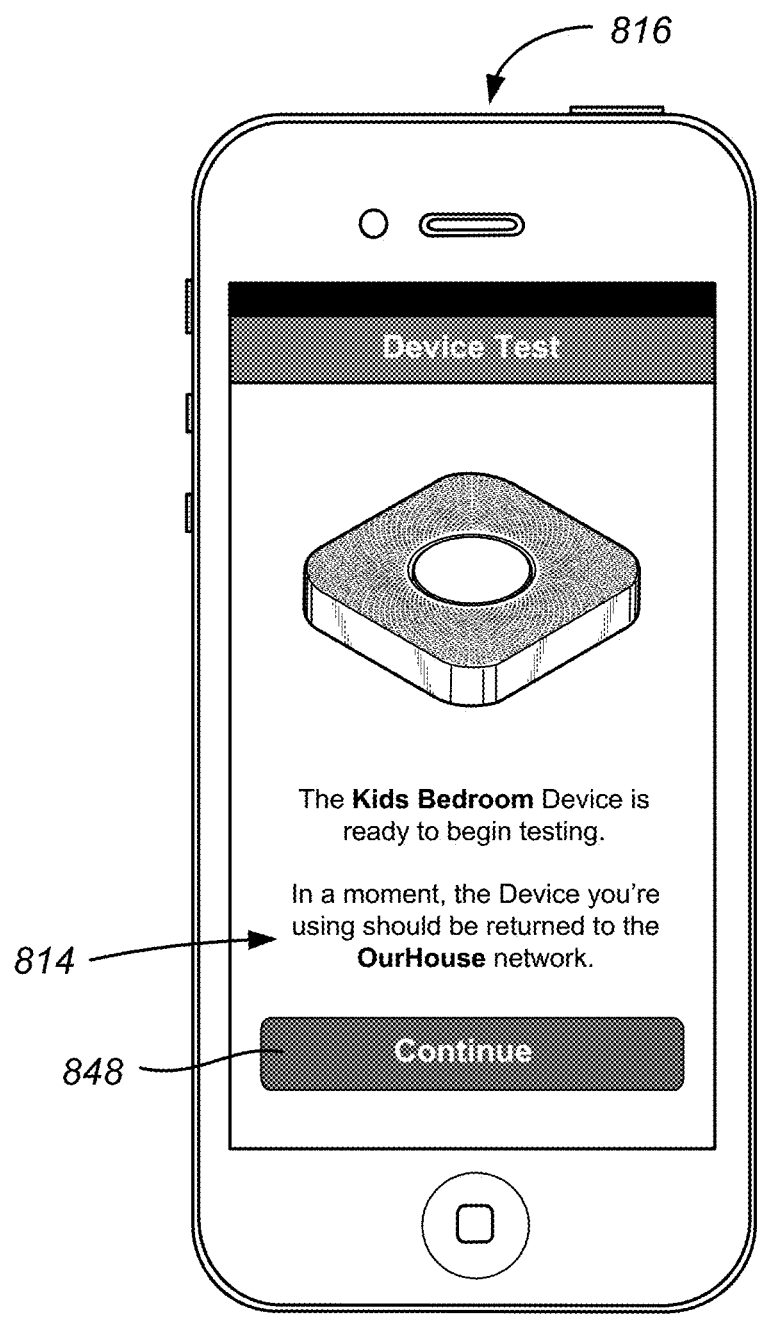
Figure 8T:
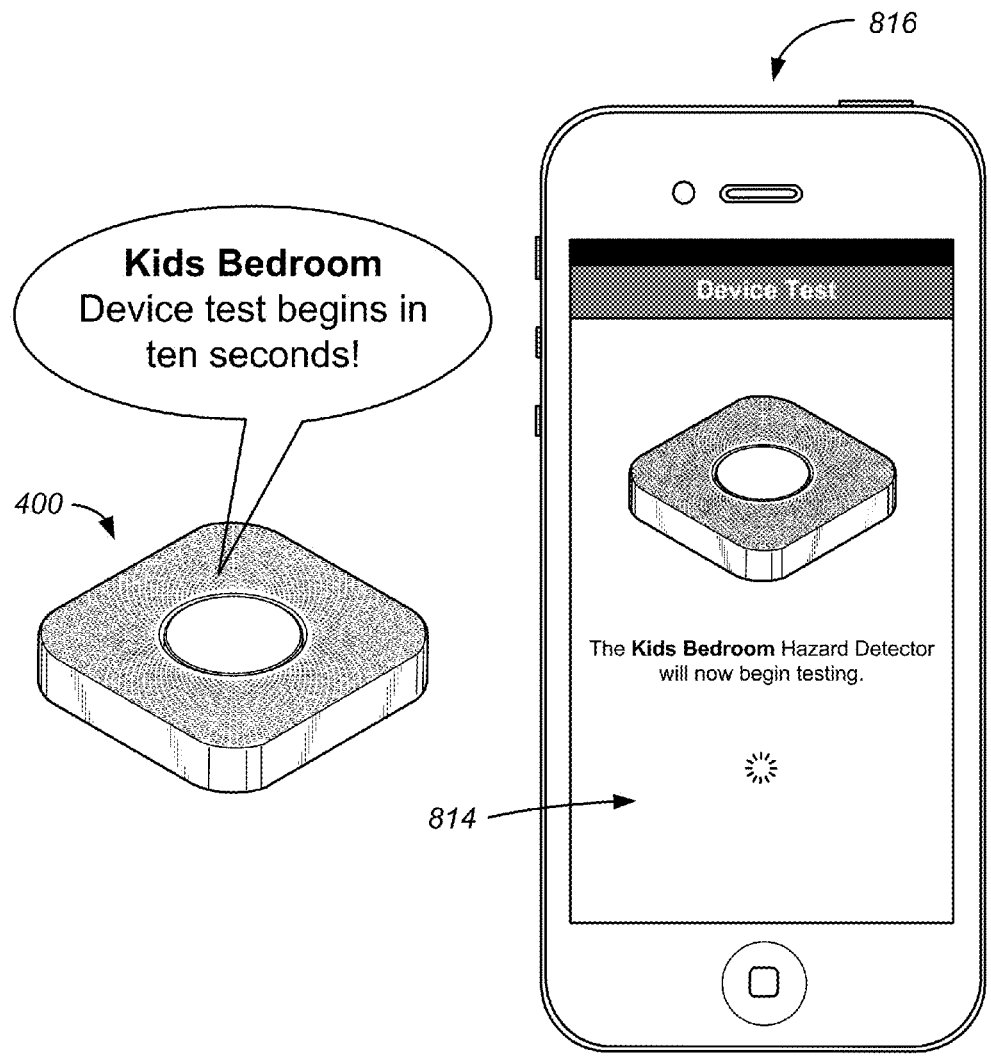
Figure 8U:
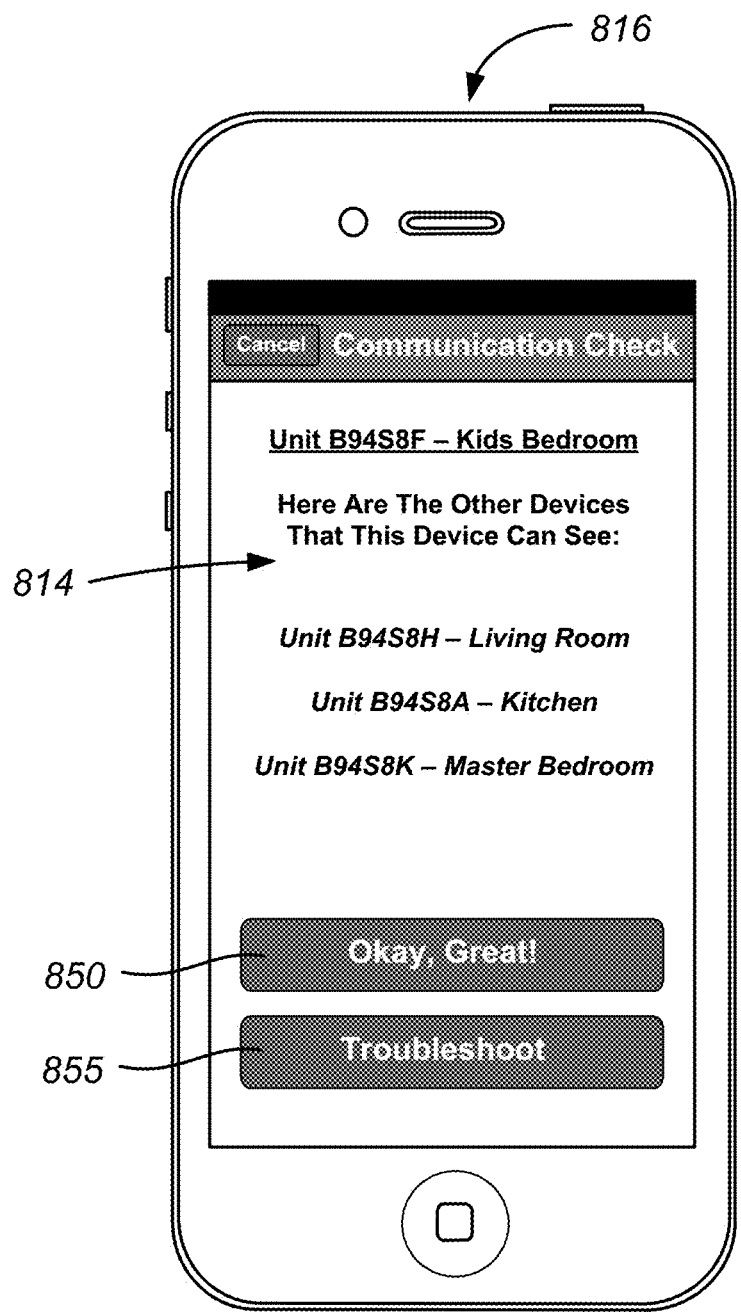

Method 730 may include step 758, which is an optional step (as indicated by dashed lines in FIG. 7G-2). At optional step 732, a user may conduct a test of first hazard detector 400 to verify it is functioning properly. FIG. 8S and FIG. 8T illustrate a physical process associated with step 758. As shown in FIG. 8S, application 814 may display a screen to notify the user that first hazard detector 400 is ready to begin testing. If and when the user wants to begin testing, the user may select continue button 848. Application 814 also may display a notification that the user may reconnect mobile computing device 816 with a router linked to the internet 162 (e.g., "OurHouse" network). That is, communication is now possible with first hazard detector 400 in the absence of a connection over the Wi-Fi network provided by first hazard detector 400; communication can occur over internet 162 via cloud server 164.

Application 814 may display the screen shown in FIG. 8T in order to provide confirmation that a test of the first hazard detector 400 has been initiated. The first hazard detector 400 may also generate a corresponding audio and/or visual indicator. For example, as shown in FIG. 8T, the first hazard detector 400 may generate the following speech: "Kids Bedroom Device test begins in ten seconds!". Alternatively, the first hazard detector 400 may generate other audio and/or visual confirmation of the test initiation. The test may include the generating of one or more alerts or alarms in order to ensure the device is functioning correctly.

Figures 1, 7H:
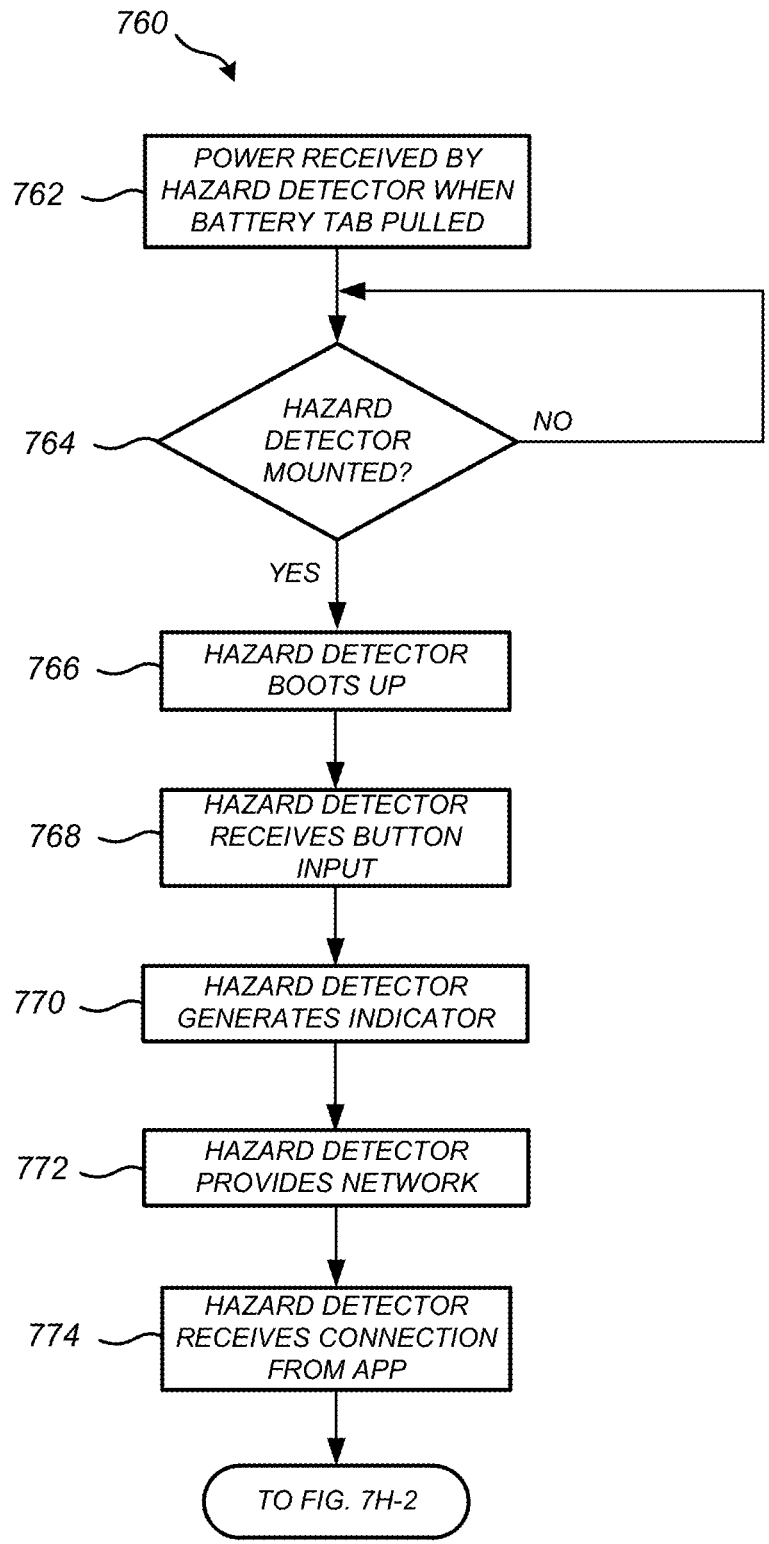
Figures 2, 7H:
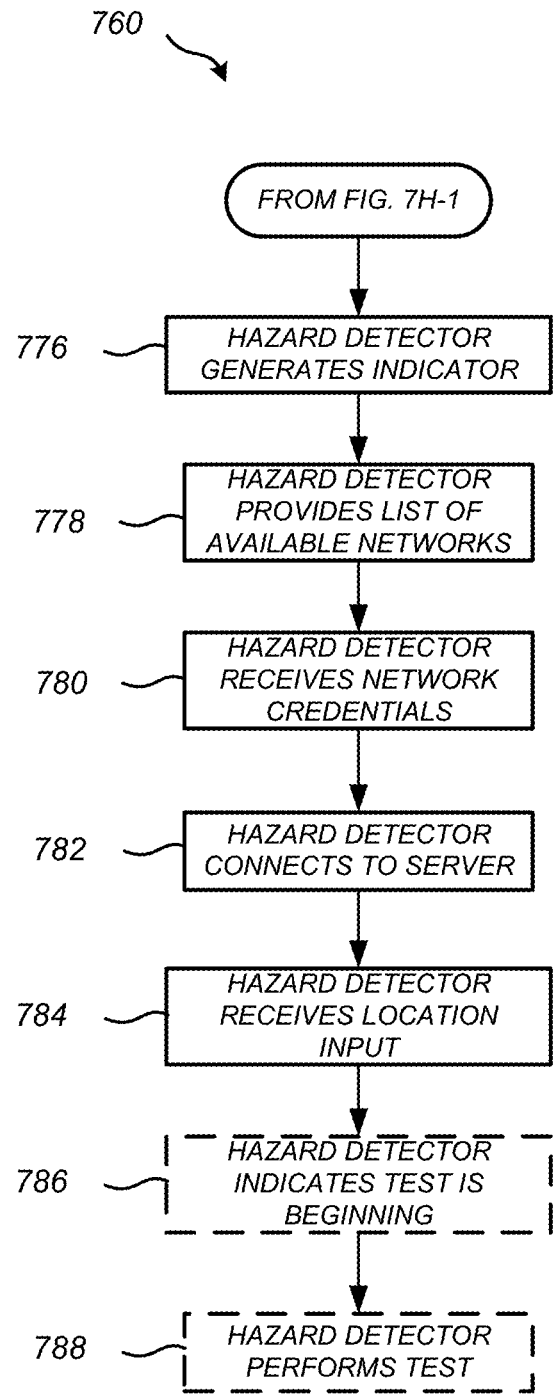

FIG. 7H-1 and FIG. 7H-2 illustrate a method 760 performed by first hazard detector 400 for establishing a pairing between first hazard detector 400 and an online management account, according to an embodiment. Similar to methods 700 and 730, method 760 may be used in smart home environments that do not already include one or more network connected hazard detectors. Each step of method 760 is discussed in detail below, and some steps are discussed with reference to additional figures (e.g., FIGS. 8A-T) that may provide physical illustrations related to the steps of method 760.

At step 762 of method 760, first hazard detector 400 may receive power when a battery tab is pulled, exposing the terminals of the batteries, e.g., the batteries of battery pack 450 (shown in FIG. 4A), and providing operating power or backup power to first hazard detector 400. Although first hazard detector 400 may receive power at step 762, it may not boot up until a later step of method 760.

At step 764, first hazard detector 400 may determine whether it has been mounted to a wall or ceiling of a home or other structure via mounting plate 802 (shown in FIG. 8C). As discussed above, first hazard detector 400 and mounting plate 802 may include corresponding features such that first hazard detector 400 becomes locked onto mounting plate 802 when a user twists first hazard detector 400 in a direction 808, as shown in FIG. 8C. First hazard detector 400 may also include circuitry and sensors that cause first hazard detector 400 to "boot up" or initiate its operating system when the sensors determine that first hazard detector 400 has been mounted on mounting plate 802. Unless the sensors determine that first hazard detector 400 has been mounted on mounting plate 802, the first hazard detector 400 may not proceed to step 766, as described below.

An advantage of these mount detection sensors may be that the setup process for first hazard detector 400 may not begin until it has been mounted on mounting plate 802 that may have already been mounted, e.g., on a wall or ceiling, within a home or other structure. Accordingly, the setup process may take into account the specific conditions, environments, and/or locations in which first hazard detector 400 has been installed. For example, during the setup process, first hazard detector 400 may be connected to a network based on which network provides a strong signal to its mounted location and/or associated with the specific room of a home or other structure in which first hazard detector 400 is mounted. The benefits of a network connection for hazard detectors and associating hazard detectors with specific locations within a home or other structure are described in detail herein.

In another embodiment, first hazard detector 400 may bypass step 764 and proceed directly to step 766 after the battery tab is pulled at step 762, even if first hazard detector 400 has not been mounted on mounting plate 802. In this embodiment, first hazard detector 400 may still be optionally located proximate to its eventual location of operation when the battery tab is pulled, but the device is not required to be mounted for the setup process to begin. This flexibility may be advantageous in some situations, e.g., where a user prefers to setup first hazard detector 400 before mounting it and/or where the user is not interested in utilizing location based and/or networked connected features of first hazard detector 400. In short, the first hazard detector 400 does not need to be mounted in order to continue with the setup procedure.

At step 766, first hazard detector 400 may boot up. In addition, as shown in FIG. 8D, first hazard detector 400 may generate music to indicate that it is booting up, e.g., hazard detector may generate music via speaker 550 (shown in FIG. 5C). Alternatively, first hazard detector 400 may generate any kind of sound (e.g., tones or speech) and/or visual indicators (e.g., LED lights 652 may produce light according to a predetermined pattern).

At step 768, hazard detector may receive a button input. For example, a user may press button 600 (shown in FIG. 6A) in direction 810, as shown in FIG. 8E, to begin communicating with first hazard detector 400. Alternatively, hazard detector may receive voice commands from a user.

At step 770, first hazard detector 400 may generate audio and/or visual indicators, as shown in FIG. 8F, to indicate it has received the button input at step 768. For example, first hazard detector 400 may tell the user "Device ready! Press again to test." First hazard detector 400 may also generate pulsing blue light rays 812. As discussed below, these indicators and/or other verbal instructions generate at the device may instruct the user to open an app or a webpage at a computing device in order to provide the code. First hazard detector 400 may also generate audio and/or visual indicators and receive input via button 600 in order to allow the user to select a language preference for the operation of first hazard detector 400. Further discussion concerning this example may be found in the "Smart Hazard Detector Alerts and Indicators" section below.

At step 772, first hazard detector 400 may create or provide a temporary Wi-Fi network. For example, as indicated in FIG. 8K, first hazard detector 400 may provide a temporary Wi-Fi network called "Device-659F38". Alternatively, first hazard detector 400 may provide one or more other networks for communicating with computing devices, e.g., mobile computing device 816, using other wireless protocols, e.g., any of the other wireless protocols mentioned herein. This temporary network may provide a convenient, initial means for allowing first hazard detector 400 to communicate with mobile computing device 816 while first hazard detector 400 is not connected to internet 162.

At step 774, first hazard detector 400 may receive a connection from application 814. For example, a user may connect mobile computing device 816 to the "Device-659F38" via a settings app 834, as shown in FIG. 8L. Thereafter, application 814 may connect to first hazard detector 400 via the "Device-659F38" network. As described above, connecting to the temporary Wi-Fi network generated by the first hazard detector 400 need not require a password, and thus may be unsecured. Some embodiments may include receiving a local pairing code from the mobile computing device 816 that can be used to authenticate the identity of the mobile computing device 816. The local pairing code may be obtained by the mobile computing device 816 by scanning a QR code or by manual entry by a user.

At step 776, as shown in FIG. 7H-2, first hazard detector 400 may also generate an audio and/or visual indicator to inform the user that mobile computing device 816 and first hazard detector 400 have been successfully connected via application 814. For example, as shown in FIG. 8M, the hazard detector may generate the following speech: "Device connected to app!". Alternatively, first hazard detector 400 may generate other audio and/or visual confirmation of the successful connection.

At step 778, first hazard detector 400 may provide a list of available networks to application 814 via a temporary Wi-Fi network, e.g., the "Device-659F38" network. These available networks include the networks first hazard detector 400 is able to discover and connect thereto. In this manner, first hazard detector 400 can ensure the network credentials received at step 780 (below) correspond to a network that first hazard detector 400 can use to connect to cloud server 164 at step 782 (below). In other embodiments, application 814 may generate its own list of available networks. However, networks discovered by application 814 may not be accessible by first hazard detector 400 in some situations, e.g., where mobile computing device 816 is not proximate to first hazard detector 400 during the performance of method 760 or where electromagnetic interference is experienced by first hazard detector 400 but not by mobile computing device 816.

At step 780, first hazard detector 400 may receive input corresponding to network credentials. For example, as shown in FIG. 8N, application 814 may instruct the user to select user's main home network from a list 837 of Wi-Fi networks detected provided to application 814 at step 778. The user to select a network, e.g., the "OurHouse" network, that first hazard detector 400 can use to connect to internet 162. Upon selecting a network by the user, the user may enter the password for connecting to the selected network at application 814, as shown in FIG. 8O. These credentials (e.g., the identity of the home Wi-Fi network in the associated password) may be sent by application 814 and received by first hazard detector 400, at step 680, so that first hazard detector 400 can gain access to internet 162 and cloud server 164 via the router of the selected network.

In some embodiments, the first hazard detector 400 may also receive configuration information from the mobile computing device 816 in addition to the network credentials and identity of the home Wi-Fi network. The configuration information may include an account pairing token received from the cloud server 164. The configuration information may also include an account ID for the user account a DNS hostname identifying an Internet address for the cloud server 164, and/or other information described in detail above.

At step 782, first hazard detector 400 may connect to cloud server 164 using the network credentials received at step 780 to access the home Wi-Fi network. The first hazard detector 400 may then connect to the cloud server 164 by using the DNS hostname provided in the configuration information. For example, first hazard detector 400 may connected to a local network (e.g., "OurHouse"), internet 162, and cloud server 164 (e.g., via the website nest.com). First hazard detector 400 may generate a corresponding audio and/or visual indicator. For example, as shown in FIG. 8P, the hazard detector may generate the following speech: "Device connected to nest.com!". Alternatively, first hazard detector 400 may generate other audio and/or visual confirmation of the successful connections. These confirmations may also signify that first hazard detector 400 has been associated with an online management account and that the user is able to access or otherwise benefit from services 204 (shown in FIG. 2), e.g., the user can communicate with first hazard detector 400 using a computer (e.g., a desktop computer, laptop computer, or tablet) or other portable electronic devices (e.g., a smartphone 166).

In order to complete the pairing process, the first hazard detector 400 can authenticate the communication session with the cloud server 164 by sending information derived from the PKI certificate and/or private key stored on the first hazard detector 400 during a manufacturing or post-manufacturing process. After authenticating the communication session, the first hazard detector 400 can send the account ID and the account pairing token to the cloud server 164. The cloud server 164 can then verify that the account pairing token matches the token sent earlier to the mobile computing device 816 and pair the first hazard detector 400 with the user account specified by the account ID.

At step 784, first hazard detector 400 may receive input corresponding to the location of first hazard detector 400. This information may be received from cloud server 164 after application 814 sends input received from user, as shown in FIG. 8Q, to cloud server 164. The information may also be stored at the user's online management account and used to enhance the features of services 204 provided to first hazard detector 400. The location information may even be used to further configure first hazard detector 400. For example, the location of first hazard detector 400 may be used to alter the way alerts are provided to users and/or how first hazard detector 400 interprets characteristics measured by its sensors. More specifically, if first hazard detector 400 is installed in a kitchen, smoke detection sensitivity may be decreased (e.g., low levels of smoke may be normal in a kitchen so the alarm threshold for smoke may be increased) and/or the alert or alarm sequence may be altered (e.g., more opportunities may be provided to a user to preemptively "hush" an alarm for a known, safe smoke condition).

Following the completion of step 784, first hazard detector 400 may also generate audio and/or visual indicators. For example, as shown in FIG. 8R, the hazard detector may generate the following speech: "Kids Bedroom Device ready". Alternatively, first hazard detector 400 may generate other audio and/or visual confirmation of the successful association. These confirmations signify that first hazard detector 400 has been associated with the selected location at the online management account on cloud sever 164. Although additional steps may not be required, first hazard detector 400 may still proceed with additional steps to verify it is functioning properly. An example of this verification process is described below.

Method 760 may also include steps 786 and 788, which are optional steps (as indicated by dashed lines in FIG. 7H-2). At step 786, first hazard detector 400 may generate audio and/or visual indicators to confirm that a test of first hazard detector 400 has been initiated. The test may be initiated if a button input or an instruction from application 814 is received at first hazard detector 400, e.g., when continue button 848 is pressed at application 814, as shown in FIG. 8S. As one example, hazard detector may generate speech to confirm a test has been initiated, e.g., "Kids Bedroom Device test begins in ten seconds!", as shown in FIG. 8T. Alternatively, first hazard detector 400 may generate other audio and/or visual confirmation of the test initiation.

At optional step 788, a first hazard detector 400 may perform a self test to verify it is functioning properly. The test may include the generating of one or more alerts or alarms in order to ensure the device is functioning correctly.

In some embodiments, the input provided at application 814 during methods 700, 730 or 760 may be accomplished using speech recognition, air gestures, eye tracking and blink detection and/or other input means. Again, as mentioned above, methods 700, 730 or 760 may also occur using a webpage of a computing device. Furthermore, although the communication between first hazard detector 400 and a mobile computing device 816 is described above as occurring over Wi-Fi, other wireless protocols supported by both first hazard detector 400 and mobile computing device 816 may be used in the alternative. Also, while a limited number of visual and audio indicators generated by first hazard detector 400 were described above, other indicators may also be generated by first hazard detector 400 during methods 700, 730 or 760. Additional examples may be found in the "Smart Hazard Detector Alerts and Indicators" section below.

As discussed above in relation to methods 700, 730 and 760, these methods may begin before first hazard detector 400 is mounted on a wall, according to some embodiments. However, in these embodiments, mounting first hazard detector 400 on the wall, e.g., via mounting plate 802, may trigger a self-test process whereby previously established network connectivity may be re-verified. Preferably, where first hazard detector 400 is one of multiple installed hazard detectors (e.g., a mesh network of hazard detectors, as discussed in relation to FIG. 1), first hazard detector 400 may be programmed to ascertain whether the mesh network connectivity of first hazard detector 400 when mounted is as good as or better than before first hazard detector 400 was mounted. By way of example, if there was connectivity (either directly or through an intermediate mesh node) between first hazard detector 400 and five other specific hazard detectors before mounting to the wall, then the self-test makes sure that there is connectivity to at least those five other specific hazard detectors after mounting first hazard detector 400 to the wall. If the established network connectivity and/or mesh network connectivity is not verified during the self-test, a notification of such may be provided at first hazard detector 400 or application 814.

According to another embodiment, there is provided another method for verifying the functionality of hazard detectors, e.g., hazard detectors setup according to methods 700/730/760, that are installed in their respective locations within a home or other structure. In contrast with the last embodiment discussed, this method may not be triggered by mounting first hazard detector 400 on a wall, e.g., via mounting plate 802. The user experience is as follows: the user walks up to any first hazard detector 400 in the home or other structure and presses button 600 (shown in FIG. 6A) twice. Responsive thereto, the hazard detectors broadcast interconnect signals to every other installed hazard detector in the house (or other structure) to enter into a functional verification mode, wherein each hazard detector performs a self-test and announces, using an audio speaker (e.g., speaker 550 shown in FIG. 5C), the results of that self-test as it is happening. The interconnect signal may be broadcasted using relatively low power wireless communications circuitry, e.g., an IPv6 over low power Wireless Personal Area Network (6LoWPAN) module or a ZigBee module capable of communicating according to an 802.15.4 protocol.

As one example, during a successful self-test, the hazard detectors may generate the following audio: "Testing Smoke Detection alarm . . . (beep) (beep) (beep) smoke alarm test successful . . . testing CO alarm (boop) (boop) (boop) . . . CO alarm test successful" and so forth. Alternatively, each of the hazard detectors may have a pre-assigned ID number (e.g., number one through the number of installed hazard detectors) and may generate speech to repeatedly enunciate their respective ID numbers to indicate the broadcasted interconnect signal is being successfully received by the respective hazard detectors. All of the hazard detectors may perform one or both of these self-test simultaneously and until they are instructed to stop. During the self-test, the user may walk around the house or other structure to confirm that each unit is actively and properly going through its audible verification process as expected. Hazard detectors can be instructed to stop this process by another double-press of button 600 on any of the hazard detector units and/or by a command input at a smartphone app, e.g., application 814. If any of the self-tests fail, the user may troubleshoot the failure by relocating one or more hazard detectors, adding additional hazard detectors at strategic location to close the node loop, and/or confirming that each hazard detector has been properly setup.

Figure 7I:
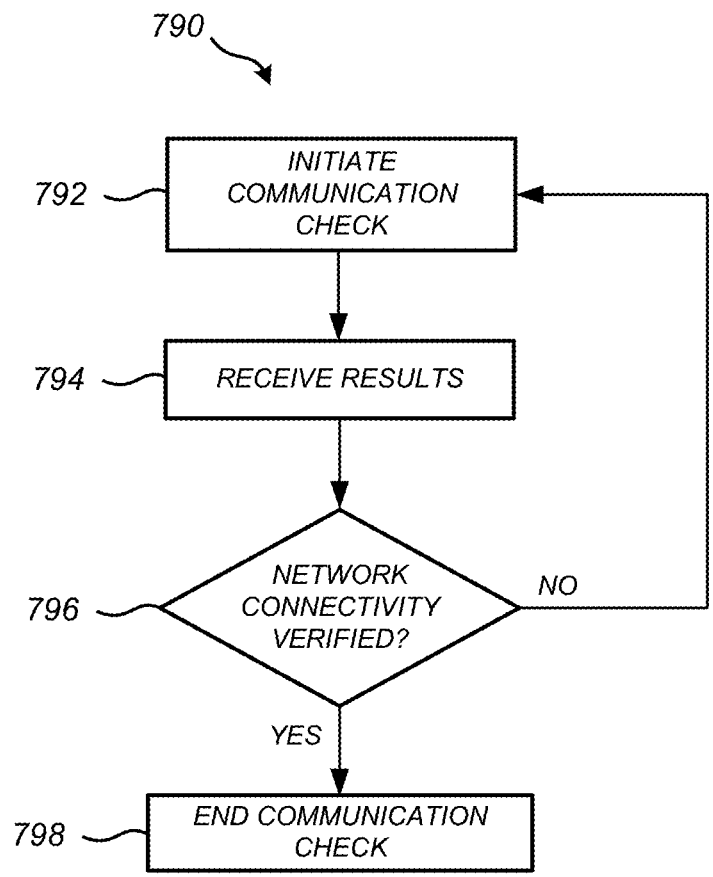

In yet another embodiment, a method 790 may be used to test or verify network connectivity and/or mesh network connectivity of multiple hazard detectors mounted in a home or other structure, as illustrated in FIG. 7I. This method may be triggered by mounting first hazard detector 400 on the wall, e.g., via mounting plate 802, at the conclusion of embodiments of methods 700/730/760 that do not include mounting first hazard detector 400. At step 792 of method 790, cloud server 164 may initiate a communication check or network connectivity verification in response to mounting first hazard detector 400. For example, cloud server 164 may receive a notification from a mesh networked hazard detector indicating that the hazard detector has been mounted. In response to this notification, cloud server 164 may send instructions to the hazard detectors, e.g., first hazard detector 400, on the mesh network. The instructions received at the hazard detectors may cause each hazard detector to broadcast interconnect signals to each other using relatively low power wireless communications circuitry, e.g., an IPv6 over low power Wireless Personal Area Network (6LoWPAN) module or a ZigBee module capable of communicating according to an 802.15.4 protocol.

At step 794, cloud server 164 may receive the results of the communication check of step 792. These results may include a list of the hazard detectors that can be seen by each of the respective hazard detector. Each hazard detector may communicate their respective lists directly to cloud server 164. Alternatively, the mesh network may include a "spokesman" node hazard detector that communicates with other "lower power" node hazard detectors using low power communications circuitry and then conveys results received from the "low power" nodes to cloud server 164. Then, cloud server 164 may communicate the results it received to application 814, which results (e.g., the living room, kitchen, master bedroom hazard detectors are viewable by the kids bedroom hazard detector) are then displayed on a Communication Check interface of application 814, as shown in FIG. 8U. In addition, application 814 may receive and display other communication check results, e.g., specifically which hazard detectors can be seen by each of the other hazard detectors. Each hazard detector may also display indicators, e.g., green lights generated at the hazard detectors, to signify that the hazard detectors can see at least one other hazard detector in the mesh network and/or that there is at least one network path between any hazard detector in the mesh and any other hazard detector.

At step 796, cloud server 164 may determine whether the network connectivity has been verified, i.e., whether the mesh network is missing any hazard detectors. Cloud server 164 may make this determination by comparing the results with the history of hazard detectors paired with an online management account to determine if any hazard detectors are missing from the results of step 794. Alternatively, application 814 may similarly compare the results of step 794 with the history of hazard detectors paired with an online management account via application 814 or otherwise.

If the network connectivity is not verified at step 796, steps 792 and 794 may need to be performed again. However, if the network connectivity is verified, method 790 may proceed directly to step 798, i.e., the communication check may conclude. In some cases, user input will not be required to manually verify network connectivity at step 796, as discussed above. Nonetheless, the user may still provide input corresponding to the determination of step 796. For example, as shown in FIG. 8U, the user may select a "Okay, Great!" button 850 if the user wants to verify network connectivity at step 796. The user may also select troubleshoot button 855 if problems were discovered with network connectivity. The user may troubleshoot by relocating one or more hazard detectors, adding additional hazard detectors at strategic location to close the node loop, confirming that each hazard detector has been properly setup and/or other methods. Thereafter, steps 792, 794 and 796 may be repeated as many times as necessary or desired by the user, server, and/or hazard detectors in order to resolve and confirm the resolution of network connectivity issues of the mesh network of hazard detectors in a home or other structure.

Streamlined Setup for a Second Smart Hazard Detector

In some situations, a user may wish to add more than one hazard detector to a smart home environment to create a mesh network, as referred to above. In some embodiments, methods 700, 730 and 760 may be repeated for additional hazard detectors in order to pair them with the online management account. Alternatively, the method for adding additional hazard detectors may vary from methods 700, 730 and 760 in a manner that reduces or minimizes an amount of user effort involved. An example of a method that uses method 700 (and methods 730 and 760) to add a first hazard detector and a modified version of method 700 (and methods 730 and 760) to add an additional hazard detector is shown in the following figure.

Figure 9:
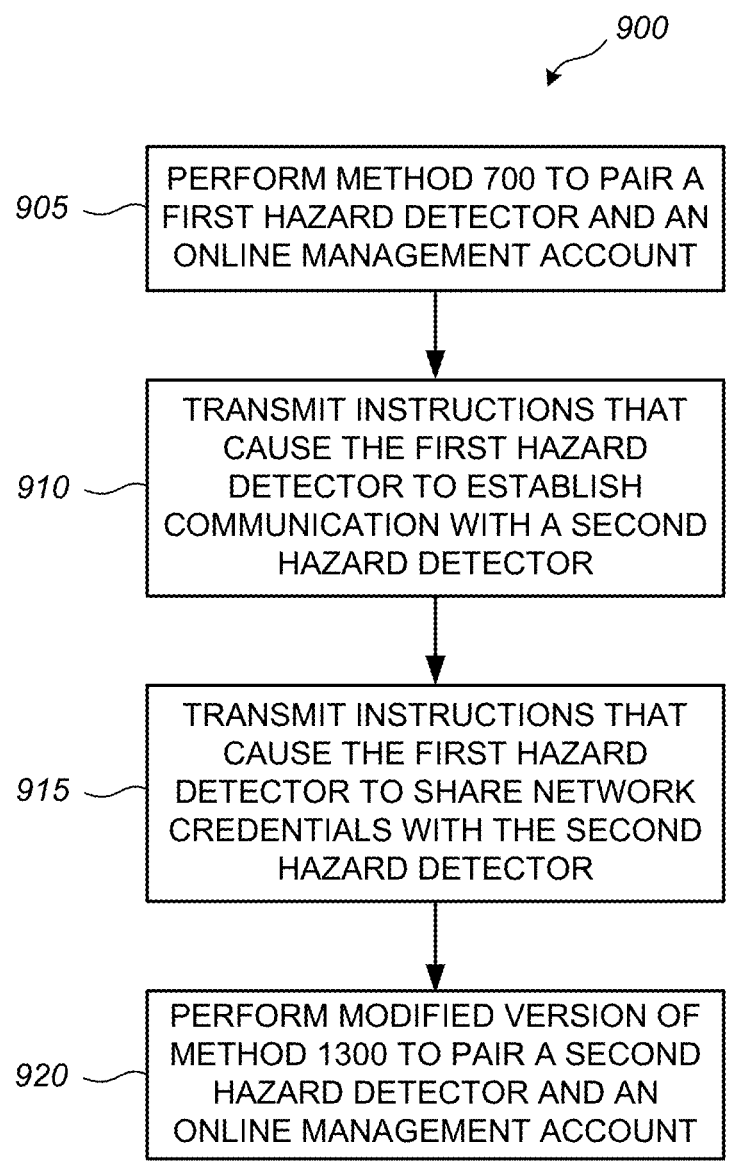
FIG. 9 illustrates a method for pairing two or more hazard detectors and an online management account, according to an embodiment.

FIG. 9 illustrates a method for pairing two or more hazard detectors (e.g., first hazard detector 400) and an online management account, according to an embodiment. At step 905 of method 900, an embodiment of method 700 may be performed by cloud server 164 in order to pair a first hazard detector and an online management account. Methods 730 and 760 may also be performed at step 905 from the perspective of user and hazard detector, respectively.

At step 910, instructions are transmitted that cause the first hazard detector to establish wireless communication between the first hazard detector and a second hazard detector. To accomplish step 910, user may open or install and open an app, e.g., application 814, on a computing device, e.g., computing device 816. Alternatively, a webpage configured to communicate with the online management account may be used in performing step 910. Upon opening the app, an option to add another hazard detector, a second hazard detector, may be selected at the app interface. Using a wireless protocol such as Wi-Fi, the app may then transmit instructions via a server, e.g., cloud server 164 (shown in FIG. 1), and the Internet 162 (shown in FIG. 1) to the first hazard detector. For example, the first hazard detector may be instructed to use a local device network that is separate from a home Wi-Fi network, such as an IPv6 over low power Wireless Personal Area Network (6LoWPAN) module capable of communicating according to an 802.15.4 protocol to provide a 6LoWPAN network. A ZigBee module capable of communicating according to an 802.15.4 protocol may also be used to provide a network. As another example, a Thread module capable of communicating according to a protocol promulgated by the Thread Group and based on 802.15.4, IETF IPv6, and 6LoWPAN can be used to provide a network.

The local device network provided by the first hazard may use a unique network name that may be recognized by other hazard detectors and/or assign itself one or more IPv6 addresses that include a rendezvous prefix. The rendezvous prefix may help a hazard detector to identify the networks it should join. Alternatively, the local device network may be provided in another manner that allows a second hazard detector to recognize it as a network that should be joined. The second hazard detector may also provide a local device network in a similar manner. When one hazard detector discovers another hazard detector's local device network, it may terminate its joining network and connect to the network provided by the other hazard detector. Thus, the first hazard detector may join the second hazard detector's network and vice versa. Either way, a wireless communication may be established in this manner between the first hazard detector and the second hazard detector over the local device network or another network operating with a low power wireless protocol.

At step 915, instructions are transmitted that cause the first hazard detector to share network credentials with the second hazard detector. The instructions may originate from an app and may be routed through the first hazard detector. Thereafter, the first hazard detector may leverage the wireless communication established between it and the second hazard detector over the second wireless protocol (i.e., the local device network) in order to the share network credentials. The network credentials may include a network router name and password for connecting to the Internet 162 through a home Wi-Fi network. This network router may also be the network router that the first hazard detector is using to receive the instructions of step 910. The second hazard detector may use the network credentials to connect to the internet 162. Thereafter, the first and second hazard detectors may disable their local device networks and use Wi-Fi to connect to the Internet via a network router in order to communicate with the app and/or an online management account located at cloud server 164.

At step 920, a modified version of method 700 (shown in FIG. 7) may be performed in order to establish a new pairing between the second hazard detector and the online management account using the first wireless protocol. The modified version of method 700 of step 920 may include all the steps of embodiments and variations of method 700 with a few exceptions. For example, at the modified step of 707, step 920 may automatically use the online management account credentials already stored at the app to associate the second hazard detector with the online management account instead of creating or entering online management account credentials. In addition, step 920 would clearly not require connecting the second hazard detector to internet 162 because that connection was already accomplished at step 915 above. Similarly, at step 920, modified versions of methods 730 and 760 would not need to perform corresponding of methods 730 and 760, e.g., steps 740, 742, and 754 and steps 772, 774, 776 and 778, respectively.

Accordingly, method 900 may allow for adding additional hazard detectors in a manner that requires less user effort than method 700. Steps 910-920 may be repeated for a third or other additional hazard detectors, substituting the next device for the second device in steps 910-920, in order to add a third or other additional hazard detectors to a smart home environment. In addition, steps 910-920 may be repeated without involving the first device, e.g., using the second device to setup a third device, substituting the second device for the first device and the third device for the second device in steps 910-920.

As mentioned above, a hazard detector according to the present invention may provide audio and/or visual indicators during the setup process to guide and provide feedback to the user. Similar audio and/or visual feedback may be provided during method 900. Again, while a limited number of visual and audio indicators generated by first hazard detector 400 were described above, other indicators may also be generated by first hazard detector 400 during method 900. The following figures provide additional examples and a more complete discussion of how a first hazard detector can be used to provision additional hazard detectors.

Figure 10:
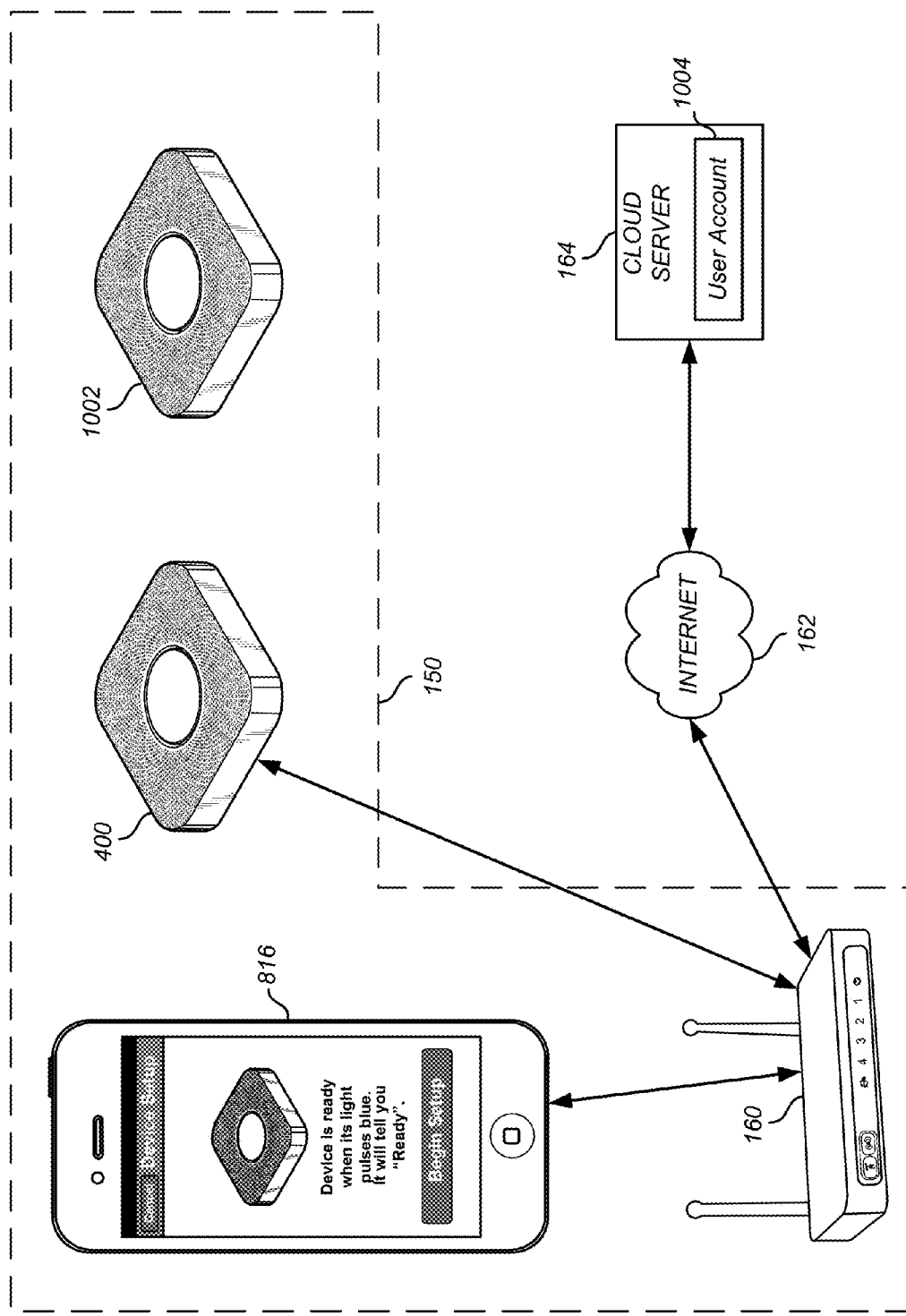
FIG. 10 illustrates some of the devices involved with provisioning a second hazard detector, according to some embodiments.

FIG. 10 illustrates some of the devices involved with provisioning a second hazard detector 1002, according to some embodiments. Turning back briefly to FIG. 1, a router 160 may be communicatively coupled to the Internet 162 and configured to communicate with a central server or cloud-computing system 164 ("cloud server"). The router 160 may be located inside of a structure 150, such as inside of a home of a user where the hazard detectors will be installed.

According to method 700 above, a first hazard detector 400 may already be installed and paired with a user account 1004 at the cloud server 164. The user may be able to communicate with the first hazard detector 400 using a mobile communication device 816, such as a cell phone. Generally, a home Wi-Fi network will be established within the structure 150 by the router 160. The first hazard detector 400 can communicate through the router 160 and the Internet 162 with the cloud server 164 and the mobile computing device 816.

With this configuration established, a user may wish to install a second hazard detector 1002. The second hazard detector 1002 can be installed in another area of the structure 150. For example, the first hazard detector 400 may be installed on a ground-level, while the second hazard detector 1002 may be installed on a second-floor level. As described above, the user can set up and pair the second hazard detector 1002 according to method 700 described above. However, this may involve the same steps of entering the Wi-Fi password, identifying a local network, and so forth. Method 900 and the following discussion offer a more streamlined approach to setting up and pairing the second hazard detector 1002 that can greatly reduce the possibility of user error and the amount of time and effort required to set up the second hazard detector 1002.

Figure 11:
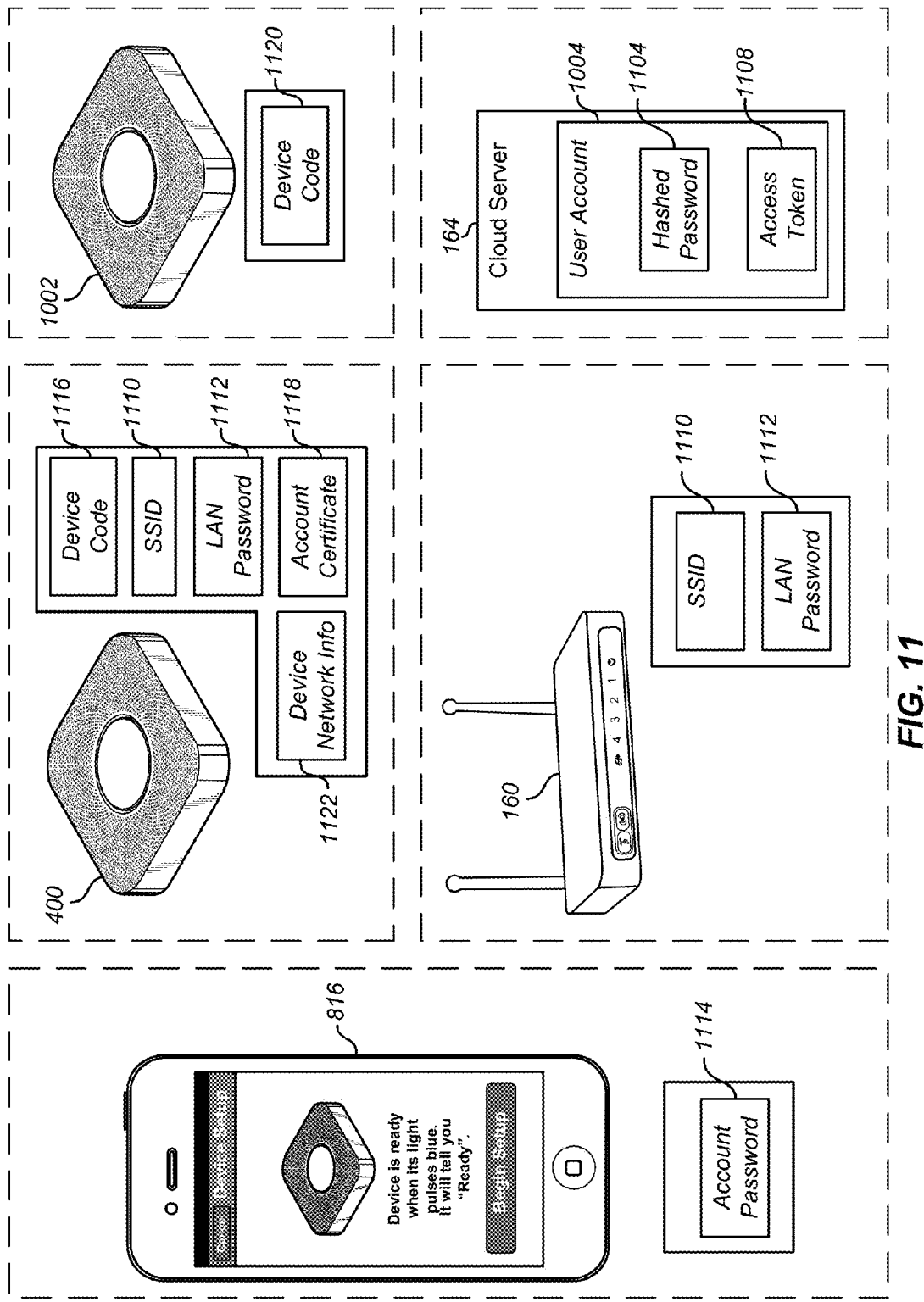
FIG. 11 illustrates a starting state of each of the devices involved in provisioning and pairing the second hazard detector.

FIG. 11 illustrates a starting state for each of the devices involved in provisioning and pairing the second hazard detector 1002. FIG. 11 shows certain data that are stored on each device prior to activating the second hazard detector 1002. It will be understood that the data shown in FIG. 11 are not exhaustive, and they only highlight certain types of information that may be required during the pairing process. Beginning with the mobile computing device 816, an account password 1114 may be stored. The account password 1114 may have been entered by a user previously when establishing the user account 1004 with the cloud server 164. In some embodiments, the account password 1114 may be stored on the mobile computing device 816. Such storage may be in an encrypted format. In other embodiments, the account password 1114 may be entered during setup and shared with the user account 1004. Afterwards, the cloud server 164 can transmit an authentication token to the mobile computing device 816. In the future, the mobile computing device 816 can share the authentication token with the cloud server 164 to prove to the cloud server 164 that the mobile computing device 816 should be allowed access to the user account 1004. Alternatively, the authentication token can be used to encrypt and/or sign communications that are sent from the mobile computing device 816 to the cloud server 164, thus preventing the need to transmit secret information such as a password during each communication. In some embodiments, the mobile computing device 816 may also store an SSID 1110 and a LAN password 1112 for a home Wi-Fi network. However, the SSID 1110 and the LAN password 1112 may be stored on the mobile computing device 816 such that they are not readily available to be shared with other devices such as the first hazard detector 400 and the second hazard detector 1002. Therefore, the SSID 1110 and/or the LAN password 1112 may need to be retransmitted to the mobile device 816 or manually entered into the mobile device 816 when pairing with the second hazard detector 1002. As will be described below, the SSID 1110 and the LAN password 1112 can be transmitted to the mobile device 816 from the first hazard detector 400 such that users do not need to enter this information for a second time.

The router 160 may generally store the SSID 1110 and the LAN password 1112 for authenticating other devices that wish to communicate through the home Wi-Fi network. At the cloud server 164 the user account 1004 can store an access token 1108 that is used during the pairing process as will be described in greater detail below. The access token 1108 comprises secret information that can be used to verify the identity of a device trying to communicate with the first hazard detector 400. The user account 1004 can also store the account password 1114. However, in most embodiments, the user account 1004 will instead store a hashed version of the password 1104. The account password 1114 can then be hashed by the mobile computing device 816 and transmitted to the cloud server 164 for verification. This prevents the need for transmitting the account password 1114 over the Internet in an unhashed ("in the clear") form.

The first hazard detector 400 may include a first device code 1116 that was used in method 700 as described above. Because the first hazard detector 400 has already been paired with the user account 1004, the first hazard detector 400 will also store the SSID 1110 and the LAN password 1112 obtained during the first pairing process so that it can connect to the home Wi-Fi network. Also obtained during the first pairing process is an account certificate 1118. The account certificate comprises cryptographic information that can be used to verify that another device has the access token 1108. Further use of the account certificate 1118 will be described in greater detail below. In some embodiments, the smart home devices in the enclosure 150 may communicate with each other via a local device network that is separate from the home Wi-Fi network. As described above, the local device network may be an 802.15.4-compatible network, such as a ZigBee network, or a Thread network. The local device network may be used to transmit alarm messages, status updates, health check information, and/or the like, between various smart home devices and used as a local mesh network. For example, when a hazard is detected by the first hazard detector 400, a message may be transmitted via the local device network to the second hazard detector 1002 such that both hazard detectors 400, 1002 sound an alarm for occupants of the enclosure 150 at the same time, even though the hazard was only detected by the first hazard detector 400. Information for joining the local device network will be stored by the first hazard detector 400 in the form of the device network information 1122. Finally, the second hazard detector 1002 may store a second device code 1120 that is unique to the second hazard detector 1002 and that is provided during a manufacturing or post-manufacturing process. As with the first device code 1116, the second device code 1120 can be printed on a label on the back of the second hazard detector 1002 and/or encoded in a QR code, barcode, etc., that can be optically or electronically read by the mobile computing device 816.

FIGS. 12A-12E illustrate user interfaces for an application 814 running on the mobile device 816 to begin the pairing process with the second hazard detector 1002. The streamlined setup process for the second hazard detector 1002 was made possible because another existing smart home devices already been paired with the user account 1004. Merely for exemplary purposes, the existing smart home device used in this disclosure will be the first hazard detector 400. However, other embodiments need not be so limited, and other smart home devices may also be used. For example, a smart appliance, a smart thermostat, and/or a home security system sensor unit that is compatible with the cloud server 164 may also be used to pair the second hazard detector 1002.

Figure 12C:
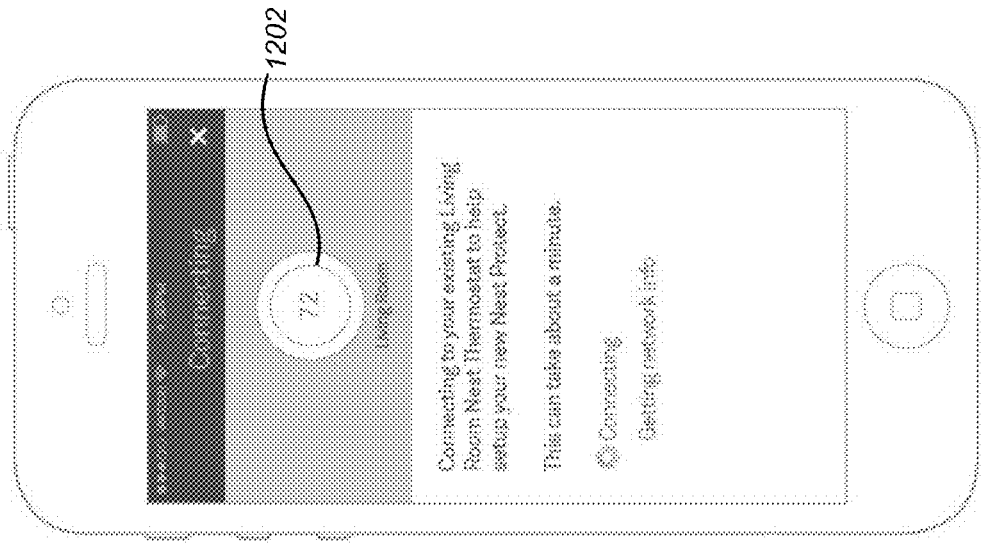
FIGS. 12A-12E illustrate user interfaces for an application running on the mobile device to begin the pairing process with the second hazard detector.
Figure 12B:
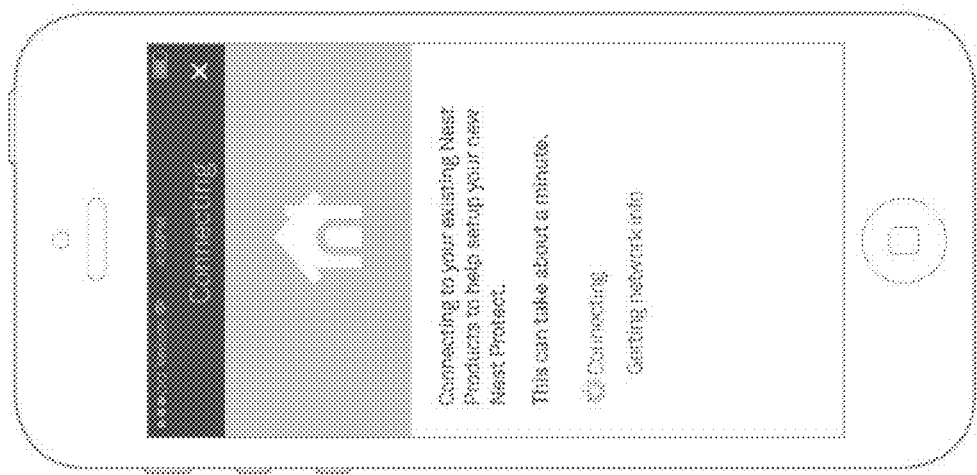
Figure 12A:
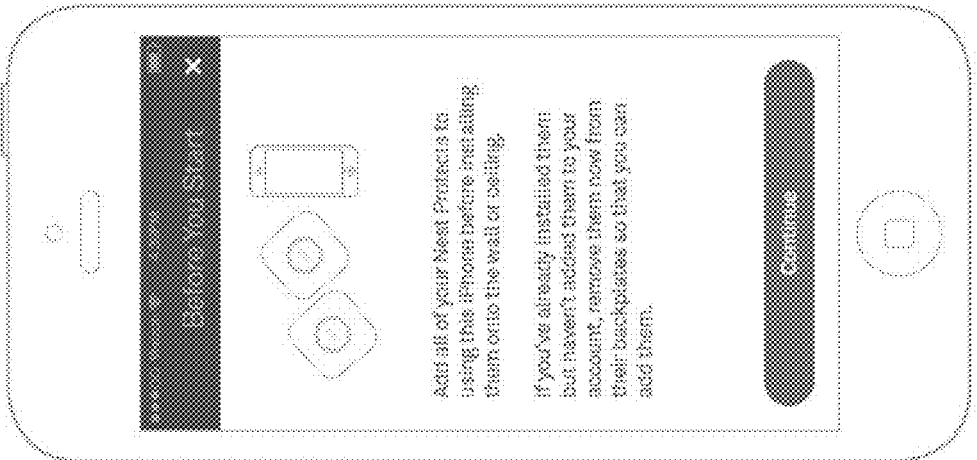

To begin the setup process for the second hazard detector 1002, the user may begin my activating an application, e.g. application 814, running on the mobile computing device 816. The interface of FIG. 12A provides initial instructions to the user to make the second hazard detector 1002 available for the setup process. In this scenario, the user is instructed to remove the second hazard detector 1002 from the mounting plate if it has already been installed and to press continue. At the press of continue, the application 814 will begin searching for other smart home devices that are registered with the user account 1004. The interface of FIG. 12B illustrates how a user can be informed that such a search is taking place. By way of example, a user may already have a smart thermostat and a smart home security system installed along with the first hazard detector 400. Sometimes, some smart home devices may offer more extensive user interfaces than others. For example, a smart thermostat may provide a more extensive user interface than the first hazard detector 400. It may be advantageous to allow the user to use or view the user interface of such devices instead of using the first hazard detector 400. Therefore, some embodiments may default to trying to connect to a smart home device with an advanced user interface, such as a screen and selectable user input capability before trying to connect to the first hazard detector 400. For example, FIG. 12C illustrates how the application 814 can first attempt to connect to a smart thermostat.

Figure 12E:
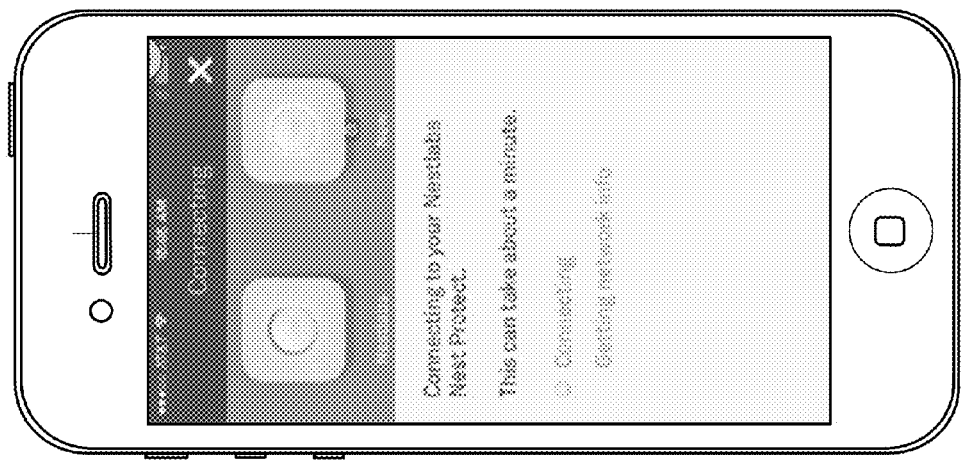
Figure 12D:
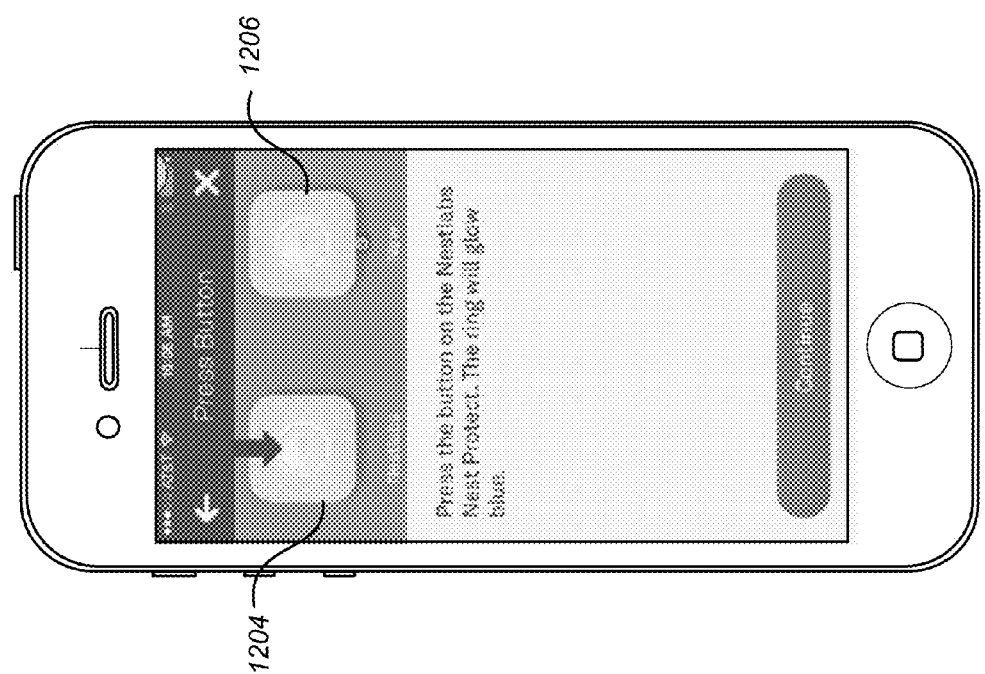

Occasionally, devices with more advanced user interfaces, such as the smart thermostat, may not be available during the pairing process. A user may also wish to ignore these other smart home devices and connect through the first hazard detector 400. FIG. 12D illustrates when the first hazard detector 400 is selected for pairing the second hazard detector 1002 either by default, through selection, or because other devices were not available. In this configuration, the application 814 may display a graphical icon 1204 for the first hazard detector 400 and a second graphical icon 1206 for the second hazard detector 1002 such that the user can easily understand that the first hazard detector 400 is going to be used to install the second hazard detector 1002.

In order to initiate a communication between the mobile device 816 and the first hazard detector 400, the user will be instructed to "wake-up" the first hazard detector 400. Turning back briefly to FIG. 8E, a user may press button 600 in a direction 810, as shown in FIG. 8E, to begin communicating with the first hazard detector 400. Alternatively, the user may use voice commands to begin communicating with the first hazard detector 400. In response, the first hazard detector 400 may generate audio and/or visual indicators, as shown in FIG. 8F. For example, the first hazard detector 400 may tell the user "Device ready! Press again to test." The first hazard detector 400 may also generate pulsing blue lights 812. After the user provides the user input to the first hazard detector 400 as prompted by the application 814, the user can select "continue," after which the application 814 can begin attempting to connect to the first hazard detector 400. In some embodiments, pressing the button 600 on the first hazard detector 400 can put the first hazard detector 400 into a discoverable mode such that the mobile computing device 816 can locate it. FIG. 12E illustrates an interface that the user will see as the mobile computing device 816 attempts to connect with the first hazard detector 400.

Figure 13:
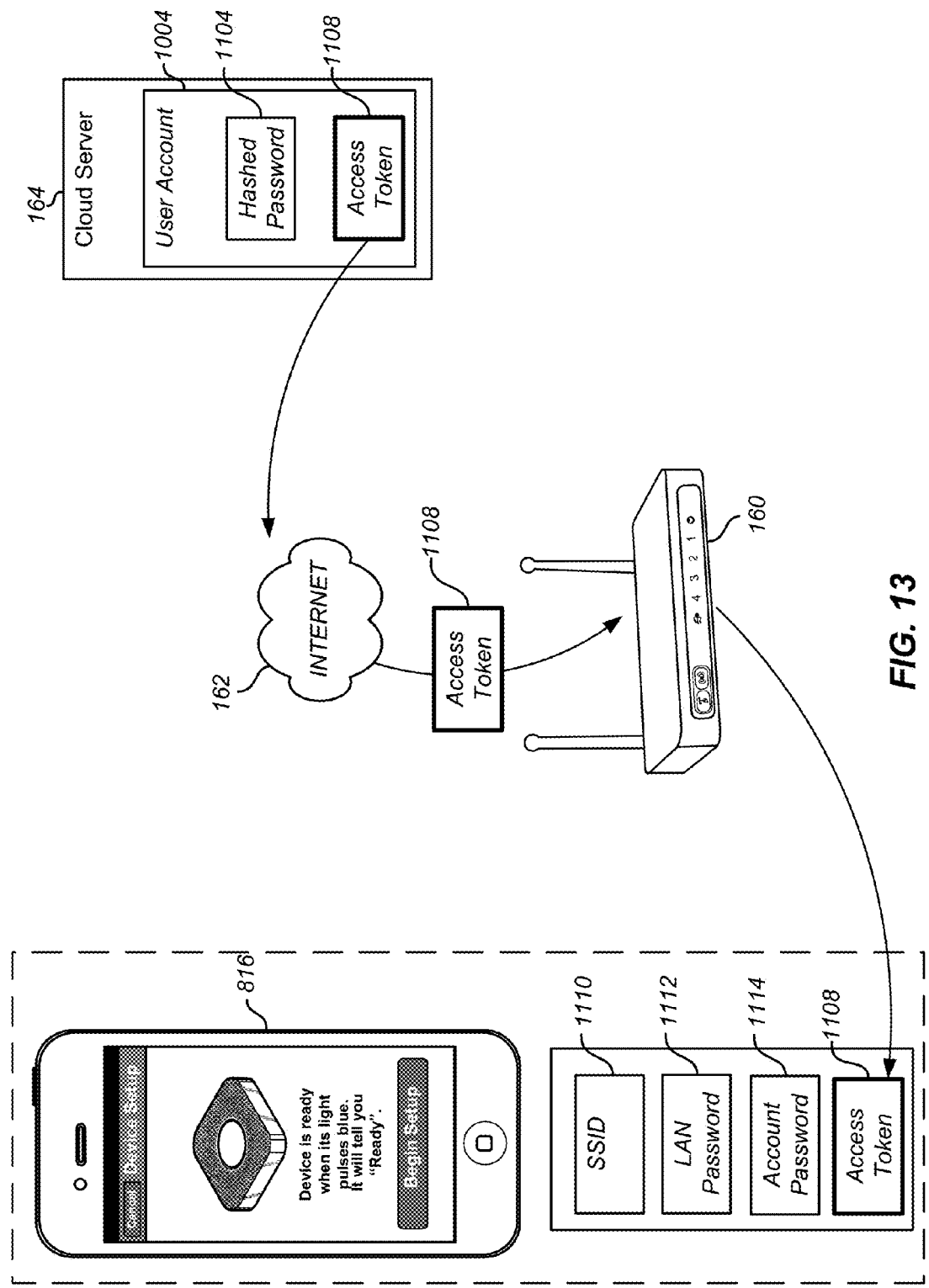
FIG. 13 illustrates a flow diagram of the access token being passed to the mobile computing device, according to some embodiments.

In order to describe both a user-level experience for the pairing process and to understand how data are transferred between various wireless networks, the ensuing discussion will alternate between figures and descriptions of the user experience and figures and descriptions data flow diagrams. FIG. 13 illustrates a flow diagram of the access token 1108 being passed to the mobile computing device 816, according to some embodiments. At some point before or during the initial stages of the pairing process for the second hazard detector 1002, the access token 1108 can be passed to the mobile computing device 816 through the Internet 162 and/or the router 160. (Note that the mobile computing device may also connect directly to the Internet 162 without the router 160 via another available network or using cellular data technology.) In some embodiments, the access token 1108 can be passed to the mobile computing device 816 anytime the mobile computing device 816 communicates with the cloud server 164. The access token 1108 provides a way for the mobile computing device 816 to authenticate itself while communicating directly with the first hazard detector 400 without needing to go through the Internet 162. The mobile computing device 816 can use the access token 1108 to prove that it should have access to the first hazard detector 400. Recall that the first hazard detector 400 has the account certificate 1118 that can be used to verify the access token 1108. At a minimum, if the mobile computing device 816 does not have the access token 1108, then during any of the initial stages of the pairing process for the second hazard detector 1002, the access token 1108 can be passed from the user account 1004 to the mobile computing device 816. In one embodiment, when the user clicks "continue" on the interface of FIG. 12A, the mobile device 816 can request the access token 1108 from the cloud server 164.

Figure 14:
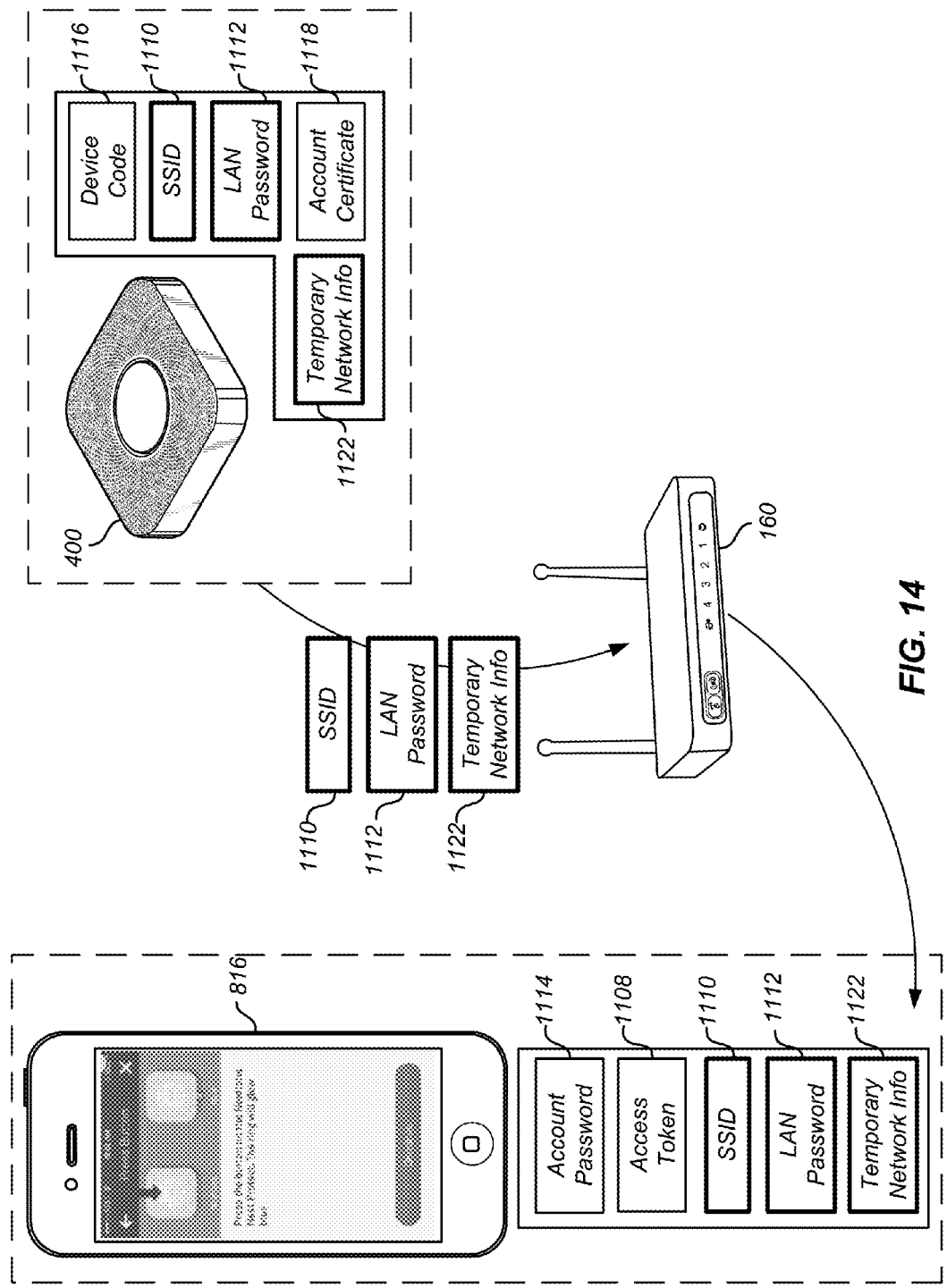
FIG. 14 illustrates a flow diagram of information passed from the first hazard detector to the mobile computing device, according to some embodiments.

FIG. 14 illustrates a flow diagram of information passed from the first hazard detector 400 to the mobile computing device 816, according to some embodiments. After placing the first hazard detector 400 in a discoverable mode, the mobile computing device 816 can establish a wireless connection with the first hazard detector 400 through the local Wi-Fi network created by the router 160. Note that this communication between the mobile computing device 816 and the first hazard detector 400 does not need to access an outside network, and thus does not need to communicate over the Internet 162 with the cloud server 164. Instead, the mobile computing device 816 can communicate via the local 802.11 Wi-Fi network according to known methods. In some cases, the mobile computing device 816 may have difficulty connecting to the first hazard detector 400 through the local Wi-Fi network. For example, one or both devices may be in a local dead spot within the structure 150, or the local Wi-Fi network may receive temporary interference from outside electromagnetic sources. In this case, a backup routine may be followed wherein the first hazard detector 400 creates its own local Wi-Fi access point to which the mobile computing device 816 can join. The application 814 on the mobile computing device 816 can inform the user that the first hazard detector 400 has created a temporary Wi-Fi network that the mobile computing device 816 needs to connect to in order to complete the setup process. As described above in relation to FIGS. 8K-8M, the application 814 can instruct the user to exit the setup program temporarily and switch the Wi-Fi settings of the mobile computing device 816 to the temporary Wi-Fi network created by the first hazard detector 400. For example, the user can be instructed to switch the Wi-Fi network of the mobile computing device 816 to "Device-659F38." This way, the mobile computing device 816 and the first hazard detector 400 can still communicate temporarily during the setup process through a Wi-Fi protocol without using the router 160 and the home Wi-Fi network.

Once communication is established between the mobile computing device 816 and the first hazard detector 400, the mobile computing device 816 can optionally authenticate itself to the first hazard detector 400. This authentication can be facilitated via the access token 1108 and the account certificate 1118. In some embodiments, the mobile computing device 816 can send a packet that is encrypted, signed, or otherwise altered using the account token 1108. The first hazard detector 400 can receive such information and verify that the information has been signed/encrypted/altered with the access token 1108 using the account certificate 1118, and thus authenticate the identity of the mobile computing device 816.

After authentication, the first hazard detector 400 can send selected information to the mobile computing device 816 through the home Wi-Fi network. (In cases where a connection through the home Wi-Fi network is not possible, the first hazard detector 400 can send selected information to the mobile computing device 816 through a temporary Wi-Fi network generated by the first hazard detector 400 as a backup.) In some embodiments, the first hazard detector 400 can send the SSID 110, the LAN password 1112, and/or the device network information 1122. By receiving the SSID 1110 and the LAN password 1112 from the first hazard detector 400, the mobile computing device 816 no longer needs to query the user to supply such information (e.g., the user does not have to select a home Wi-Fi network and enter their WEP/WPA password again).

Additionally, the mobile computing device 816 can send an indication to the first hazard detector 400 that the second hazard detector 1002 will be joining the network. This indication can be interpreted by the first hazard detector 400 as an indication that it should start broadcasting itself as discoverable on a local device network. The local device network may be established via relatively low power wireless communications circuitry on the first hazard detector 400 to broadcast on a low power Wireless Personal Area Network (6LoWPAN) module or a ZigBee module capable of communicating according to an 802.15.4 protocol, or a Thread module. For example, in one embodiment, the relatively low power wireless communications circuitry may be implemented using an Ember EM357 6LoWPAN module. In some embodiments, the first hazard detector 400 can broadcast on a 802.15.4-compatible network such as a Thread network. This network will be referred to as "the local device network," and the smart home devices in the enclosure 100 can use this local device network to communicate amongst themselves. The first hazard detector 400 will broadcast on the local device network for a limited amount of time as being joinable. In other words, the first hazard detector 400 broadcasts a beacon that it is able to be joined by a smart home device such as the second hazard detector 1002 within a limited time window. Additionally, the mobile computing device 816 can instruct the first hazard detector 402 not only to broadcast a beacon on the local device network, but to also expect the second hazard detector 1002 to eventually connect to the local device network in response. The connection of the second hazard detector 1002 is provisional in that it has not yet gone through an account pairing process. Once such a connection by the second hazard detector 1002 is received by the first hazard detector 400, the first hazard detector 400 is further instructed to notify the mobile computing device 816. As will be described further below, the first hazard detector 400 can then act as a bridge between the second hazard detector 1002 on the local device network and the mobile computing device 816 on the home Wi-Fi network.

Once the first hazard detector 400 has begun broadcasting on the local device network as discoverable, and before the second hazard detector 1002 has been provisionally joined, the application 814 on the mobile computing device 816 can instruct the user to begin preparing the second hazard detector 1002 for the pairing process. Initially, the second hazard detector 1002 may be in packaging as described in relation to FIGS. 8A-8B above. To begin the setup process, the user may be instructed to unpackage the second hazard detector 1002 and enter the second device code 1120 for the second hazard detector 1002 into the application 814. For example, the interface of application 814 shown in previously FIG. 8H may instruct the user to enter an alphanumeric version of the second device code 1120 manually in field 822 and select a "Done" button 824 when finished. Alternatively, the user may select a scan button 826 to bring up the interface of application 814 interface shown previously in FIG. 8I. The QR code and/or the alphanumeric code may be found on a sticker 828 that is located on back of the second hazard detector 1002 just as it was found on the backplate 420 of the first hazard detector 400. As shown in FIG. 8I, application 814 enters a camera mode interface in order to allow a user to take a picture of a QR code 830 located on sticker 828 and next to alphanumeric code 832. FIG. 8J shows alphanumeric code 832 inputted into field 822. Again, this may be accomplished by manually inputting alphanumeric code 832 into field 822 or by scanning QR code 830 (shown in FIG. 8I) and allowing application 814 to determine and automatically input alphanumeric code 832 into field 822. The user may then press the done button 824 in order to indicate that the second device code 1120 was correctly received.

Figure 15C:
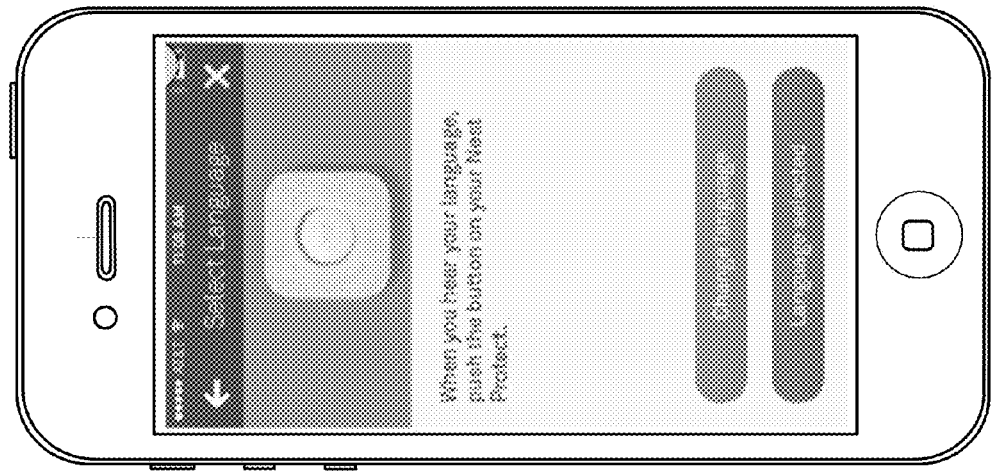
FIGS. 15A-15C illustrate user interfaces for activating the second hazard detector, according to some embodiments.
Figure 15B:
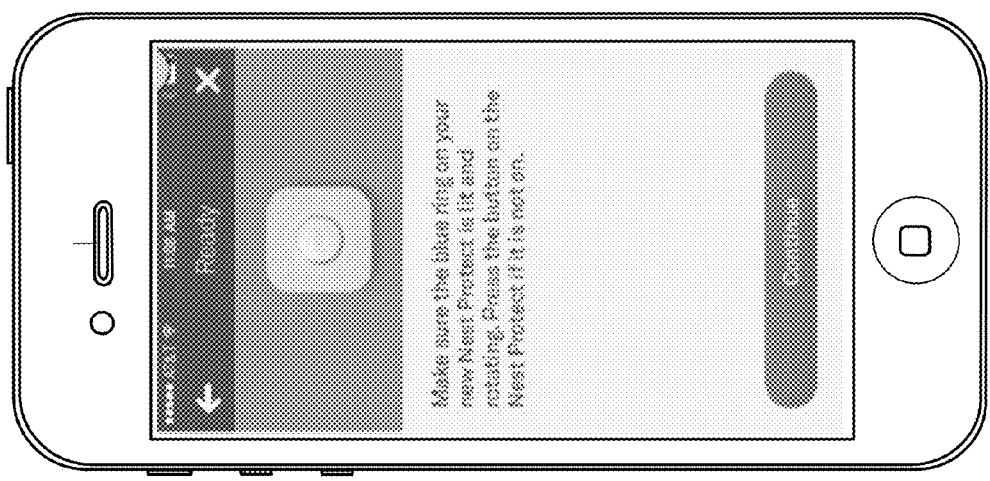
Figure 15A:
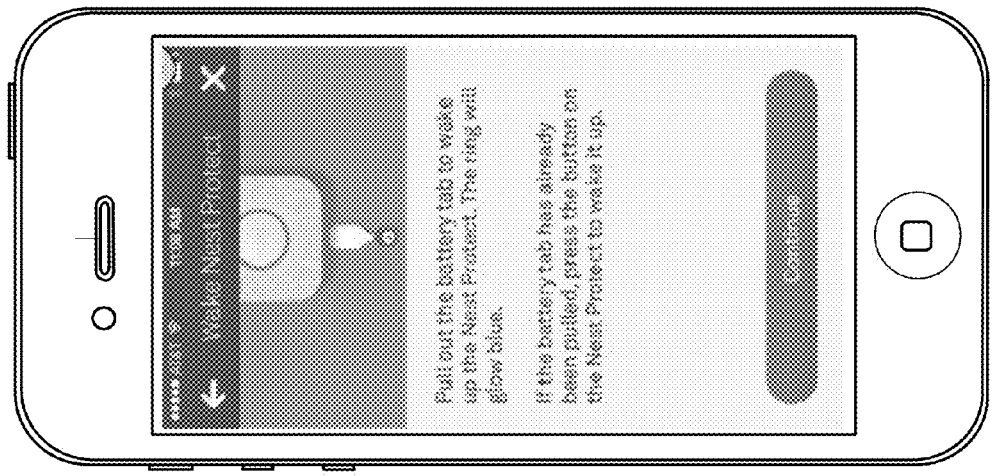

FIGS. 15A-15C illustrate user interfaces for activating the second hazard detector 1002, according to some embodiments. As described above in relation to FIGS. 8E-G, the second hazard detector 1002 may be activated by pulling out a battery tab and thereby supplying power to the second hazard detector 1002. If the battery tab has already been pulled, then the user may press a button or other user input device on the second hazard detector 1002 in order to activate the second hazard detector 1002. In some embodiments, the second hazard detector 1002 may indicate that it is ready by giving audio/visual indicators to the user. For example, the second hazard detector 1002 may audibly announce that it is awake and ready to test. Alternatively or additionally, the second hazard detector 1002 may provide a rotating colored ring of light around a center button as described above. FIG. 15A illustrates how a user may be instructed by the application 814 to activate the second hazard detector 1002. FIG. 15B illustrates acceptable audio/visual indicators such that the user can compare the response of the second hazard detector 1002 with the expected response as provided by the application 814.

FIG. 15C illustrates an interface for selecting a language for the second hazard detector 1002. In one embodiment, the second hazard detector 1002 can emit audio signals that indicate available languages. For example, the second hazard detector 1002 may audibly say "English" in the English language, "Espanol" in the Spanish language, and so forth. As the second hazard detector 1002 cycles through the available languages, the user can be instructed to provide a user input to the second hazard detector 1002 when the appropriate language is being said. For example, the user could push a button on the second hazard detector 1002 when he/she hears the word "English" announced by the second hazard detector 1002.

In some embodiments, the language-selection feature may be automated by the second hazard detector 1002. For example, the second hazard detector 1002 could include a GPS device or a country code programmed during a manufacturing or post-manufacturing process. Either of these can be used to determine the proper language of the second hazard detector 1002 without requiring input from the user. In some embodiments, the language of the second hazard detector 1002 may be determined by an IP address associated with a home Wi-Fi network once it is connected. In these embodiments, the second hazard detector 1002 need not query the user for a preferred language during the setup process, but can instead wait until after the setup is complete. After the setup is complete and hazard detector is able to have access to things such as a home address, an IP address, and information transmitted from the cloud server 164 over the Internet 162. The second hazard detector 1002 can use that information to determine the preferred language. Alternatively, once the setup is complete, the IP address, home address, GPS coordinates, can be sent to the cloud server 164, and the cloud server 164 can make a determination as to the preferred language. In cases where the second hazard detector 1002 is unable to determine a location or is unable to determine a language based on the location, the second hazard detector 1002 can prompt the user for additional input to select a preferred language. For example, some cities with large bilingual populations may not have a preferred language based simply on location, such as Los Angeles (English and Spanish) or Montreal (English and French). In these locations, additional user input may be necessary to select among two possible preferred languages (e.g., Spanish and English). The cloud server 164 can provide a list of possible preferred languages to the second hazard detector 1002 during or after the setup process, and the user can then be prompted to select between those two possible preferred languages.

Figure 16:
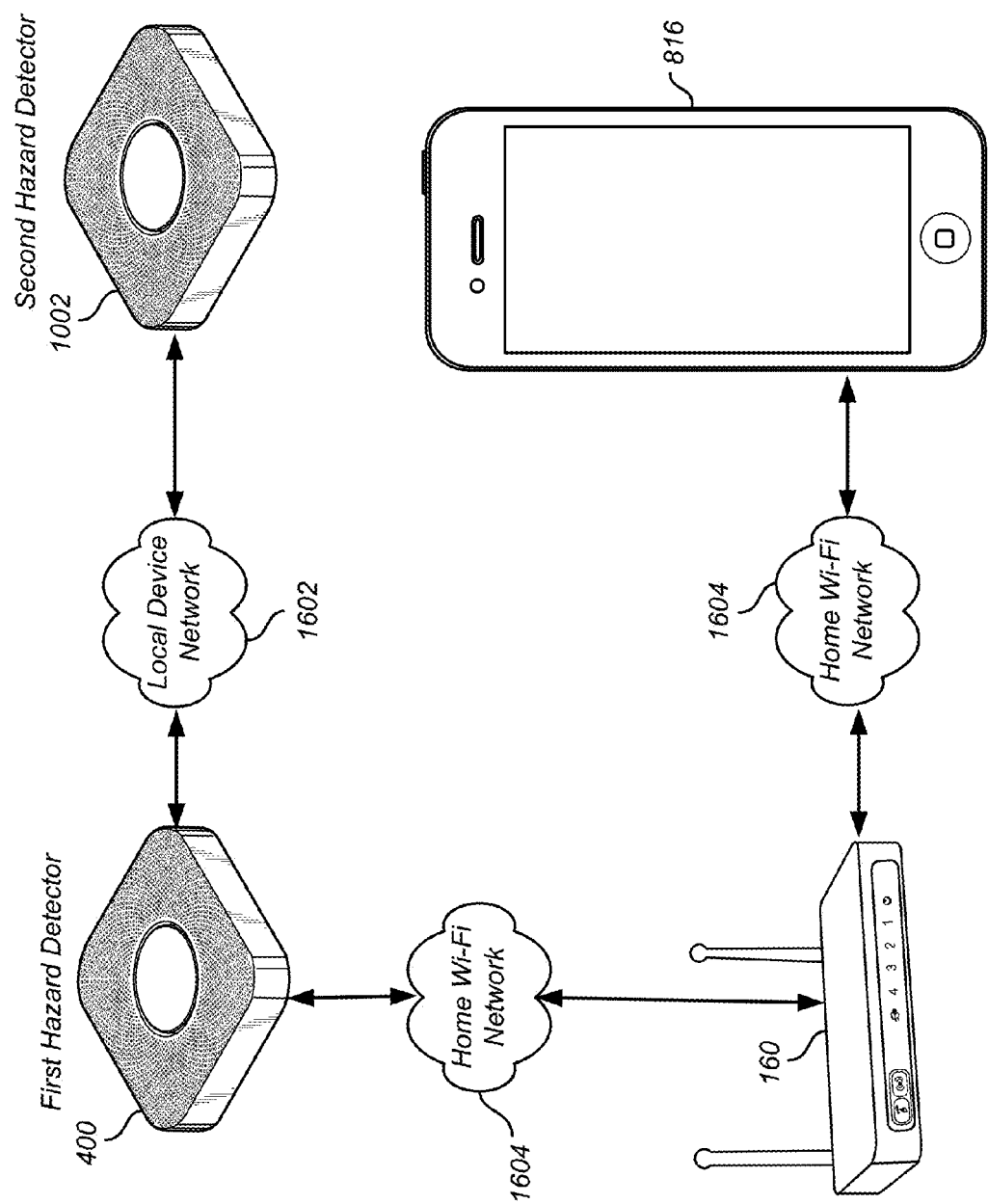
FIG. 16 illustrates the first hazard detector acting as a bridge between the second hazard detector and the mobile computing device, according to some embodiments.

FIG. 16 illustrates the first hazard detector 400 acting as a bridge between the second hazard detector 1002 and the mobile computing device 816, according to some embodiments.

After activating, or "waking up" the second hazard detector 1002, the second hazard detector 1002 can automatically be placed in a "hunting" mode. While hunting, the second hazard detector 1002 can begin searching for a local device network with which it is compatible. For example, the second hazard detector 1002 can begin searching for 802.15.4-compatible networks. In some embodiments, the second hazard detector 1002 can distinguish between 802.15.4 networks that are compatible with the smart home devices and other 802.15.4 networks that are not compatible with the smart home devices.

In some embodiments, the second hazard detector 1002 may also create a Wi-Fi access point for a temporary Wi-Fi network. This temporary Wi-Fi network can be used as a fallback in cases where the second hazard detector 1002 was unable to establish a connection through the local device network 1602 with the first hazard detector 400. In these cases, the mobile computing device 816 can connect to the Wi-Fi access point created by the second hazard detector 1002 and proceed with the setup process as described above in relation to method 700.

As described above, the first hazard detector 400 was previously instructed by the mobile computing device 816 to broadcast a joinable beacon for other smart home devices on the local device network 1602. The first hazard detector 400 was also previously instructed to inform the mobile computing device 816 when a new smart home device connected to the local device network 1602 in response to the beacon. When the second hazard detector 1002 attempts to join the local device network 1602, the first hazard detector 400 can allow the second hazard detector 1002 to provisionally join the local device network 1602. By provisionally joining, the second hazard detector 1002 does not need to supply any credentials, and access to the local device network 1602 may be granted for a limited time interval and/or limited types of communications may be allowed from the second hazard detector 1002 during the provisional time interval. In other embodiments, credentials can be stored in the second hazard detector 1002 a manufacturing process or a post-manufacturing process to identify it as a compatible product for the smart home system, and those credentials may be provided to the first hazard detector 400 in order to authorize the provisional membership in the local device network 1602.

The first hazard detector 400 can then communicate through the home Wi-Fi network 1604 (which may involve the router 160 or some other type of access point) with the mobile computing device 816. Is important to note that the mobile computing device 816 generally will not have a radio compatible with 802.15.4 networks such as the local device network 1602. Additionally, the second hazard detector 1002 will not have the SSID 1110 and/or the LAN password 1112 that would give it access to the home Wi-Fi network 1604 until later in the setup process. Therefore, in order to provision the second hazard detector 1002 on the home Wi-Fi network 1604, to register the second hazard detector 1002 with the user account 1004 on the cloud server 164, and to pair the second hazard detector 1002 with the mobile computing device 816, the first hazard detector 400 can act as a bridge between the local device network 1602 and the home Wi-Fi network 1604. In essence, the first hazard detector 400 can form a tunnel that simply passes data packets from the home Wi-Fi network 1604 to the local device network 1602. Because the first hazard detector 400 is provisioned to operate on the home Wi-Fi network 1604 and is equipped with a radio device that is compatible with the local device network 1602, the first hazard detector 400 can pass data packets between the two networks. In some embodiments, the first hazard detector 400 need not play any active role in provisioning the second hazard detector 1002, but can instead simply pass data back and forth. In other words, the first hazard detector 400 does not need to understand or take part in the conversation between the mobile computing device 816 and the second hazard detector 1002.

Besides facilitating communication between otherwise incompatible devices, the tunnel provided by the first hazard detector 400 can also provide many other benefits. It is common as time passes for smart home devices such as the hazard detectors 400, 1002 to receive periodic software upgrades. In one scenario, the first hazard detector 400 may have been installed within the enclosure 154 relatively long period of time (e.g., more than two years). During this time, the first hazard detector 400 may have received numerous software upgrades, which may have involved communication protocols, initialization and pairing procedures, and/or the like. In contrast, the second hazard detector 1002 may have been manufactured at approximately the same time as the first hazard detector 400, but the second hazard detector 1002 may have sat on a store shelf for a number of years. Therefore, when the second hazard detector 1002 is installed by the user, the software in the second hazard detector 1002 may be badly out of date. In order to use the first hazard detector 400 to provision the second hazard detector 1002, the first hazard detector 400 would have to remain backwards compatible with every version of the operating software since inception. Maintaining backwards compatibility would take a great deal of programming effort and storage space on a device that may be battery-powered an expected to operate in a very low-power environment. However, by simply providing the tunneling function, the first hazard detector 400 only needs to remain backwards compatible with the tunneling protocol expected by the second hazard detector 1002. The mobile computing device 816 and/or the cloud server 164 will generally be higher powered devices that can either remain backwards compatible with the rest of the software for the second hazard detector 1002. They may also provide software upgrades during the setup process for the second hazard detector 1002. In contrast, the first hazard detector 400—which may need to be relatively low power and which may use relatively low-complexity microprocessors—can remain ignorant of these software upgrades and backwards compatibility.

Figure 17:
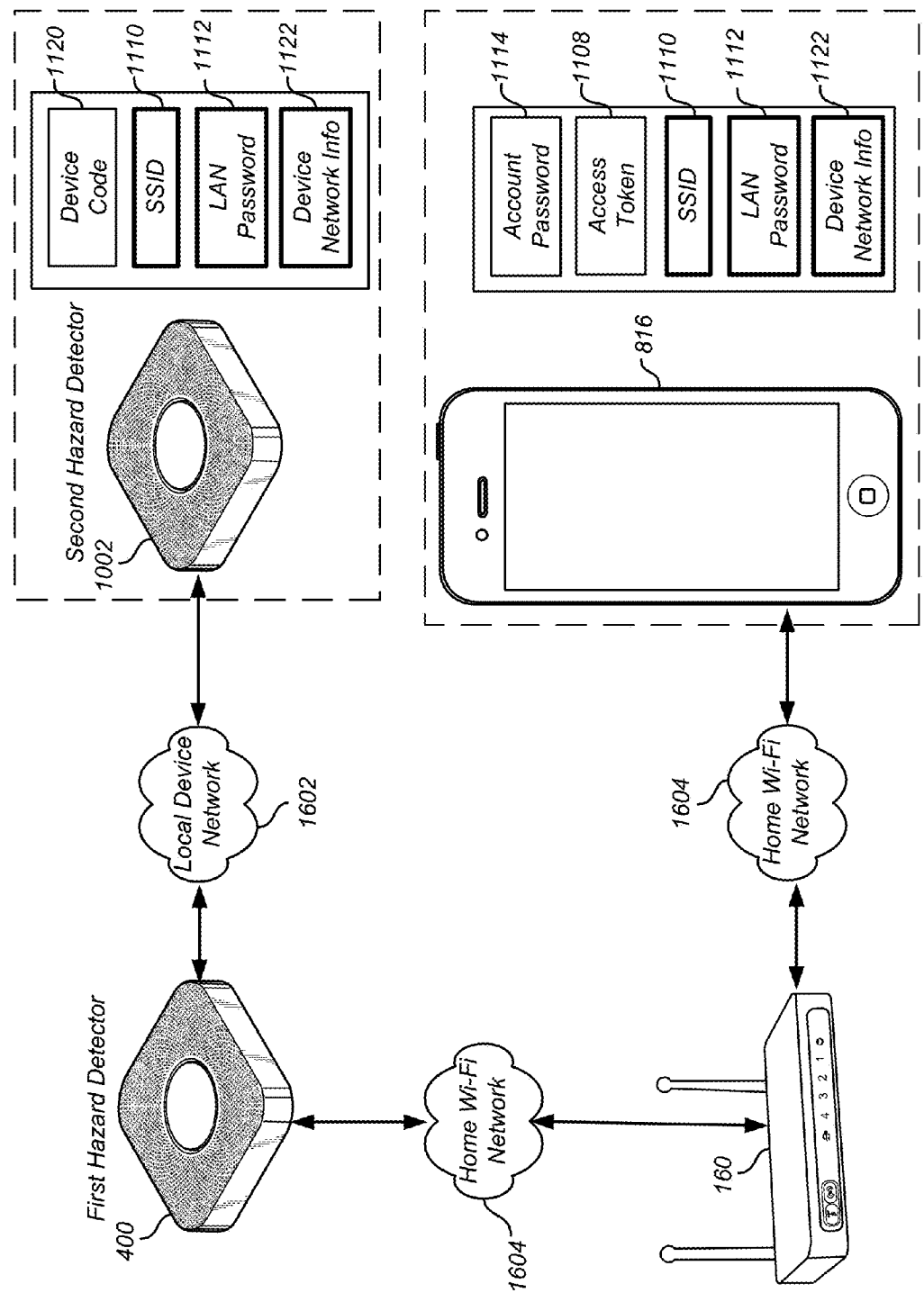
FIG. 17 illustrates data being passed through the communication tunnel established by the first hazard detector, according to some embodiments.

FIG. 17 illustrates data being passed through the communication tunnel established by the first hazard detector 400, according to some embodiments. First, the mobile computing device 816 will have previously received the second device code 1120 by either having scanned in the QR code or received a manual entry by the user. By providing the device code 1120 (or information encoded/signed using the device code 1120), the mobile computing device 816 can prove to the second hazard detector 1002 that it is authorized to communicate with the second hazard detector 1002. In some embodiments, tokens or pairing codes may be exchanged between the second hazard detector 1002 and the mobile computing device 816 to facilitate future communications via the home Wi-Fi network 1604.

In addition to verifying the second device code 1120, the mobile computing device 816 can transmit information needed to communicate through the home Wi-Fi network 1604. In one embodiment, the mobile computing device 816 can transmit the SSID 1110 and/or the LAN password 1112 to the second hazard detector 1102 through the tunnel created by the first hazard detector 400. The second hazard detector 1002 can then select the home Wi-Fi network 1604 as specified by the SSID 1110 and use the LAN password 1112 to gain access to the home Wi-Fi network 1604. Moving forward, the second hazard detector 1002 can communicate through the home Wi-Fi network 1604.

Furthermore, the mobile computing device 816 can transmit the device network information 1122 to the second hazard detector 1002. As noted above, the current connection between the second hazard detector 1002 and the first hazard detector 400 on the local device network 1602 is but a provisional one. A provisional connection may be limited in time and/or scope. In order to connect more permanently with the local device network 1602, the second hazard detector 1002 must provide credentials to the first hazard detector 400 and/or other smart home devices connected to the local device network 1602. In some embodiments, the network device information 1122 may include a username and password for an 802.15.4-compatible network. In embodiments that use the Thread/Weave network described above, the device network information 1122 may include a Weave username and/or password, as well as Fabric ID and/or keys. Using this device network information 1122, the second hazard detector 1002 can now establish more long-term communication with the local device network 1602, for example, by joining the local Weave network, and thereby receive messages from other smart home devices relating to detected hazards, and/or the like.

The second hazard detector 1002 can now connect with the cloud server 164 and associate itself with the user account 1004. This may involve pairing the second hazard detector 1002 with the user account 1004. Although not shown explicitly in the preceding figures, the cloud server 164 can transmit service configuration information to the mobile computing device 816 when the access token 1108 is sent prior to the setup process. The service configuration information can include a service node identifier, a globally unique Account identifier that identifies the user account, a DNS host name identifying an entry point for the service, and an opaque account pairing token. Along with the SSID 1110, the LAN password 1112, and/or the device network information 1122, the mobile computing device 816 may also transmit the configuration information to the second hazard detector 1002 through the tunnel provided by the first hazard detector 400. To complete the pairing process, the second hazard detector 1002 can then establish a communication session with the cloud server 164 using the DNS host name and service node identifier. The second hazard detector 1002 then authenticates itself to the cloud server 164 based on its digital PKI certificate and its private key, and then transmit the account identifier and account pairing token. Upon verifying the received account pairing token and account identifier, the cloud server 164 then establishes a pairing between the second hazard detector 1002 and the user account 1004.

Figure 18:
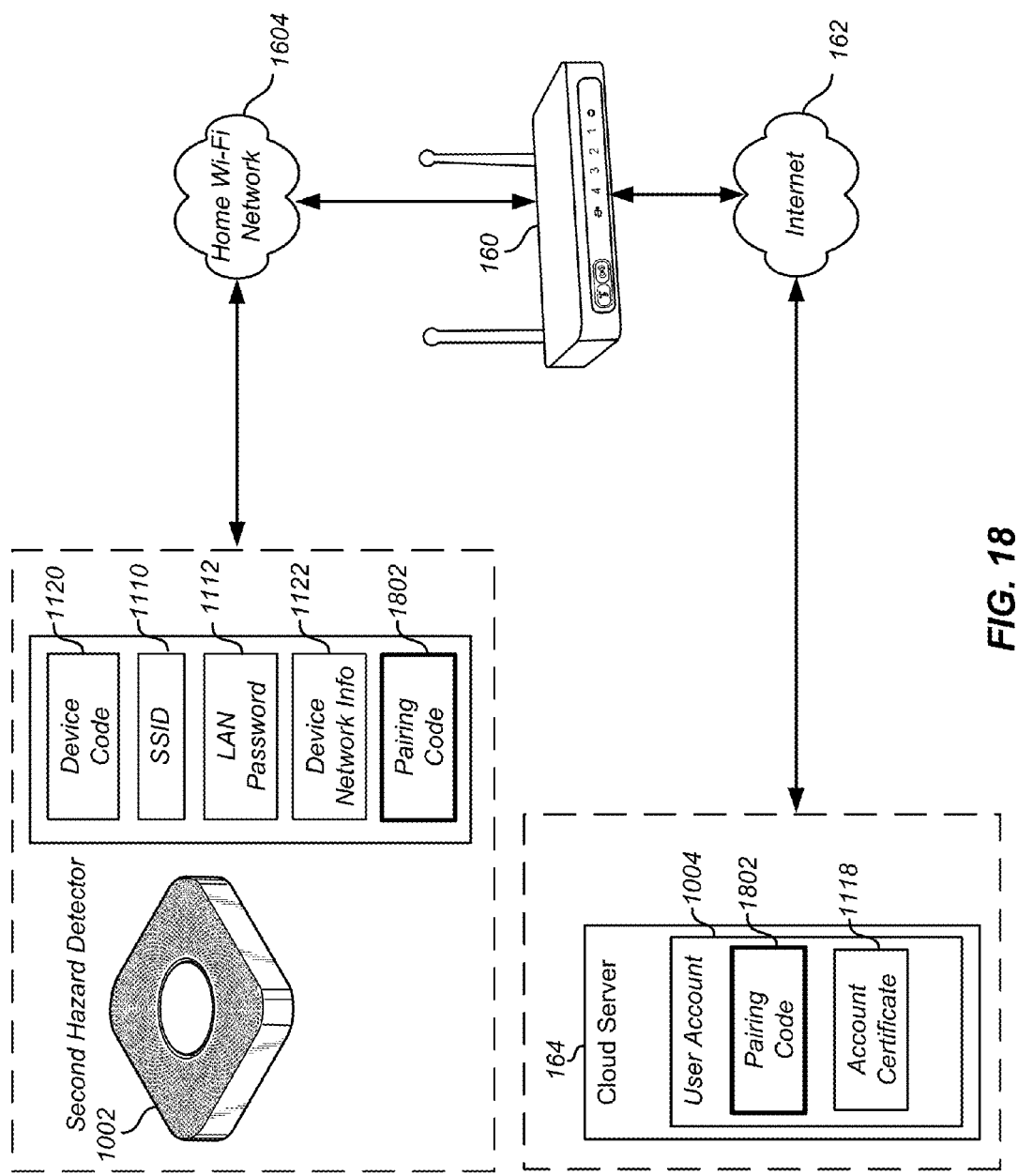
FIG. 18 illustrates the pairing process between the second hazard detector and the cloud server, according to some embodiments.

In some embodiments, this communication session can go through the tunnel provided by the first hazard detector 400. In other embodiments, this communication channel can be established independently by the second hazard detector 1002. FIG. 18 illustrates the pairing process between the second hazard detector 1002 and the cloud server 164, according to some embodiments. At this point, the second hazard detector 1002 has received the SSID 1110 and the LAN password 1112 as described above. The second hazard detector 1002 can connect to the cloud server 164 through the home Wi-Fi network 1604 and then connect through the router 160 to the Internet 162 and the cloud server 164. The second hazard detector 1002 can then be paired with the user account 1004 using the configuration information described above (e.g. account identifier, account pairing token, DNS hostname, etc.). In the future, when users login to the user account 1004, they will see the first hazard detector 400 and the second hazard detector 1002, along with any other smart home devices (e.g. thermostats, home security devices, doorbells, intercom systems, etc.) that are also registered with the user account 1004. In some embodiments, the cloud server 164 may also provide the account certificate 1118 to the second hazard detector 1002. The account certificate 1118 can then be used by the second hazard detector 1002 to authenticate future communications from the mobile computing device 816. Alternatively, the first hazard detector 400 can provide the second hazard detector 1002 with the pairing code 1802 through the local device network 1602. Also, some embodiments may exchange cryptographic keys between the second hazard detector 1002 and the cloud server 164 (e.g. symmetric key keys, public/private key pairs, etc.) such that future communications between the second hazard detector 1002 and the cloud server 164 can be encrypted.

At this point, the second hazard detector 1002 has been (1) provisioned on the home Wi-Fi network 1604, (2) provisioned on the local device network 1602, (3) authenticated with the mobile computing device 816, and (4) paired and added to the user account 1004 on the cloud server 164. All of these operations have been done requiring only a few user inputs to the mobile computing device 816. To add the second hazard detector 1002 required selecting the provisioning device (e.g., the first hazard detector 400) if multiple smart home devices are available, and pushing the user input buttons on the first hazard detector 400 and the second hazard detector 1002. In contrast to the process of method 700 for adding the first hazard detector 400, the user is spared from having to switch Wi-Fi networks or otherwise alter the settings of the mobile computing device 816, entering Wi-Fi passwords, or any other relatively cumbersome and error-prone procedure. The only code that needs to be entered to add the second hazard detector 1002 is the second device code 1120, which can easily be scanned via the QR code using a camera or other optical sensor on the mobile computing device 816.

Some embodiments may present a few additional steps in the installation process after the device has been paired and provisioned as described above. For example, some embodiments may allow the user to specify a location within the enclosure 150 where the second hazard detector 1002 is installed. This process may follow the description of FIGS. 8Q-8U above, where the user is presented with a number of predefined locations, such as a child bedroom, a living room, a master bedroom, a dining room, a basement, and/or the like, and allowed to select from the predefined list. Additionally, the user may be allowed to enter a custom location using a text input of the mobile computing device 816. The location specified by the user (e.g. the kitchen) may be used to differentiate the second hazard detector 1002 from other hazard detectors in the enclosure 150. This location may also be "spoken" by the second hazard detector 1002 during operation when a hazard is detected (e.g. "heads up, there's smoke in the kitchen").

Figure 19C:
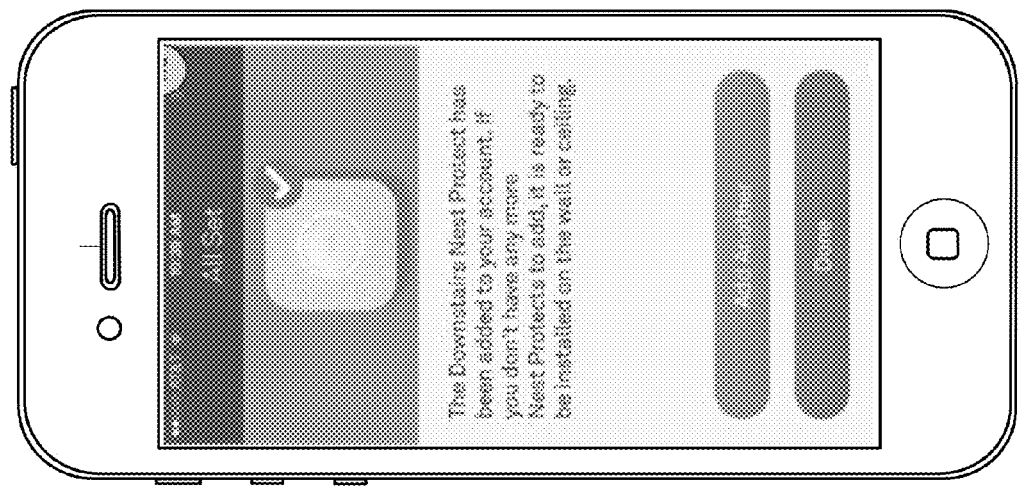
FIGS. 19A-C illustrate some optional final steps for completing installation of the second hazard detector, according to some embodiments.
Figure 19B:
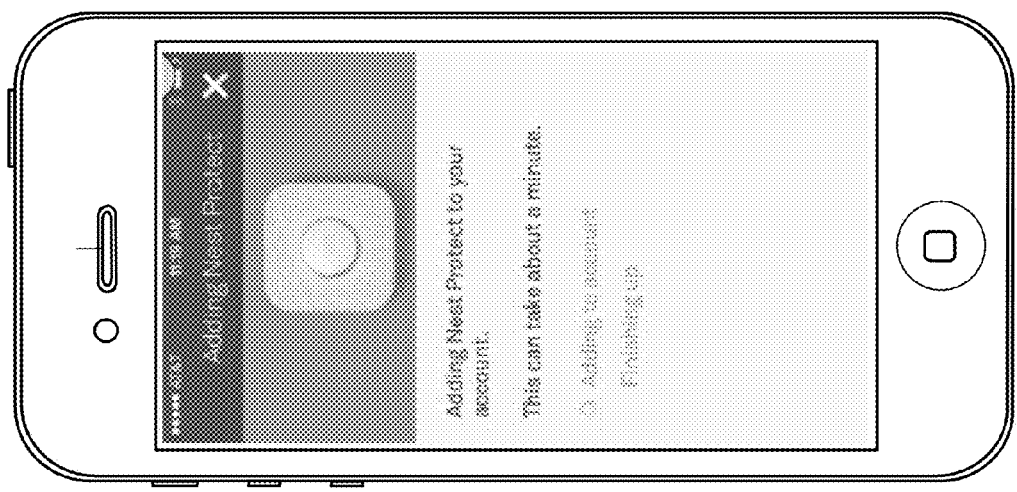
Figure 19A:
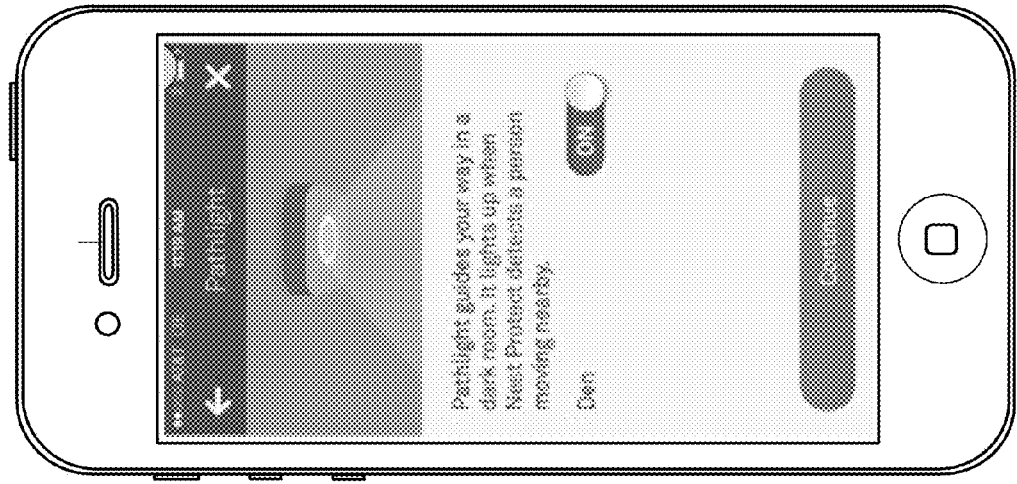

FIGS. 19A-C illustrate some optional final steps for completing installation of the second hazard detector 1002, according to some embodiments. FIG. 19A allows the user to enable or disable a "Pathlight" feature. Some embodiments of the second hazard detector 1002 may allow for a low-intensity light option to be used as a nightlight when motion is detected by the second hazard detector 1002 or by another nearby smart home device in the local device network. FIG. 19B illustrates an interface that may be displayed while the second hazard detector 1002 is being paired with the user account 1004 at the cloud server 164. Because the process involves communicating through the Internet, and because adding the second hazard detector 1002 to the user account 1004 may take upwards of one minute, this interface can be displayed such that the user knows the process is not yet complete but still progressing.

FIG. 19C illustrates an interface that informs the user that the setup process is complete and successful. This interface also allows the user to optionally install additional smart home devices. If the user chooses to install another device, the setup process may be further streamlined. Using the devices, settings, and/or network connections established when setting up the second hazard detector 1002, the installation process for a subsequent smart home device may be limited to scanning/entering the new device code. For example, a user may purchase a new security system that is comprised of multiple sensor units. Each of the sensor units for the security system can be installed one-after-the-other using this feature with minimal required user input. By way of example, some embodiments may maintain the tunnel connection between the first hazard detector 400 and the mobile computing device 816 and simply connect the other end of the tunnel to a new device. The first hazard detector 400 may also leave its beacon on in the local device network such that the user can connect multiple devices in a row. The mobile computing device 816 can maintain a copy of the access token 1108 such that it does not need to be retransmitted from the cloud server 164 for each installed device. Additionally, the SSID 1110, the LAN password 1112, and/or the device network information 1122 may be maintained on the mobile computing device 816 such they can simply be transmitted to each new device to be added.

It is to be appreciated that while the described methods and systems for installation and setup of a first network-connected hazard detector and a second (and subsequent) network-connected hazard detector(s) are particularly advantageous in view of their particular device contexts, in that issues may be brought about by the lack of a full on-device graphical user interface (e.g., the lack of a dot-matrix LCD screen with touchscreen capability or keypad/pointer capability) with the use instead of non-graphical but simple, visually appealing on-device user interface elements (e.g., a simple pressable button, colored lighting, and a voice speaker), and in further view of power limitations for the case of battery-only hazard detectors, and in further view of spatially and/or temporally limited wireless connectivity of such devices, the scope of the present teachings is by no means limited to hazard detection devices. Rather, the described methods and systems for installation and setup are widely applicable to any of a variety of network connected smart-home devices such as those described in relation to FIG. 1 above and including, but not limited to, thermostats, environmental sensors, motion sensors, occupancy sensors, baby monitors, remote controllers, key fob remote controllers, smart-home hubs, security keypads, biometric access controllers, other security devices, cameras, microphones, speakers, time-of-flight based LED position/motion sensing arrays, doorbells, intercom devices, smart light switches, smart door locks, door sensors, window sensors, generic programmable wireless control buttons, lighting equipment including night lights and mood lighting, smart appliances, entertainment devices, home service robots, garage door openers, door openers, window shade controllers, other mechanical actuation devices, solar power arrays, outdoor pathway lighting, irrigation equipment, lawn care equipment, or other smart home devices. Although widely applicable for any of such smart-home devices, one or more of the described methods and systems become increasingly advantageous when applied in the context of devices that may have more limited on-device user interface capability (e.g., without graphical user interfaces), when applied in the context of devices that may be power-limited (e.g., battery powered and not connected to household mains power), and/or in the context of devices having spatially and/or temporally limited wireless connectivity. Each of the smart home devices for the network fabric may need to paired with a user account, either as a first device or a second or subsequent follow-on device, when they are purchased and installed. Therefore, it should be appreciated that the first hazard detector 400 and/or the second hazard detector 1002 are merely representative of the types of smart-home devices that may advantageously be used with the systems and methods of the present invention. By way of non-limiting example, with regard to follow-on provisioning, a smart thermostat may be used to provision and install a new security system device. A hazard detector may be used to provision and install a new door entry system. A user may select from among available devices, such as the smart appliance, an intercom system, a smart baby monitor, or a smart thermostat to provision and install a new door entry system. Having read this disclosure, one having skill in the art could readily substitute any of these devices according to the methods described above.

Figure 20:
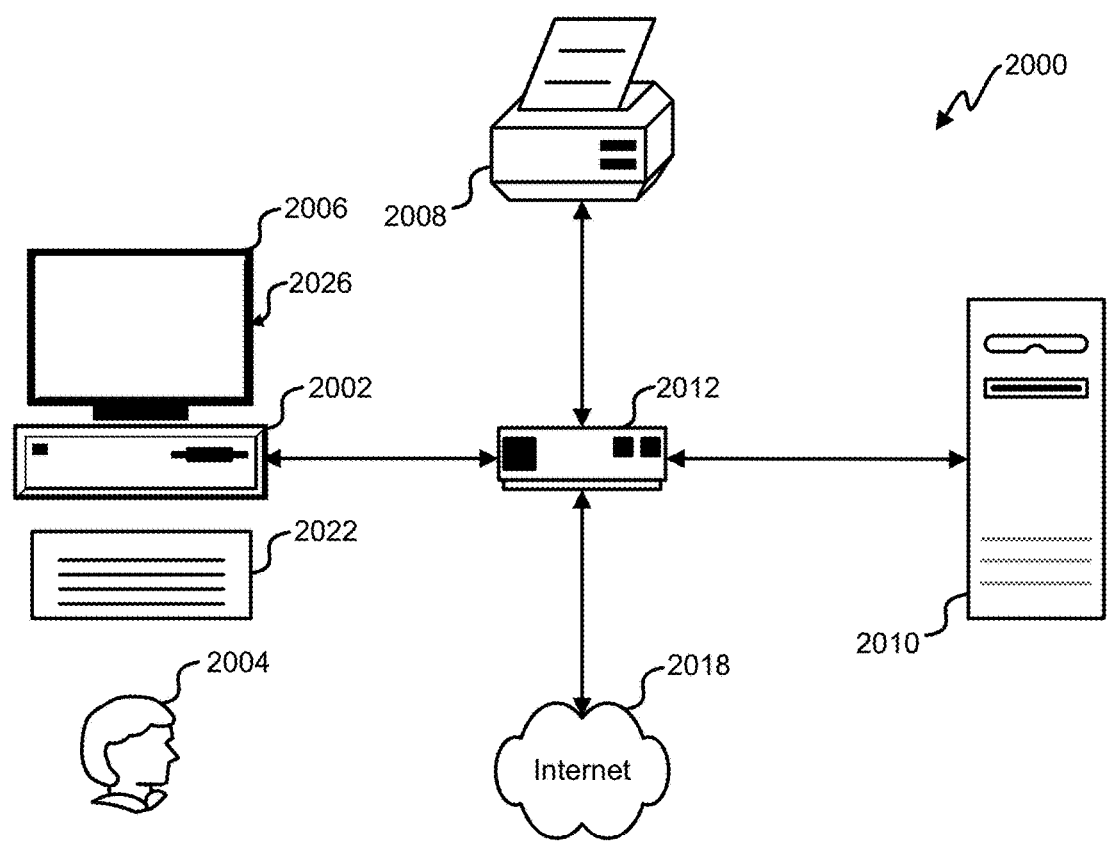
FIG. 20 illustrates a block diagram of an embodiment of a computer system.

Referring next to FIG. 20, an exemplary environment with which embodiments may be implemented is shown with a computer system 2000 that can be used by a user 2004 to remotely control, for example, one or more of the sensor-equipped smart-home devices according to one or more of the embodiments. The computer system 2010 can alternatively be used for carrying out one or more of the server-based processing paradigms described hereinabove or as a processing device in a larger distributed virtualized computing scheme for carrying out the described processing paradigms, or for any of a variety of other purposes consistent with the present teachings. The computer system 2000 can include a computer 2002, keyboard 2022, a network router 2012, a printer 2008, and a monitor 2006. The monitor 2006, processor 2002 and keyboard 2022 are part of a computer system 2026, which can be a laptop computer, desktop computer, handheld computer, mainframe computer, etc. The monitor 2006 can be a CRT, flat screen, etc.

A user 2004 can input commands into the computer 2002 using various input devices, such as a mouse, keyboard 2022, track ball, touch screen, etc. If the computer system 2000 comprises a mainframe, a designer 2004 can access the computer 2002 using, for example, a terminal or terminal interface. Additionally, the computer system 2026 may be connected to a printer 2008 and a server 2010 using a network router 2012, which may connect to the Internet 2018 or a WAN.

The server 2010 may, for example, be used to store additional software programs and data. In one embodiment, software implementing the systems and methods described herein can be stored on a storage medium in the server 2010. Thus, the software can be run from the storage medium in the server 2010. In another embodiment, software implementing the systems and methods described herein can be stored on a storage medium in the computer 2002. Thus, the software can be run from the storage medium in the computer system 2026. Therefore, in this embodiment, the software can be used whether or not computer 2002 is connected to network router 2012. Printer 2008 may be connected directly to computer 2002, in which case, the computer system 2026 can print whether or not it is connected to network router 2012.

Figure 21:
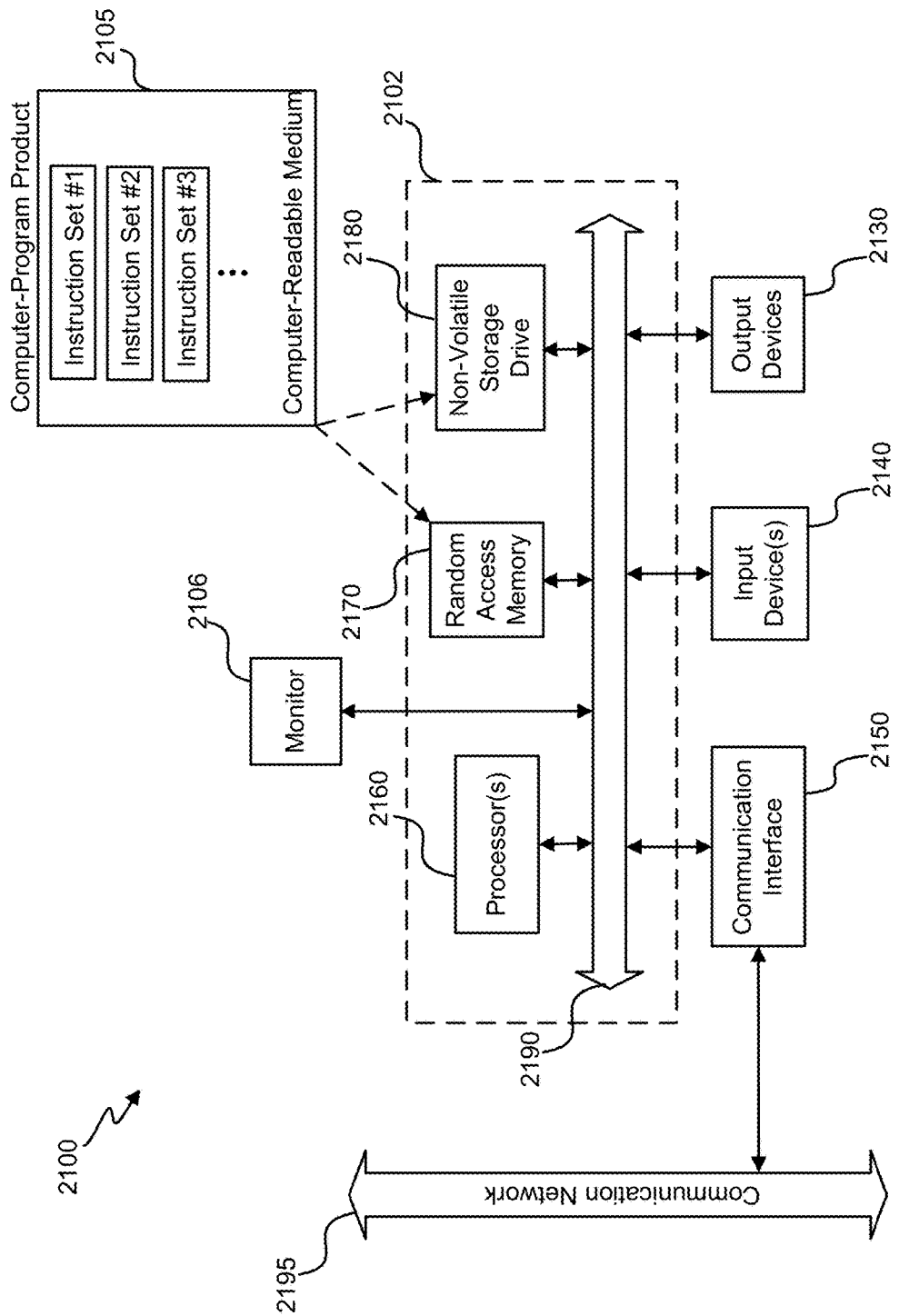
FIG. 21 illustrates a block diagram of an embodiment of a special-purpose computer.

With reference to FIG. 21, an embodiment of a special-purpose computer system 2100 is shown. For example, one or more intelligent components may be a special-purpose computer system 2100. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 2126, it is transformed into the special-purpose computer system 2100.

Special-purpose computer system 2100 comprises a computer 2102, a monitor 2106 coupled to computer 2102, one or more additional user output devices 2130 (optional) coupled to computer 2102, one or more user input devices 2140 (e.g., keyboard, mouse, track ball, touch screen) coupled to computer 2102, an optional communications interface 2150 coupled to computer 2102, a computer-program product 2105 stored in a tangible computer-readable memory in computer 2102. Computer-program product 2105 directs system 2100 to perform the above-described methods. Computer 2102 may include one or more processors 2160 that communicate with a number of peripheral devices via a bus subsystem 2190. These peripheral devices may include user output device(s) 2130, user input device(s) 2140, communications interface 2150, and a storage subsystem, such as random access memory (RAM) 2170 and non-volatile storage drive 2180 (e.g., disk drive, optical drive, solid state drive), which are forms of tangible computer-readable memory.

Computer-program product 2105 may be stored in non-volatile storage drive 2180 or another computer-readable medium accessible to computer 2102 and loaded into memory 2170. Each processor 2160 may comprise a microprocessor, such as a microprocessor from Intel® or Advanced Micro Devices, Inc.®, or the like. To support computer-program product 2105, the computer 2102 runs an operating system that handles the communications of product 2105 with the above-noted components, as well as the communications between the above-noted components in support of the computer-program product 2105. Exemplary operating systems include Windows® or the like from Microsoft Corporation, Solaris® from Sun Microsystems, LINUX, UNIX, and the like.

User input devices 2140 include all possible types of devices and mechanisms to input information to computer system 2102. These may include a keyboard, a keypad, a mouse, a scanner, a digital drawing pad, a touch screen incorporated into the display, audio input devices such as voice recognition systems, microphones, and other types of input devices. In various embodiments, user input devices 2140 are typically embodied as a computer mouse, a trackball, a track pad, a joystick, wireless remote, a drawing tablet, a voice command system. User input devices 2140 typically allow a user to select objects, icons, text and the like that appear on the monitor 2106 via a command such as a click of a button or the like. User output devices 2130 include all possible types of devices and mechanisms to output information from computer 2102. These may include a display (e.g., monitor 2106), printers, non-visual displays such as audio output devices, etc.

Communications interface 2150 provides an interface to other communication networks and devices and may serve as an interface to receive data from and transmit data to other systems, WANs and/or the Internet 2518. Embodiments of communications interface 2150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 2150 may be coupled to a computer network, to a FireWire® bus, or the like. In other embodiments, communications interface 2150 may be physically integrated on the motherboard of computer 1602, and/or may be a software program, or the like.

RAM 2170 and non-volatile storage drive 2180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2170 and non-volatile storage drive 2180 may be configured to store the basic programming and data constructs that provide the functionality of various embodiments of the present invention, as described above.

Software instruction sets that provide the functionality of the present invention may be stored in RAM 2170 and non-volatile storage drive 2180. These instruction sets or code may be executed by the processor(s) 2160. RAM 2170 and non-volatile storage drive 2180 may also provide a repository to store data and data structures used in accordance with the present invention. RAM 2170 and non-volatile storage drive 2180 may include a number of memories including a main random access memory (RAM) to store instructions and data during program execution and a read-only memory (ROM) in which fixed instructions are stored. RAM 2170 and non-volatile storage drive 2180 may include a file storage subsystem providing persistent (non-volatile) storage of program and/or data files. RAM 2170 and non-volatile storage drive 2180 may also include removable storage systems, such as removable flash memory.

Bus subsystem 2190 provides a mechanism to allow the various components and subsystems of computer 2102 to communicate with each other as intended. Although bus subsystem 2190 is shown schematically as a single bus, alternative embodiments of the bus subsystem may utilize multiple busses or communication paths within the computer 2102.

What is claimed is:

1. A method for pairing two or more smart-home devices with a user account, comprising:
   establishing first wireless communications with a first smart-home device, wherein the first wireless communications use a first wireless protocol, and wherein the first smart-home device has previously been paired with the user account;
   transmitting, to the first smart-home device, using the first wireless protocol, a transmission that instructs the first smart-home device to establish second wireless communication between the first smart-home device and a second smart-home device, wherein the second wireless communication established between the first smart-home device and the second smart-home device uses a second wireless protocol; and
   transmitting, to the first smart-home device, using the first wireless protocol, network credentials for the second smart-home device to join a first wireless protocol network, wherein the credentials are sent from the first smart-home device to the second smart-home device using the second wireless protocol;
   whereby a new pairing between the second smart-home device and the user account is established using the first wireless protocol.

2. The method of claim 1, wherein the first wireless protocol is 802.11 Wi-Fi compliant and the second wireless protocol is IEEE 802.15.4 compliant.

3. The method of claim 1, further comprising establishing a pairing between the first smart-home device and the user account by establishing wireless communication between the first smart-home device and a computing device via a network provided by the first smart-home device, wherein the network is provided using the first wireless protocol.

4. The method of claim 1, wherein the network credentials are provided by an application operating on a mobile computing device.

5. The method of claim 1, further comprising determining a language for the second smart-home device based on a geographic location of the second smart-home device.

6. The method of claim 1, wherein the first smart-home device creates a data tunnel between a computing device using the first wireless protocol and the second smart-home device using the second wireless protocol.

7. The method of claim 6, wherein the first smart-home device passes data between the computing device and the second smart-home device through the data tunnel.

8. The method of claim 6, further comprising:
   receiving, by the computing device, a device code for the second smart-home device; and
   authenticating the computing device with the second smart-home device by sending the device code to the second smart-home device through the data tunnel.

9. The method of claim 1, further comprising:
   receiving a pairing code from an account server; and
   transmitting, to the first smart-home device, using the first wireless protocol pairing code for the second smart-home device, wherein the pairing code is sent from the first smart-home device to the second smart-home device using the second wireless protocol; and wherein the pairing code allows the second smart-home device to pair with the user account at the account server.

10. The method of claim 1, further comprising, prior to transmitting the network credentials to the first smart-home device, receiving the network credentials from the first smart-home device.

11. A system for pairing two or more smart-home devices with a user account, comprising:
   an application operating on a mobile computing device, wherein the application is designed for configuration and control of the two or more smart-home devices, said application establishing communication over the Internet with a central server that includes the user account, wherein the application is configured to:
   establish first wireless communications with a first smart-home device, wherein the first wireless communications use a first wireless protocol, and wherein the first smart-home device has previously been paired with the user account;
   transmit, to the first smart-home device, using the first wireless protocol, a transmission that instructs the first smart-home device to establish second wireless communication between the first smart-home device and a second smart-home device, wherein the second wireless communication established between the first smart-home device and the second smart-home device uses a second wireless protocol; and
   transmit, to the first smart-home device, using the first wireless protocol, network credentials for the second smart-home device to join a first wireless protocol network, wherein the credentials are sent from the first smart-home device to the second smart-home device using the second wireless protocol;
   whereby a new pairing between the second smart-home device and the user account is established using the first wireless protocol.

12. The system of claim 11, wherein the first wireless protocol is 802.11 Wi-Fi compliant and the second wireless protocol is IEEE 802.15.4 compliant.

13. The system of claim 11, wherein the application is further configured to establish a pairing between the first smart-home device and the user account by establishing wireless communication between the first smart-home device and a computing device via a network provided by the first smart-home device, wherein the network is provided using the first wireless protocol.

14. The system of claim 11, wherein the network credentials are provided by an application operating on a mobile computing device.

15. The system of claim 11, wherein the application is further configured to determine a language for the second smart-home device based on a geographic location of the second smart-home device.

16. The system of claim 11, wherein the first smart-home device creates a data tunnel between a computing device using the first wireless protocol and the second smart-home device using the second wireless protocol.

17. The system of claim 16, wherein the first smart-home device passes data between the computing device and the second smart-home device through the data tunnel.

18. The system of claim 16, wherein the application is further configured to:
   receive a device code for the second smart-home device; and
   authenticate with the second smart-home device by sending the device code to the second smart-home device through the data tunnel.

19. The system of claim 11, wherein the application is further configured to:
   receive a pairing code from an account server; and
   transmit, to the first smart-home device, using the first wireless protocol pairing code for the second smart-home device, wherein the pairing code is sent from the first smart-home device to the second smart-home device using the second wireless protocol; and wherein the pairing code allows the second smart-home device to pair with the user account at the account server.

20. The system of claim 11, wherein the application is further configured to, prior to transmitting the network credentials to the first smart-home device, receive the network credentials from the first smart-home device.

\* \* \* \* \*